US011884068B2

(12) United States Patent
Uematsu

(10) Patent No.: US 11,884,068 B2
(45) Date of Patent: Jan. 30, 2024

(54) LIQUID DISCHARGE APPARATUS

(71) Applicant: SEIKO EPSON CORPORATION, Tokyo (JP)

(72) Inventor: Satoru Uematsu, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 181 days.

(21) Appl. No.: 17/656,247

(22) Filed: Mar. 24, 2022

(65) Prior Publication Data

US 2022/0305780 A1 Sep. 29, 2022

(30) Foreign Application Priority Data

Mar. 26, 2021 (JP) ................................ 2021-054246

(51) Int. Cl.
*B41J 2/045* (2006.01)

(52) U.S. Cl.
CPC ....... *B41J 2/04588* (2013.01); *B41J 2/04541* (2013.01); *B41J 2/04551* (2013.01); *B41J 2/04581* (2013.01)

(58) Field of Classification Search
CPC ......................... B41J 2/04541; B41J 2/04551; B41J 2/04581; B41J 2/04588
See application file for complete search history.

(56) References Cited

U.S. PATENT DOCUMENTS

2002/0158926 A1 10/2002 Fukano
2020/0091041 A1* 3/2020 Matsumoto ............ B41J 2/0451
2020/0171818 A1* 6/2020 Chikamoto .......... B41J 2/04588

FOREIGN PATENT DOCUMENTS

JP 2010-155470 A 7/2010

* cited by examiner

*Primary Examiner* — Anh T Vo
(74) *Attorney, Agent, or Firm* — Global IP Counselors, LLP

(57) ABSTRACT

There is provided a liquid discharge apparatus including: a discharge section; a first wiring for transmitting a setting information signal group that has a first setting information signal and a second setting information signal and a discharge control signal group; and a second wiring for transmitting a driving signal, in which the apparatus is configured to be operated in a first print mode in which printing is performed with a first gradation number according to the setting information signal group, and in a second print mode in which printing is performed with a second gradation number smaller than the first gradation number, and in the second print mode, the droplets are discharged from the discharge section according to the first setting information signal and the second setting information signal in which bit data of the first setting information signal is inverted.

8 Claims, 35 Drawing Sheets

| [LTa, LTb] ( [SIH, SIL] ) | S | | | |
|---|---|---|---|---|
| | Q1 | Q2 | Q3 | Q4 |
| [0, 0] | PA00 | PA10 | PA20 | PA30 |
| [0, 1] | PA01 | PA11 | PA21 | PA31 |
| [1, 0] | PA02 | PA12 | PA22 | PA32 |
| [1, 1] | PA03 | PA13 | PA23 | PA33 |

FIG. 11

| [LTa, LTb] ([SIH, SIL]) | S | | | |
|---|---|---|---|---|
| | Q1 | Q2 | Q3 | Q4 |
| [0, 0] | 0 | 0 | 0 | 1 |
| [0, 1] | 0 | 1 | 0 | 0 |
| [1, 0] | 1 | 0 | 1 | 0 |
| [1, 1] | 1 | 1 | 1 | 0 |

FIG. 15

| [LTa, LTb] ([S1H, S1L]) | S | | | |
|---|---|---|---|---|
| | Q1 | Q2 | Q3 | Q4 |
| [0, 0] | 0 | 1 | 0 | 0 |
| [0, 1] | 1 | 0 | 0 | 0 |
| [1, 0] | 0 | 1 | 0 | 0 |
| [1, 1] | 1 | 0 | 0 | 0 |

FIG. 21

| [LTa, LTb] ( [SIH, SIL] ) | Sa | | | |
|---|---|---|---|---|
| | Qa1 | Qa2 | Qa3 | Qa4 |
| [0, 0] | 0 | 0 | 0 | 0 |
| [0, 1] | 0 | 0 | 0 | 0 |
| [1, 0] | 1 | 0 | 0 | 0 |
| [1, 1] | 1 | 1 | 0 | 0 |

FIG. 22

| [LTa, LTb] ( [SIH, SIL] ) | Sb | | | |
|---|---|---|---|---|
| | Qb1 | Qb2 | Qb3 | Qb4 |
| [0, 0] | 1 | 0 | 0 | 0 |
| [0, 1] | 0 | 1 | 0 | 0 |
| [1, 0] | 0 | 1 | 0 | 0 |
| [1, 1] | 0 | 0 | 0 | 0 |

FIG. 26

| [LTa, LTb] ([SIH, SIL]) | Sa | | | |
|---|---|---|---|---|
| | Qa1 | Qa2 | Qa3 | Qa4 |
| [0, 0] | 1 | 0 | 0 | 0 |
| [0, 1] | 0 | 0 | 0 | 0 |
| [1, 0] | 1 | 0 | 0 | 0 |
| [1, 1] | 0 | 0 | 0 | 0 |

FIG. 27

| [LTa, LTb] ([SIH, SIL]) | Sb | | | |
|---|---|---|---|---|
| | Qb1 | Qb2 | Qb3 | Qb4 |
| [0, 0] | 0 | 0 | 0 | 0 |
| [0, 1] | 1 | 0 | 0 | 0 |
| [1, 0] | 0 | 0 | 0 | 0 |
| [1, 1] | 1 | 0 | 0 | 0 |

| [LTa, LTb, LTc] ( [SIH, SIM, SIL] ) | S | | | |
|---|---|---|---|---|
| | Q1 | Q2 | Q3 | Q4 |
| [0, 0, 0] | PA00 | PA10 | PA20 | PA30 |
| [0, 0, 1] | PA01 | PA11 | PA21 | PA31 |
| [0, 1, 0] | PA02 | PA12 | PA22 | PA32 |
| [0, 1, 1] | PA03 | PA13 | PA23 | PA33 |
| [1, 0, 0] | PA04 | PA14 | PA24 | PA34 |
| [1, 0, 1] | PA05 | PA15 | PA25 | PA35 |
| [1, 1, 0] | PA06 | PA16 | PA26 | PA36 |
| [1, 1, 1] | PA07 | PA17 | PA27 | PA37 |

FIG. 34

| [LTa, LTb, LTc] ([SIH, SIM, SIL]) | S | | | |
|---|---|---|---|---|
| | Q1 | Q2 | Q3 | Q4 |
| [0, 0, 0] | 0 | 0 | 0 | 1 |
| [0, 0, 1] | 0 | 0 | 1 | 0 |
| [0, 1, 0] | 0 | 1 | 0 | 0 |
| [0, 1, 1] | 0 | 1 | 1 | 0 |
| [1, 0, 0] | 1 | 0 | 0 | 0 |
| [1, 0, 1] | 1 | 0 | 1 | 0 |
| [1, 1, 0] | 1 | 1 | 0 | 0 |
| [1, 1, 1] | 1 | 1 | 1 | 0 |

FIG. 38

| [LTa, LTb, LTc] ( [SIH, SIM, SIL] ) | S | | | |
|---|---|---|---|---|
| | Q1 | Q2 | Q3 | Q4 |
| [0, 0, 0] | 0 | 1 | 0 | 0 |
| [0, 0, 1] | 1 | 0 | 0 | 0 |
| [0, 1, 0] | 0 | 1 | 0 | 0 |
| [0, 1, 1] | 1 | 0 | 0 | 0 |
| [1, 0, 0] | 0 | 1 | 0 | 0 |
| [1, 0, 1] | 1 | 0 | 0 | 0 |
| [1, 1, 0] | 0 | 1 | 0 | 0 |
| [1, 1, 1] | 1 | 0 | 0 | 0 |

LIQUID DISCHARGE APPARATUS

The present application is based on, and claims priority from JP Application Serial Number 2021-054246, filed Mar. 26, 2021, the disclosure of which is hereby incorporated by reference herein in its entirety.

BACKGROUND

1. Technical Field

The present disclosure relates to a liquid discharge apparatus.

2. Related Art

For printing of an ink jet printer or the like, a so-called piezoelectric printing apparatus is known in which characters or images are formed on a medium by driving a driving element including a piezoelectric element provided in a liquid discharge head by a driving signal, and by discharging a liquid such as ink that fills the cavity from a nozzle by driving the driving element.

A printing apparatus is known in which a piezoelectric element is controlled and characters or images are formed on a medium by outputting information that defines an amount of liquid discharged from the liquid discharge head from a liquid discharge head control circuit that controls the drive of the liquid discharge head. For example, the control circuit described in JP-A-2010-155470 discloses an ink jet type printer capable of controlling a liquid discharge head based on print data SI and pattern data SP.

The control circuit of the liquid discharge apparatus described in JP-A-2010-155470 prints ink discharged from a nozzle in four gradations of large dots, medium dots, small dots, and non-discharge. Since printing is executed in so-called multi-gradation, the characters or images printed on the medium have high image quality. However, there is a problem that the printing time becomes long due to the high image quality, and it is not possible to meet the demands of the user who prioritizes the printing speed over the image quality.

SUMMARY

According to an aspect of the present disclosure, there is provided a liquid discharge apparatus including: a discharge section that discharges droplets by supplying a driving signal; a first wiring for transmitting a setting information signal group that has a first setting information signal and a second setting information signal and sets a rule for selecting a driving waveform applied to a piezoelectric element included in the discharge section from the driving signal, and a discharge control signal group that has a first discharge control signal and controls a gradation of dots formed by discharging the droplets from the discharge section; a second wiring for transmitting the driving signal having the driving waveform; and a selection circuit that switches whether or not to supply the driving signal to the first discharge section based on the setting information signal group and the discharge control signal group, in which the apparatus is configured to be operated in a first print mode in which the droplets are discharged from the discharge section according to the setting information signal group and printing is performed with a first gradation number, and in a second print mode in which printing is performed with a second gradation number smaller than the first gradation number, and in the second print mode, the droplets are discharged from the discharge section according to the first setting information signal and the second setting information signal in which bit data of the first setting information signal is inverted.

BRIEF DESCRIPTION OF THE DRAWINGS

FIG. 11 is a view illustrating decoding contents in the decoder included in the selection control circuit during the discharge control period.

FIG. 15 is a view illustrating decoding contents in the decoder included in the selection control circuit during the discharge control period in the binary mode.

FIG. 21 is a view illustrating decoding contents in a decoder included in a selection control circuit during a discharge control period in the multi-gradation mode of the second embodiment.

FIG. 22 is a view illustrating decoding contents in the decoder included in the selection control circuit during the discharge control period in the multi-gradation mode of the second embodiment.

FIG. 26 is a view illustrating decoding contents in the decoder included in the selection control circuit during the discharge control period in the binary mode of the second embodiment.

FIG. 27 is a view illustrating decoding contents in the decoder included in the selection control circuit during the discharge control period in the binary mode of the second embodiment.

FIG. 34 is a view illustrating decoding contents in the decoder included in the selection control circuit during the discharge control period in the multi-gradation mode of the third embodiment.

FIG. 38 is a view illustrating decoding contents in the decoder included in the selection control circuit during the discharge control period in the binary mode of the third embodiment.

DESCRIPTION OF EXEMPLARY EMBODIMENTS

Figure 1:
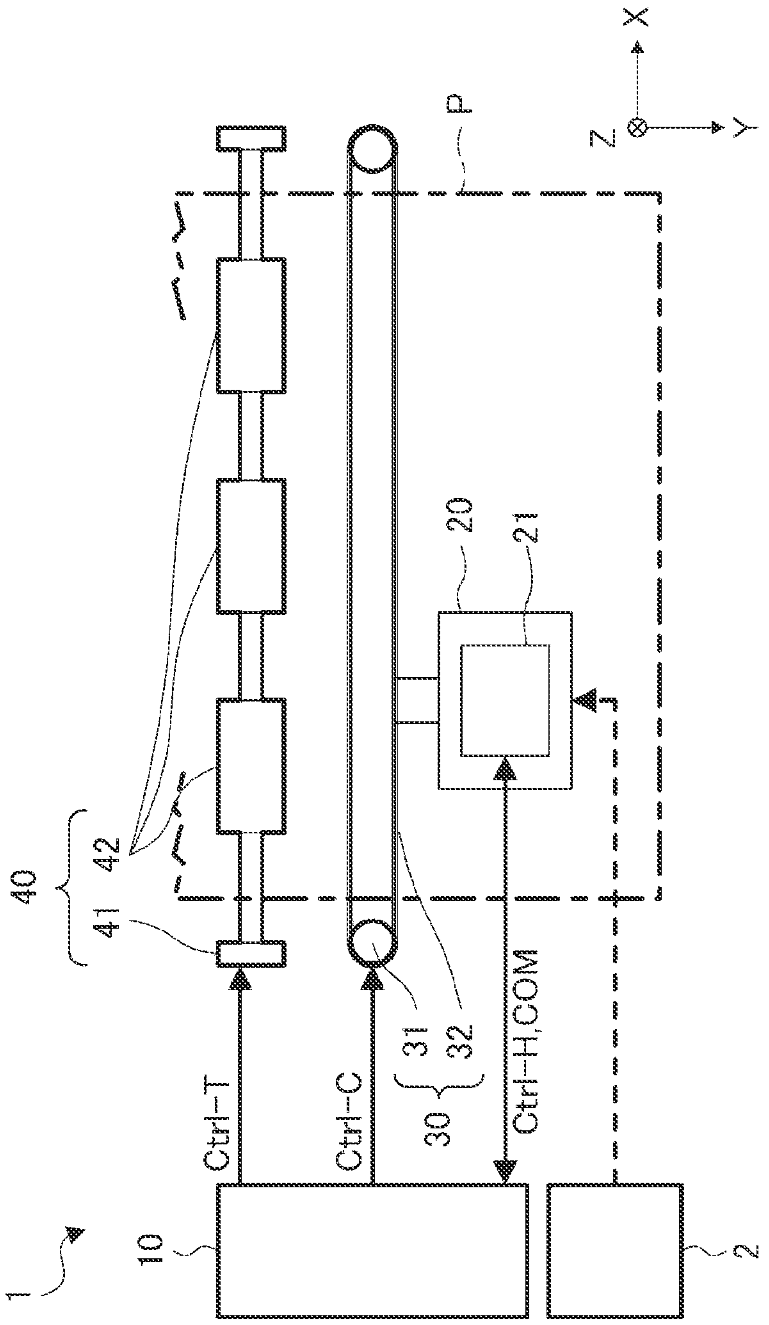
FIG. 1 is a view illustrating a schematic configuration of a liquid discharge apparatus.

Hereinafter, appropriate embodiments of the present disclosure will be described with reference to the drawings. The drawing to be used is for convenience of description. In addition, the embodiments which will be described below do not inappropriately limit the contents of the present disclosure described in the claims. In addition, not all of the configurations which will be described below are necessarily essential components of the present disclosure.

1. Outline of Liquid Discharge Apparatus

FIG. 1 is a view illustrating a schematic configuration of a liquid discharge apparatus 1. The liquid discharge apparatus 1 according to the present embodiment is described illustrating an example of a serial printing type ink jet printer in which a carriage 20 on which a liquid discharge head 21 for discharging ink as an example of a liquid is mounted reciprocates and discharges the ink to a medium P to be transported to form an image on the medium P. In the following description, a direction in which the carriage 20 moves is an X direction, a direction in which the medium P is transported is a Y direction, and a direction in which the ink is discharged is a Z direction. In addition, although the X direction, the Y direction, and the Z direction will be described as being orthogonal to each other, the description is not limited to the various configurations that configure the liquid discharge apparatus 1 being provided orthogonally to each other. As the medium P, any printing target such as a printing paper sheet, a resin film, or cloth can be used. The liquid discharge apparatus 1 may be a so-called line printing type ink jet printer in which the liquid discharge heads 21 are arranged side by side such that a nozzle row is formed in a width equal to or greater than the width of the medium, and ink is discharged from the liquid discharge head 21 to the transported medium to form a desired image on the medium.

As illustrated in FIG. 1, the liquid discharge apparatus 1 includes an ink container 2, a control mechanism 10, a carriage 20, a moving mechanism 30, and a transport mechanism 40.

A plurality of types of ink discharged to the medium P are stored in the ink container 2. Examples of the color of the ink stored in the ink container 2 include black, cyan, magenta, yellow, red, and gray. As the ink container 2 in which such ink is stored, an ink cartridge, a bag-shaped ink pack made of a flexible film, an ink tank capable of replenishing ink, and the like can be used.

The control mechanism 10 includes a processing circuit such as a central processing unit (CPU) or a field programmable gate array (FPGA), and a memory circuit such as a semiconductor memory, and controls each element of the liquid discharge apparatus 1 including the liquid discharge head 21.

A liquid discharge head 21 is mounted on the carriage 20. Further, the carriage 20 is fixed to an endless belt 32 included in the moving mechanism 30. The ink container 2 may be mounted on the carriage 20.

A control signal Ctrl-H for controlling the liquid discharge head 21 output by the control mechanism 10 and one or a plurality of driving signals COM for driving the liquid discharge head 21 are input to the liquid discharge head 21. Then, the liquid discharge head 21 discharges the ink supplied from the ink container 2 based on the input control signal Ctrl-H and the driving signal COM.

The moving mechanism 30 includes a carriage motor 31 and the endless belt 32. The carriage motor 31 operates based on a control signal Ctrl-C input from the control mechanism 10. The endless belt 32 rotates according to the operation of the carriage motor 31. Accordingly, the carriage 20 fixed to the endless belt 32 reciprocates in the X direction.

The transport mechanism 40 includes a transport motor 41 and a transport roller 42. The transport motor 41 operates based on a control signal Ctrl-T input from the control mechanism 10. The transport roller 42 rotates according to the operation of the transport motor 41. The medium P is transported in the Y direction as the transport roller 42 rotates.

As described above, in the liquid discharge apparatus 1, the liquid discharge head 21 mounted on the carriage 20 discharges the ink along the Z direction in conjunction with the transport of the medium P by the transport mechanism 40 and the reciprocating movement of the carriage 20 by the moving mechanism 30, and accordingly, the ink lands at any position on the surface of the medium P, and a desired image is formed on the medium P.

2. Functional Configuration of Liquid Discharge Apparatus

Figure 2:
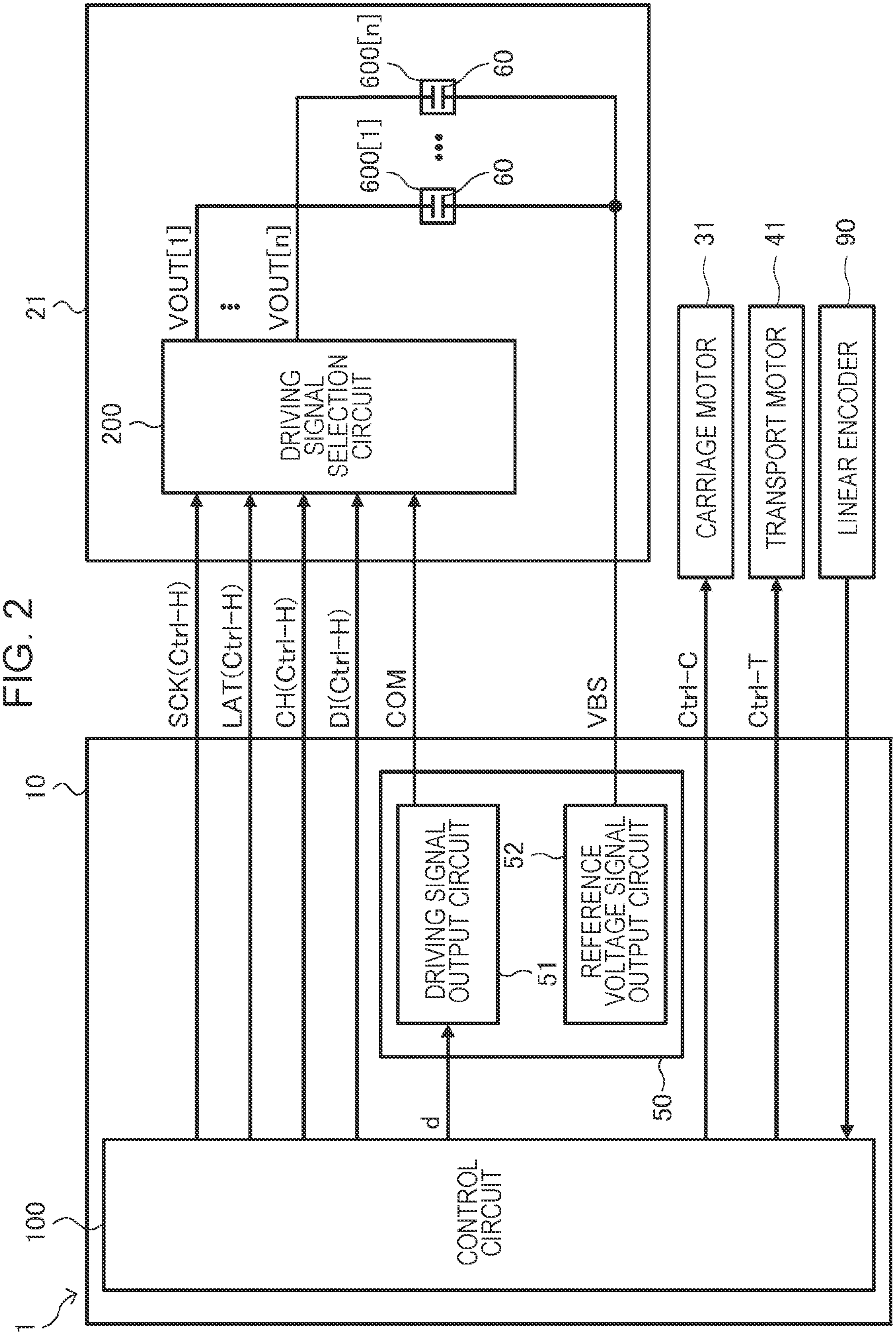
FIG. 2 is a view illustrating a functional configuration of the liquid discharge apparatus.

Next, a functional configuration of the liquid discharge apparatus 1 will be described. FIG. 2 is a view illustrating a functional configuration of the liquid discharge apparatus 1. As illustrated in FIG. 2, the liquid discharge apparatus 1 includes the control mechanism 10, the liquid discharge head 21, the carriage motor 31, the transport motor 41, and a linear encoder 90.

The control mechanism 10 includes a driving circuit 50 and a control circuit 100. The control circuit 100 includes a processor such as a microcontroller. Then, the control circuit 100 generates various data for controlling the liquid discharge apparatus 1 and signals based on the data, based on various signals such as image data input from a host computer or the like coupled to the outside to be capable of communicating, and outputs the various data or the signals to the corresponding configuration.

A specific example of the operation of the control circuit 100 will be described. The control circuit 100 grasps the scanning position of the liquid discharge head 21 mounted on the carriage 20, based on the detection signal input from the linear encoder 90. Then, the control circuit 100 generates and outputs various signals according to the scanning position of the liquid discharge head 21. Specifically, the control circuit 100 generates the control signal Ctrl-C for controlling the reciprocating movement of the liquid discharge head 21, and outputs the control signal Ctrl-C to the carriage motor 31. Further, the control circuit 100 generates the control signal Ctrl-T for controlling the transport of the medium P, and outputs the control signal Ctrl-T to the transport motor 41. The control signal Ctrl-C may be input to the carriage motor 31 after being signal-converted via a driver circuit (not illustrated). Similarly, the control signal Ctrl-T may be input to the transport motor 41 after being signal-converted via a driver circuit (not illustrated).

Further, as the control signal Ctrl-H for controlling the liquid discharge head 21 based on various signals such as image data input from the host computer and the scanning position of the liquid discharge head 21, the control circuit 100 generates a head control signal DI, a change signal CH, a latch signal LAT, and a clock signal SCK and outputs the generated signals to the liquid discharge head 21.

Further, the control circuit 100 outputs a reference driving signal d, which is a digital signal, to the driving circuit 50.

The driving circuit 50 includes a driving signal output circuit 51 and a reference voltage signal output circuit 52. A reference driving signal d is input to the driving signal output circuit 51. The driving signal output circuit 51 generates and outputs the driving signal COM as a driving signal by applying class D amplification to the converted analog signal after converting each of the reference driving signals d into a digital or analog signal. In other words, the reference driving signal d is a digital signal that defines the waveform of the driving signal COM. Then, the driving signal output circuit 51 generates and outputs the driving signal COM by applying class D amplification to the waveform defined by the reference driving signal d. In other words, the driving signal output circuit 51 includes a class D amplifier circuit. The reference driving signal d may be any signal that can define the waveform of the driving signal COM, and may be an analog signal, for example. Further, the driving signal output circuit 51 may be configured as long as it is possible to amplify the waveform defined by the reference driving signal d, and for example, a class A amplifier circuit, a class B amplifier circuit, a class AB amplifier circuit, or the like is included.

The reference voltage signal output circuit 52 outputs a reference voltage signal VBS indicating the reference potential of the driving signal COM. The reference voltage signal VBS may be, for example, a signal having a ground potential having a voltage value of 0 V, or a DC voltage signal having a voltage value of 5.5 V or 6 V.

Then, the driving signal COM and the reference voltage signal VBS output by the driving circuit 50 are output to the liquid discharge head 21.

The liquid discharge head 21 includes a driving signal selection circuit 200, a storage circuit 250, and discharge sections 600[1] to 600[*n*]. For example, n is a value such as 400, 800, or 1600. The discharge sections 600[1] to 600[*n*] all have the same configuration, and may be simply referred to as a discharge section 600 when it is not necessary to distinguish the discharge sections.

The driving signal selection circuit 200 is configured as, for example, an integrated circuit device. The clock signal SCK, the latch signal LAT, the change signal CH, the head control signal DI, and the driving signal COM are input to each of the driving signal selection circuits 200. Then, the driving signal selection circuit 200 selects or does not select the driving signal COM based on the clock signal SCK, the latch signal LAT, the change signal CH, and the input head control signal DI, to generate VOUT[1] to VOUT[n], and output the generated VOUT to each of the corresponding discharge sections 600[1] to 600[*n*]. When it is not necessary to distinguish VOUT[1] to VOUT[n], there is a case of being simply referred to as VOUT.

Figure 3:
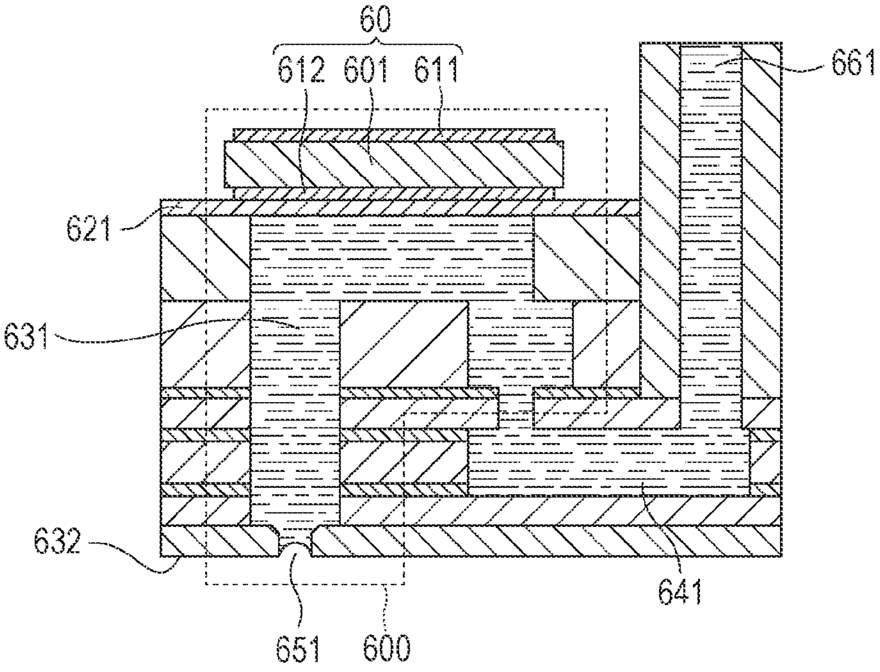
FIG. 3 is a view for describing a schematic configuration of a discharge section.

The discharge section 600 has a piezoelectric element 60 to which VOUT is supplied. FIG. 3 is a view for describing a schematic configuration of the discharge section 600. As illustrated in FIG. 3, the discharge section 600 includes the piezoelectric element 60, a vibrating plate 621, a cavity 631, and a nozzle 651. The cavity 631 is filled with ink supplied from a reservoir 641. The ink is introduced into the reservoir 641 from the ink container 2 via a supply port 661.

The vibrating plate 621 is displaced by driving the piezoelectric element 60 provided on the upper surface in FIG. 3. Then, as the vibrating plate 621 is displaced, the internal volume of the cavity 631 filled with ink expands and contracts. In other words, the vibrating plate 621 functions as a diaphragm that changes the internal volume of the cavity 631. The nozzle 651 is an opening portion which is provided on a nozzle plate 632 and communicates with the cavity 631. Then, as the internal volume of the cavity 631 changes, the ink having an amount that corresponds to the change in the internal volume is introduced to the cavity 631 and discharged from the nozzle 651.

The piezoelectric element 60 has a structure in which a piezoelectric body 601 is sandwiched between one pair of electrode 611 and electrode 612. Then, VOUT is supplied to the electrode 611 of the piezoelectric element 60, and the reference voltage signal VBS is supplied to the electrode 612, and accordingly, in the piezoelectric body 601, the center part of the electrodes 611 and 612 is displaced in the up-down direction together with the vibrating plate 621 according to the potential difference of the voltage supplied by the electrode 611 and the electrode 612. In other words, the piezoelectric element 60 is driven by supplying VOUT based on the driving signal COM.

In the discharge section 600 configured as described above, the piezoelectric element 60 bends in the upward direction, and accordingly, the vibrating plate 621 is displaced in the upward direction and the internal volume of the cavity 631 expands. Accordingly, the ink stored in the reservoir 641 is drawn into the cavity 631. Meanwhile, the piezoelectric element 60 bends in the downward direction, and accordingly, the vibrating plate 621 is displaced in the downward direction and the internal volume of the cavity 631 contracts. Then, an amount of ink corresponding to the degree of reduction of the internal volume of the cavity 631 is discharged from the nozzle 651 communicating with the cavity 631. The piezoelectric element 60 is not limited to the structure illustrated in FIG. 3, and may be any structure as long as the ink can be discharged from the nozzle 651 as the piezoelectric element 60 is driven.

As described above, the liquid discharge apparatus 1 according to the present embodiment includes the liquid discharge head 21 having the piezoelectric element 60 that discharges the ink from the nozzle 651 by being driven by VOUT generated based on the driving signal COM, and the driving signal selection circuit 200 for switching whether or not to supply the driving signal COM to the piezoelectric element 60; the driving signal output circuit 51 that outputs the driving signal COM; and the control mechanism 10 having the control circuit 100 that outputs the clock signal SCK, the latch signal LAT, the change signal CH, and the head control signal DI for controlling the driving signal selection circuit 200. Then, as the liquid discharge head 21 is controlled by the control of the control mechanism 10, the ink lands at a desired position of the medium P, and accordingly, a desired image is formed on the medium P.

Here, the piezoelectric element 60 is an example of a driving element, the driving signal selection circuit 200 is an example of a switching circuit, and the control mechanism 10 for controlling the liquid discharge head 21 is an example of a liquid discharge head control circuit. Further, the control circuit 100 that outputs the clock signal SCK, the latch signal LAT, the change signal CH, and the head control signal DI for controlling the driving signal selection circuit 200 is an example of a switching control circuit. The driving signal COM output by the driving signal output circuit 51 is an example of a driving signal according to the present embodiment. In the present embodiment, a case where the liquid discharge apparatus 1 includes one liquid discharge head 21 will be illustrated and described, but the liquid discharge apparatus 1 may include a plurality of liquid discharge heads 21.

3. Configuration of Driving Signal Selection Circuit

Figure 4:
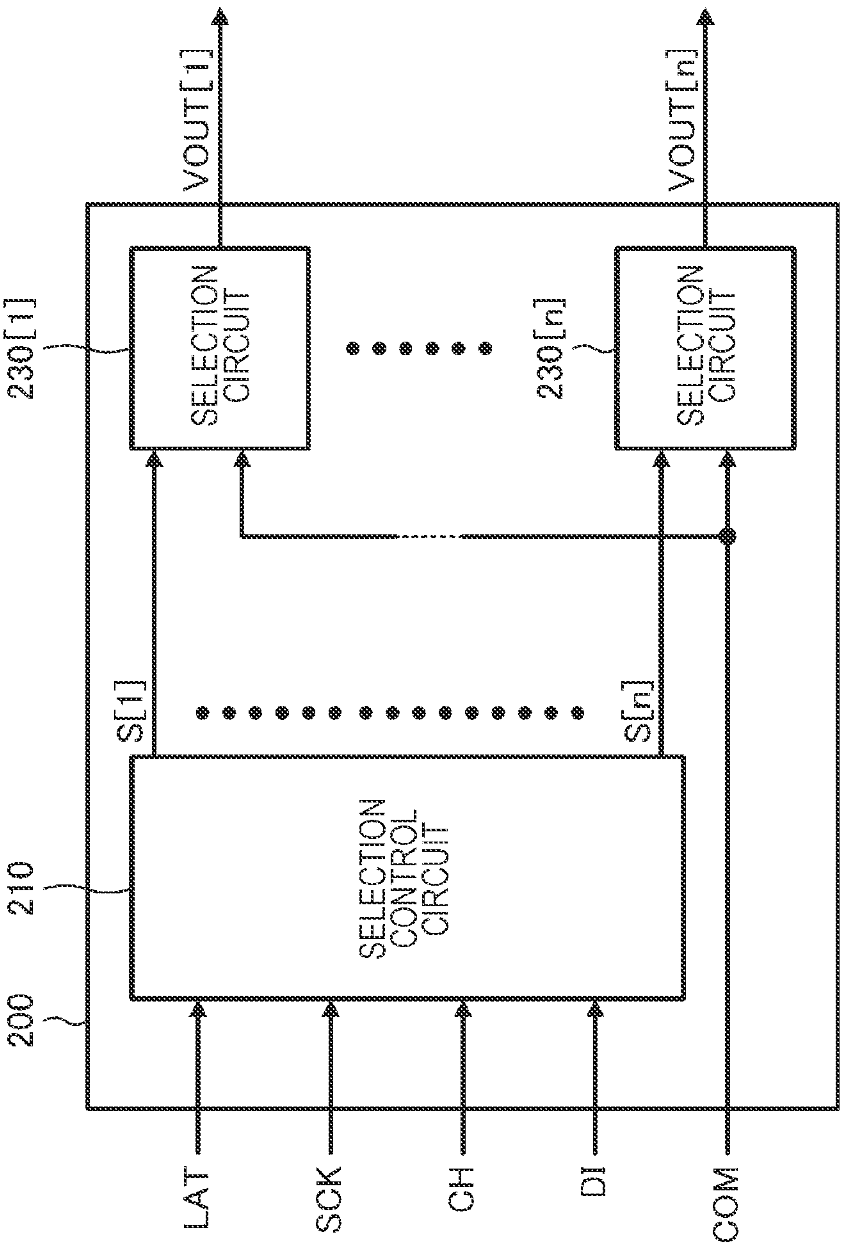
FIG. 4 is a view illustrating a configuration of a driving signal selection circuit.

Next, the configuration of the driving signal selection circuit 200 will be described. FIG. 4 is a view illustrating the configuration of the driving signal selection circuit 200. As illustrated in FIG. 4, the driving signal selection circuit 200 includes the selection control circuit 210 and selection circuits 230[1] to 230[*n*].

The clock signal SCK, the latch signal LAT, the change signal CH, and the head control signal DI are input to the selection control circuit 210. Then, in the selection control circuit 210, each of the selection circuits 230[1] to 230[*n*], which will be described later, outputs selection signals S[1] to S[n] for switching whether or not to output the driving signal COM as VOUT, based on the clock signal SCK, the latch signal LAT, the change signal CH, and the head control signal DI.

The selection circuits 230[1] to 230[*n*] are provided corresponding to the discharge sections 600[1] to 600[*n*]. Then, the selection circuits 230[1] to 230[*n*] switches whether or not to output the driving signal COM as VOUT [1] to VOUT[n], based on the selection signals S[1] to S[n] output by the selection control circuit 210.

Specifically, the selection signal S[1] output by the selection control circuit 210 and the driving signal COM are input to the selection circuit 230[1]. Then, the selection circuit 230[1] generates VOUT[1] by selecting or not selecting the driving signal COM based on the selection signal S[1], and outputs the VOUT[1] to the discharge section 600[1]. The selection signal S[n] output by the selection control circuit 210 and the driving signal COM are input to the selection circuit 230[*n*]. Then, the selection circuit 230[*n*] generates VOUT[n] by selecting or not selecting the driving signal COM based on the selection signal S[n], and outputs the VOUT[n] to the discharge section 600[*n*].

In other words, the selection signal S[i] output by the selection control circuit 210 and the driving signal COM are input to the selection circuit 230[*i*] (i is any one of 1 to n). Then, the selection circuit 230[*i*] generates VOUT[i] by selecting or not selecting the driving signal COM based on the selection signal S[i], and outputs the VOUT[i] to the discharge section 600[*i*].

Next, a specific example of the configuration of the selection control circuit 210 will be described. The selection control circuit 210 will be described assuming that the clock signal SCK, the latch signal LAT, the change signal CH, and the head control signal DI are input and the selection signals S[1] to S[n] are output.

Figure 5A:
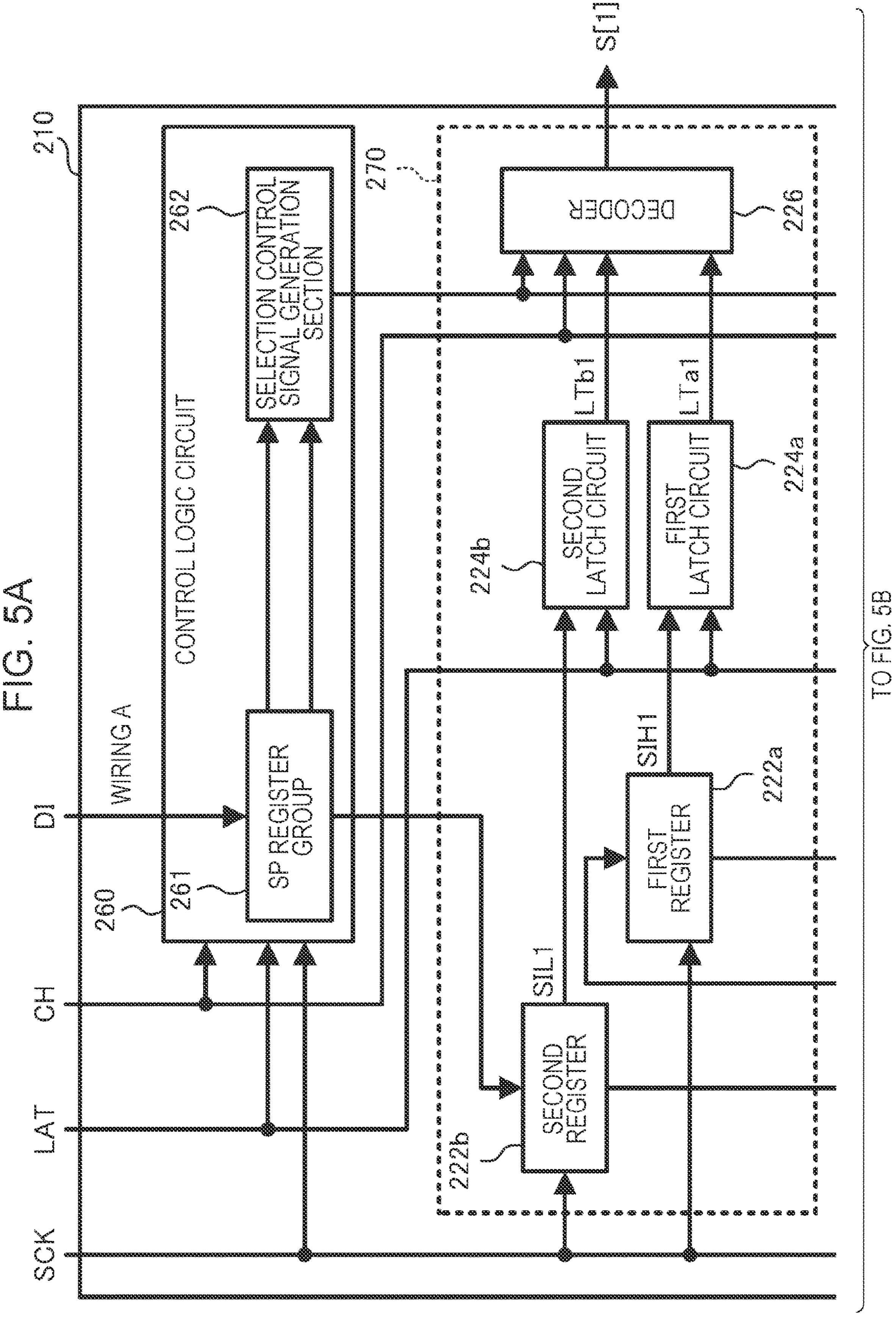
FIGS. 5A and 5B is a view illustrating an electrical configuration of a selection control circuit.
Figure 5B:
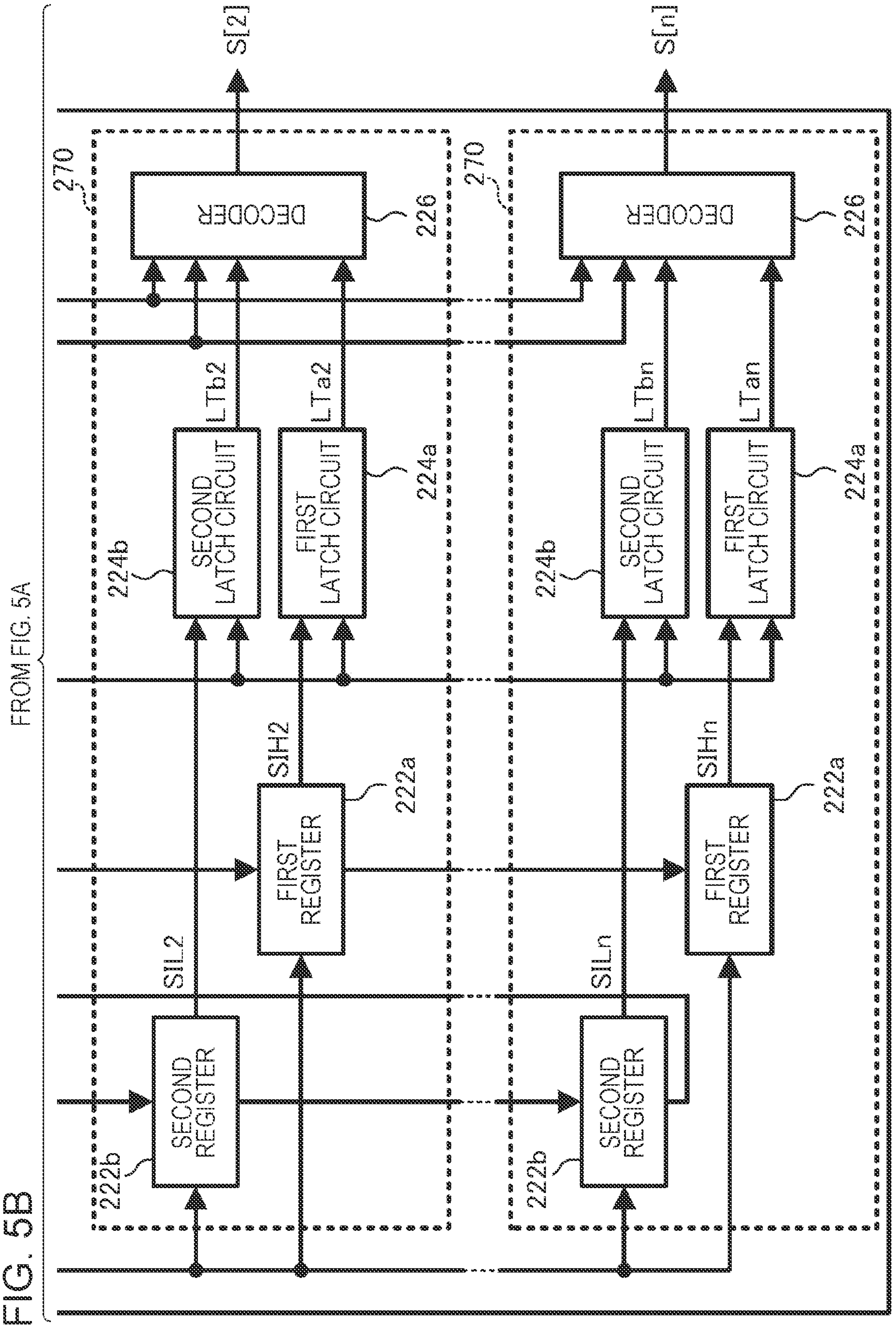

FIGS. 5A and 5B is a view illustrating an electrical configuration of the selection control circuit 210. As illustrated in FIGS. 5A and 5B, the selection control circuit 210 includes a control logic circuit 260 and n selection signal output sections 270 provided corresponding to n discharge sections 600. In other words, the selection control circuit 210 has n selection signal output sections 270 having the same number as the total number of discharge sections 600 that output VOUT. Then, the selection control circuit 210 generates the selection signals S[1] to S[n] corresponding to each of the discharge sections 600[1] to 600[*n*] and outputs the selection signals to the selection circuits 230[1] to 230[*n*], based on the head control signal DI propagated in synchronization with the clock signal SCK at the timing defined by the input latch signal LAT and the change signal CH.

Figure 6:
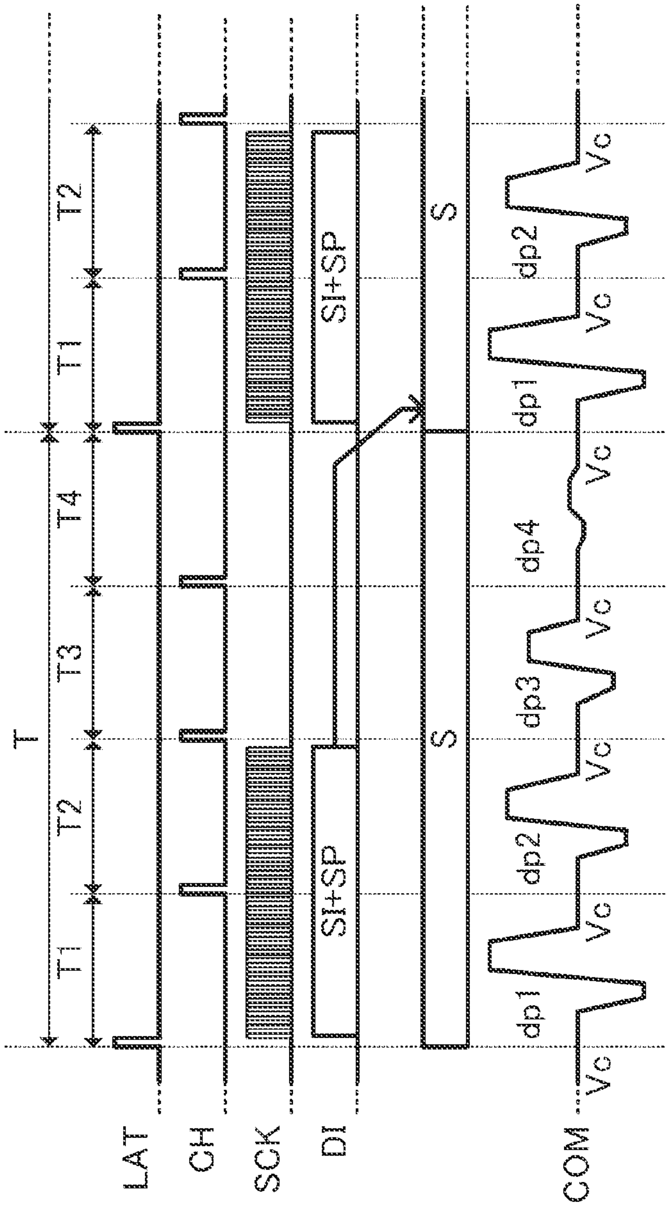
FIG. 6 is a view for describing a latch signal, a change signal, a clock signal, a head control signal, and a driving signal.

Here, in describing the electrical configuration of the selection control circuit 210, first, the latch signal LAT, the change signal CH, the clock signal SCK, the head control signal DI, and the driving signal COM input to the selection control circuit 210 will be described. FIG. 6 is a view for describing the latch signal LAT, the change signal CH, the clock signal SCK, the head control signal DI, and the driving signal COM.

The latch signal LAT is a pulse signal output by the control circuit 100 based on a signal indicating the scanning position of the carriage 20 on which the liquid discharge head 21 is mounted, which is output by the linear encoder 90. The liquid discharge head 21 discharges droplets to form dots on the medium between the pulses of this latch signal LAT. In other words, the liquid discharge head 21 discharges ink and forms dots on the medium P. Accordingly, the liquid discharge head 21 can discharge a predetermined amount of ink at a desired position of the medium P along the main scanning direction, and therefore, a dot having a desired size can be formed at a desired position of the medium P. The period from the rise of the latch signal LAT to the rise of the next latch signal corresponds to the printing cycle, which corresponds to a dot formation cycle T for forming dots on the medium P. In other words, the latch signal LAT is a signal indicating the scanning position of the liquid discharge head 21 with respect to the medium P, and is a signal defining the dot formation cycle T for forming dots on the medium P according to the scanning position of the liquid discharge head 21.

The change signal CH is a pulse signal that defines a switching timing at which the driving signal selection circuit 200 switches whether or not to supply the driving signal COM as VOUT to the discharge section 600, and the control circuit 100 outputs the change signal CH so as to divide the dot formation cycle T into a plurality of cycles. In the present embodiment, the change signal CH will be described as a pulse signal output three times in the dot formation cycle T. In other words, in the present embodiment, the change signal CH defines the dot formation cycle T as four periods, that is, a period T1, a period T2, a period T3, and a period T4.

Then, the driving signal selection circuit 200 switches whether or not to supply the driving signal COM as VOUT to the discharge section 600 in the period T1, and switches whether or not to supply the driving signal COM as VOUT to the discharge section 600 in the period T2. Similarly, the driving signal selection circuit 200 switches whether or not to supply the driving signal COM as VOUT to the discharge section 600 in the period T3, and switches whether or not to supply the driving signal COM as VOUT to the discharge section 600 in the period T4. As a result, in the dot formation cycle T, on the medium P, the ink discharged in the period T1, the ink discharged in the period T2, the ink discharged in the period T3, and the ink discharged in the period T4 are combined and one dot is formed.

As described above, the driving signal selection circuit 200 defines the dot formation cycle T in the period T1, the period T2, the period T3, and the period T4 by using the change signal CH, and switches whether or not to supply the driving signal COM as VOUT to the discharge section 600 in each of the period T1, the period T2, the period T3, and the period T4. Accordingly, the liquid discharge head 21 can form dots having various sizes on the medium P. As a result, multi-gradation dots can be formed on the medium P, and a high-definition image can be formed on the medium P. In other words, the change signal CH defines the switching timing of the driving signal selection circuit 200. There is a case where such a printing method is called a multi-gradation mode or a multi-value control.

In the present embodiment, the change signal CH is described as defining the dot formation cycle T as four periods T1, T2, T3, and T4, but the defined number of dot formation cycles T may be changed according to the material of the medium used, the physical characteristics of the ink, and further, the request of the user.

For example, one change signal CH may be used to define the dot formation cycle T as two, or four change signals CH may be used to define the dot formation cycle T as five.

The head control signal DI serially includes a discharge control signal SI which is a signal synchronized with the clock signal SCK, and individually defines the amount of ink discharged from the nozzle 651 of each of the n discharge sections 600 to the medium P; and a setting information signal SP for defining the relationship between the logic level of the selection signal S output in each of the period T1, the period T2, the period T3, and the period T4 defined by the change signal CH and the discharge control signal SI. The head control signal DI is supplied to the selection control circuit 210 in the dot formation cycle T before the latch signal LAT rises in synchronization with the clock signal SCK, and is held in a state corresponding to the n discharge sections 600 in the register included in the selection control circuit 210. Then, the head control signal DI held in the register is latched all at once at the rise of the latch signal LAT, and accordingly, the logic level of the selection signal S in the defined dot formation cycle T including the latch signal LAT is defined.

The driving signal COM includes at least one driving waveform, and is described here as a driving waveform. The driving signal COM serially includes a waveform in which a driving waveform dp1 disposed in the period T1 from the rise of the latch signal LAT to the first rise of the change signal CH, a driving waveform dp2 disposed in the period T2 from the first rise of the change signal CH to the second rise of the change signal CH, a driving waveform dp3 disposed in the period T3 from the second rise of the change signal CH to the third rise of the change signal CH, and a driving waveform dp4 disposed in the period T4 from the third rise of the change signal CH to the rise of the latch signal LAT, are continuous. The driving waveforms dp1 to dp4 are examples of discharge pulses.

The driving waveform dp3 is a waveform for discharging a small amount of ink from the nozzle 651, and the driving waveform dp2 is a waveform for discharging a medium amount of ink, which is larger than a small amount, from the nozzle 651. The driving waveform dp1 is a waveform for discharging a large amount of ink, which is larger than a medium amount, from the nozzle 651. The dp4 is a waveform that does not discharge the ink from the nozzle 651, and is a waveform for slightly vibrating the ink near the opening portion of the nozzle 651 to prevent an increase in ink viscosity.

Here, as illustrated in FIG. 6, the voltages at the start timing and end timing of each of the driving waveforms dp1, dp2, dp3, and dp4 are all common to a voltage Vc. In other words, each of the driving waveforms dp1, dp2, dp3, and dp4 starts at the voltage Vc and ends at the voltage Vc. Although the driving waveforms dp1, dp2, dp3, and dp4 are illustrated as different waveforms in FIG. 6, a plurality of the same waveforms may be included. In other words, the waveforms of the driving signal COM are not limited to the waveforms illustrated in FIG. 6, but various waveforms may be combined according to the moving speed of the carriage 20 on which the liquid discharge head 21 is mounted, the properties of the ink supplied to the liquid discharge head 21, the material of the medium P, and the like.

Figure 7:
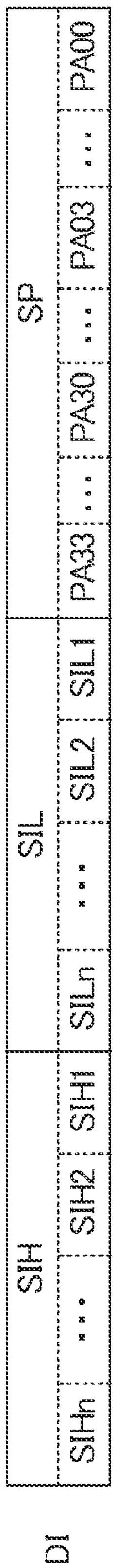
FIG. 7 is a view illustrating an example of a data configuration of the head control signal.

Here, the details of the head control signal DI including the discharge control signal SI and the setting information signal SP will be described with reference to FIG. 7. FIG. 7 is a view illustrating an example of a data configuration of the head control signal DI. As illustrated in FIG. 7, the head control signal DI includes the discharge control signal SI and the setting information signal SP, and the discharge control signal SI includes upper discharge data SIH and lower discharge data SIL.

Specifically, the discharge control signal SI is an n-bit serial signal including two-bit data of the upper discharge data SIH and the lower discharge data SIL for controlling the drive of the piezoelectric element 60 included in the discharge section 600, corresponding to each of n discharge sections 600.

Specifically, in the discharge control signal SI, as the n-bit upper discharge data SIH, the upper discharge data SIH corresponding to the discharge section 600[*n*], the upper discharge data SIH corresponding to the discharge section 600[*n*−1], . . . , and the upper discharge data SIH corresponding to the discharge section 600[1] are included serially in this order, and after the upper discharge data SIH, as the n-bit lower discharge data SIL, the lower discharge data SIL corresponding to the discharge section 600[*n*], the lower discharge data SIL corresponding to the discharge section 600[*n*−1], . . . , and the lower discharge data SIL corresponding to the discharge section 600[1] are included serially in this order.

Here, in the following description, there is a case where the upper discharge data SIH corresponding to the discharge section 600[*i*] is referred to as an upper discharge data SIHi, and the lower discharge data SIL corresponding to the discharge section 600[*i*] is referred to as a lower discharge data SILi.

Then, the amount of ink defined by the two bits of the upper discharge data SIHi and the lower discharge data SILi is discharged from the discharge section 600[*i*]. In other words, the discharge control signal SI defines the amount of ink discharged from the nozzle 651 by controlling the drive of the piezoelectric element 60 included in the discharge section 600. In other words, the discharge control signal SI is a signal for controlling the gradation of dots formed on the medium P by discharging ink from the nozzle 651. Here, in the following description, there is a case where the upper discharge data SIH and the lower discharge data SIL corresponding to the discharge section 600 are referred to as discharge data [SIH, SIL], and the upper discharge data SIHi and the lower discharge data SILi corresponding to the discharge section 600[*i*] are referred to as discharge data [SIHi, SILi].

The setting information signal SP is a serial signal including data for setting a rule for selecting a driving waveform applied to the piezoelectric element 60. Specifically, the setting information signal SP includes four types of setting information PA00 to PA03 indicating the driving pattern of the piezoelectric element 60 determined by the combination with the discharge data [SIH, SIL] included in the discharge control signal SI in the period T1 defined by the change signal CH; four types of setting information PA10 to PA13 indicating the driving pattern of the piezoelectric element 60 determined by the combination with the discharge data [SIH, SIL] included in the discharge control signal SI in the period T2; four types of setting information PA20 to PA23 indicating the driving pattern of the piezoelectric element 60 determined by the combination with the discharge data [SIH, SIL] included in the discharge control signal SI in the period T3; and four types of setting information PA30 to PA33 indicating the driving pattern of the piezoelectric element 60 determined by the combination with the discharge data [SIH, SIL] included in the discharge control signal SI in the period T4.

Specifically, the setting information PA is a total of 16 bits serially included in the order of PA33, PA32, PA31, PA30, PA23, PA22, PA21, PA20, PA13, PA12, PA11, PA10, PA03, PA02, PA01, and PA00. In other words, the setting information signal SP defines a state of the driving signal selection circuit 200 in the periods T1, T2, T3, and T4 defined by the change signal CH, and specifically, the relationship between the logic level of the selection signal S that defines the state of the selection circuits 230[1] to 230[*n*] which will be described later and the discharge data [SIH, SIL] included in the discharge control signal SI.

In the present embodiment, the setting information signal SP is described as a 16-bit signal, but may be a 16-bit or more signal or a 16-bit or less signal according to the number of periods defined by the change signal CH.

As described above, to the selection control circuit 210, the control circuit 100 outputs the latch signal LAT that defines the dot formation cycle T; the change signal CH that defines the switching timing at which the driving signal selection circuit 200 switches whether or not to supply the driving signal COM as VOUT to the discharge section 600; the discharge control signal SI that individually defines the amount of ink discharged by the n nozzles 651 to the medium P; the setting information signal SP for defining the relationship between the logic level of the selection signal S that defines the states of the selection circuits 230[1] to 230[*n*] in each of the periods T1, T2, T3, and T4 and the discharge control signal SI; and the clock signal SCK that propagates the head control signal DI serially including the discharge control signal SI and the setting information signal SP.

Returning to FIGS. 5A and 5B, the control logic circuit 260 includes an SP register group 261 and a selection control signal generation section 262. The SP register group 261 includes a plurality of serially coupled registers, and configures a so-called shift register that sequentially propagates the head control signal DI, which is input in synchronization with the clock signal SCK, to the subsequent registers. When the supply of the clock signal SCK is stopped, of the head control signal DI, the SP register group 261 holds the setting information PA33 to PA00 included in the setting information signal SP. The selection control signal generation section 262 latches the setting information PA33 to PA00 held in the SP register group 261 at the rise of the latch signal LAT, and translates the latched setting information PA33 to PA00 to generate the selection signals Q1, Q2, Q3, and Q4 and output the generated selection signals to a decoder 226 included in each of the n selection signal output sections 270.

Here, the selection signal Q1 is a signal that defines the logic level of the selection signal S output from the selection control circuit 210 including the setting information PA00, PA01, PA02, and PA03 in the period T1, the selection signal Q2 is a signal that defines the logic level of the selection signal S output from the selection control circuit 210 including the setting information PA10, PA11, PA12, and PA13 in the period T2, the selection signal Q3 is a signal that defines the logic level of the selection signal S output from the selection control circuit 210 including the setting information PA20, PA21, PA22, and PA23 in the period T3, and the selection signal Q4 is a signal that defines the logic level of the selection signal S output from the selection control circuit 210 including the setting information PA30, PA31, PA32, and PA33 in the period T4.

In the following description, there is a case where the selection signal Q1 including the setting information PA00, PA01, PA02, and PA03 is referred to as the selection signal Q1 [PA00, PA01, PA02, PA03], the selection signal Q2 including the setting information PA10, PA11, PA12, and PA13 is referred to as the selection signal Q2 [PA10, PA11, PA12, PA13], the selection signal Q3 including the setting information PA20, PA21, PA22, and PA23 is referred to as the selection signal Q3 [PA20, PA21, PA22, PA23], and the selection signal Q4 including PA30, PA31, PA32, and PA33 is referred to as the selection signal Q4 [PA30, PA31, PA32, PA33].

Each of the n selection signal output sections 270 has a first register 222*a*, a second register 222*b*, a first latch circuit 224*a*, a second latch circuit 224*b*, and a decoder 226.

The second register 222*b* included in each of the n selection signal output sections 270 is serially coupled to the subsequent stage of the SP register group 261 including the plurality of registers, and the first register 222*a* included in each of the n selection signal output sections 270 is serially coupled to the subsequent stage of the n second registers 222*b* which are serially coupled. Specifically, the second register 222*b* included in the selection signal output section 270 corresponding to the discharge section 600[1] is coupled to the subsequent stage of the SP register group 261.

Further, to the subsequent stage of the second register 222*b* included in the selection signal output section 270 corresponding to the discharge section 600[1], the second register 222*b* included in the selection signal output section 270 corresponding to the discharge section 600[2], the second register 222*b* included in the selection signal output section 270 corresponding to the discharge section 600[3], . . . , and the second register 222*b* included in the selection signal output section 270 corresponding to the discharge section 600[*n*] are serially coupled in order.

Then, the first register 222*a* included in the selection signal output section 270 corresponding to the discharge section 600[1] is coupled to the subsequent stage of the second register 222*b* included in the selection signal output section 270 corresponding to the discharge section 600[*n*]. Further, to the subsequent stage of the first register 222*a* included in the selection signal output section 270 corresponding to the discharge section 600[1], the first register 222*a* included in the selection signal output section 270 corresponding to the discharge section 600[2], the first register 222*a* included in the selection signal output section 270 corresponding to the discharge section 600[3], . . . , and, the first register 222*a* included in the selection signal output section 270 corresponding to the discharge section 600[*n*] are serially coupled in order.

In other words, the SP register group 261, the n second registers 222*b* included in each of the n selection signal output sections 270, and the n first registers 222*a* included in each of the n selection signal output sections 270 configure the shift register. The head control signal DI input to the SP register group 261 is propagated to the subsequent stage in the order of the n second registers 222*b* included in each of the n selection signal output sections 270 in synchronization with the clock signal SCK, and the n first registers 222*a* included in each of the n selection signal output sections 270. After this, when the supply of the clock signal SCK is stopped, the lower discharge data SILi corresponding to the discharge section 600[*i*] is held in the second register 222*b* included in the selection signal output section 270 corresponding to the discharge section 600[*i*], and the upper discharge data SIHi corresponding to the discharge section 600[*i*] is held in the first register 222*a* included in the selection signal output section 270 corresponding to the discharge section 600[*i*].

Here, the data size that can be held in the SP register group 261 is an example of a first data size, the data size that can be held in the second register 222*b* is a second data size, and the data size that can be held in the first register 222*a* is a third data size.

The upper discharge data SIH held in the first register 222*a* included in each of the n selection signal output sections 270 is latched by the corresponding first latch circuit 224*a* at the rise of the latch signal LAT, and the lower discharge data SIL held in the second register 222*b* included in each of the n selection signal output sections 270 is latched by the corresponding second latch circuit 224*b* at the rise of the latch signal LAT. The first latch circuit 224*a* outputs the latched upper discharge data SIH to the decoder 226 as latch data LTa, and the second latch circuit 224*b* outputs the latched lower discharge data SIL to the decoder 226 as latch data LTb.

Here, the head control signal DI is an example of head control data. Further, a wiring A for transmitting the head control signal DI to the SP register group 261, the second register 222*b*, and the first register 222*a* is an example of a first wiring. Further, the SP register group 261 is an example of a first region, the second register 222*b* is an example of a second region, and the first register 222*a* is an example of a third region.

Here, the head control signal DI held in the SP register group 261 is an example of first head control data, the head control signal DI held in the second register 222*b* is an example of second head control data, and the head control signal DI held in the first register 222*a* is an example of third head control data.

In the following description, there is a case where the latch data LTa output by the first latch circuit 224*a* included in the selection signal output section 270 corresponding to the discharge section 600[*i*] is referred to as latch data LTai, and the latch data LTb output by the second latch circuit 224*b* included in the selection signal output section 270 corresponding to the discharge section 600[*i*] is referred to as latch data LTbi. Further, there is a case where the latch data LTa and LTb are referred to as latch data [LTa, LTb], and the latch data [LTa, LTb] corresponding to the discharge section 600[*i*] is referred to as latch data [LTai, LTbi].

The selection signal Q1 [PA00, PA01, PA02, PA03], the selection signal Q2 [PA10, PA11, PA12, PA13], the selection signal Q3 [PA20, PA21, PA22, PA23], and the selection signal Q4 [PA30, PA31, PA32, PA33] which are output by the selection control signal generation section 262, and the latch data [LTa, LTb] corresponding to the discharge data [SIH, SIL] are input to the decoder 226. Then, the decoder 226 generates the selection signal S based on the selection signals Q1 and Q2 and the latch data [LTa, LTb], and outputs the selection signal S to the corresponding selection circuit 230.

Figures 8, 9:
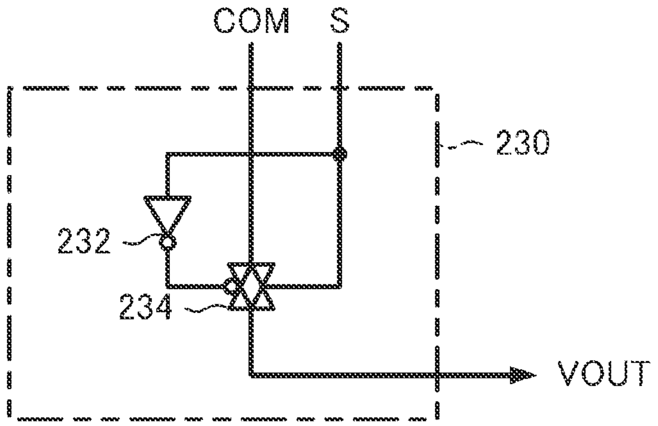
FIG. 8 is a view illustrating decoding contents of a decoder.
FIG. 9 is a view illustrating a configuration of a selection circuit that corresponds to one discharge section.

FIG. 8 is a view illustrating decoding contents of the decoder 226. As illustrated in FIG. 8, the decoder 226 outputs the logic level defined by the selection signal Q1 [PA00, PA01, PA02, PA03] as the selection signal S in the period T1, outputs the logic level defined by the selection signal Q2 [PA10, PA11, PA12, PA13] as the selection signal S in the period T2, outputs the logic level defined by the selection signal Q3 [PA20, PA21, PA22, PA23] as the selection signal S in the period T3, and outputs the logic level defined by the selection signal Q4 [PA30, PA31, PA32, PA33] as the selection signal S in the period T4.

In other words, the change signal CH that defines the periods T1, T2, T3, and T4 defines the switching timing at which the driving signal selection circuit 200 executes switching whether or not to supply the driving signal COM to the piezoelectric element 60 based on the selection signal Q1 [PA00, PA01, PA02, PA03], executes switching whether or not to supply the driving signal COM to the piezoelectric element 60 based on the selection signal Q2 [PA10, PA11, PA12, PA13], executes switching whether or not to supply the driving signal COM to the piezoelectric element 60 based on the selection signal Q3 [PA20, PA21, PA22, PA23], and executes switching whether or not to supply the driving signal COM to the piezoelectric element 60 based on the selection signal Q4 [PA30, PA31, PA32, PA33].

Specifically, when the discharge data [SIH, SIL]=[0, 0] is input in the dot formation cycle T, according to the contents defined by the selection signals Q1, Q2, Q3, and Q4, the decoder 226 outputs the logic level of the setting information PA00 as the selection signal S in the period T1, outputs the logic level of the setting information PA10 as the selection signal S in the period T2, outputs the logic level of the setting information PA20 as the selection signal S in the period T3, and outputs the logic level of the setting information PA30 as the selection signal S in the period T4.

When the discharge data [SIH, SIL]=[0, 1] is input in the dot formation cycle T, according to the contents defined by the selection signals Q1, Q2, Q3, and Q4, the decoder 226 outputs the logic level of the setting information PA01 as the selection signal S in the period T1, outputs the logic level of the setting information PA11 as the selection signal S in the period T2, outputs the logic level of the setting information PA21 as the selection signal S in the period T3, and outputs the logic level of the setting information PA31 as the selection signal S in the period T4.

When the discharge data [SIH, SIL]=[1, 0] is input in the dot formation cycle T, according to the contents defined by the selection signals Q1, Q2, Q3, and Q4, the decoder 226 outputs the logic level of the setting information PA02 as the selection signal S in the period T1, outputs the logic level of the setting information PA12 as the selection signal S in the period T2, outputs the logic level of the setting information PA22 as the selection signal S in the period T3, and outputs the logic level of the setting information PA32 as the selection signal S in the period T4.

When the discharge data [SIH, SIL]=[1, 1] is input in the dot formation cycle T, according to the contents defined by the selection signals Q1, Q2, Q3, and Q4, the decoder 226 outputs the logic level of the setting information PA03 as the selection signal S in the period T1, outputs the logic level of the setting information PA13 as the selection signal S in the period T2, outputs the logic level of the setting information PA23 as the selection signal S in the period T3, and outputs the logic level of the setting information PA33 as the selection signal S in the period T4.

As described above, the selection control circuit 210 outputs the selection signals S[1] to S[*n*] for controlling the states of the selection circuits 230[1] to 230[*n*] corresponding to each of the discharge sections 600[1] to 600[*n*] based on the clock signal SCK, the latch signal LAT, the change signal CH, and the head control signal DI.

Next, the configuration of the selection circuits 230[1] to 230[*n*] will be described. Here, the selection circuits 230[1] to 230[*n*] all have the same configuration. Therefore, when it is not necessary to distinguish the selection circuits 230[1] to 230[*n*], there is a case of being simply referred to as the selection circuit 230. Then, it will be described that the selection signal S among the selection signals S[1] to S[n] is input to the selection circuit 230.

FIG. 9 is a view illustrating a configuration of the selection circuit 230 that corresponds to one discharge section 600. As illustrated in FIG. 9, the selection circuit 230 has an inverter 232, which is a NOT circuit, and a transfer gate 234. Here, the selection circuit 230 is an example of a switch circuit. Further, the wiring for transmitting the driving signal COM is an example of a second wiring.

While the selection signal S output by the selection control circuit 210 is input to a positive control end, which is not marked with a circle, at the transfer gate 234, the selection signal S is logically inverted by the inverter 232 and is also input to a negative control end marked with a circle at the transfer gate 234. The driving signal COM is supplied to the input end of the transfer gate 234. Specifically, the transfer gate 234 conducts the input end and the output end to each other when the input selection signal S is the H level, and does not conduct the input end and the output end to each other when the input selection signal S is the L level.

Then, when the input selection signal S is the H level, the transfer gate 234 outputs VOUT from the output end of the transfer gate 234. In other words, when the input selection signal S is the H level, the transfer gate 234 is turned on, and when the input selection signal S is the L level, the transfer gate 234 is turned off.

In the liquid discharge apparatus 1 of the present embodiment, the control mechanism 10 has a discharge control period for controlling the liquid discharge head 21 that discharges ink from the nozzle 651; and a non-discharge control period for controlling the liquid discharge head 21 such that ink is not discharged from the nozzle 651. Then, the control mechanism 10 reduces the concern that the malfunction occurs in the liquid discharge apparatus 1 even in a case of executing the control of the driving signal selection circuit 200 included in the liquid discharge head 21 using the clock signal SCK, the latch signal LAT, the change signal CH, and the head control signal DI, which are common signals, by outputting the head control signal DI including different data in the discharge control period and in the non-discharge control period.

As described above, the driving signal selection circuit 200 according to the present embodiment selects or does not select the driving signal COM based on the clock signal SCK, the latch signal LAT, the change signal CH, and the head control signal DI, which are input, to generate VOUT [1] to VOUT[n], and output the VOUT[1] to VOUT[n] to each of the corresponding discharge sections 600[1] to 600[*n*] to execute the printing.

In other words, the control mechanism 10 controls the driving signal selection circuit 200 by the clock signal SCK, the latch signal LAT, the change signal CH, and the head control signal DI to supply VOUT[1] to VOUT[n] to each of the discharge sections 600[1] to 600[*n*] based on the driving signal COM, and discharge the ink from the corresponding discharge sections 600[1] to 600[*n*].

4. Multi-gradation Mode

Next, the operation when the control mechanism 10 controls the liquid discharge head 21 during the discharge control period and performs printing in the multi-gradation mode will be described. The multi-gradation mode is an example of a first print mode.

Figure 10:
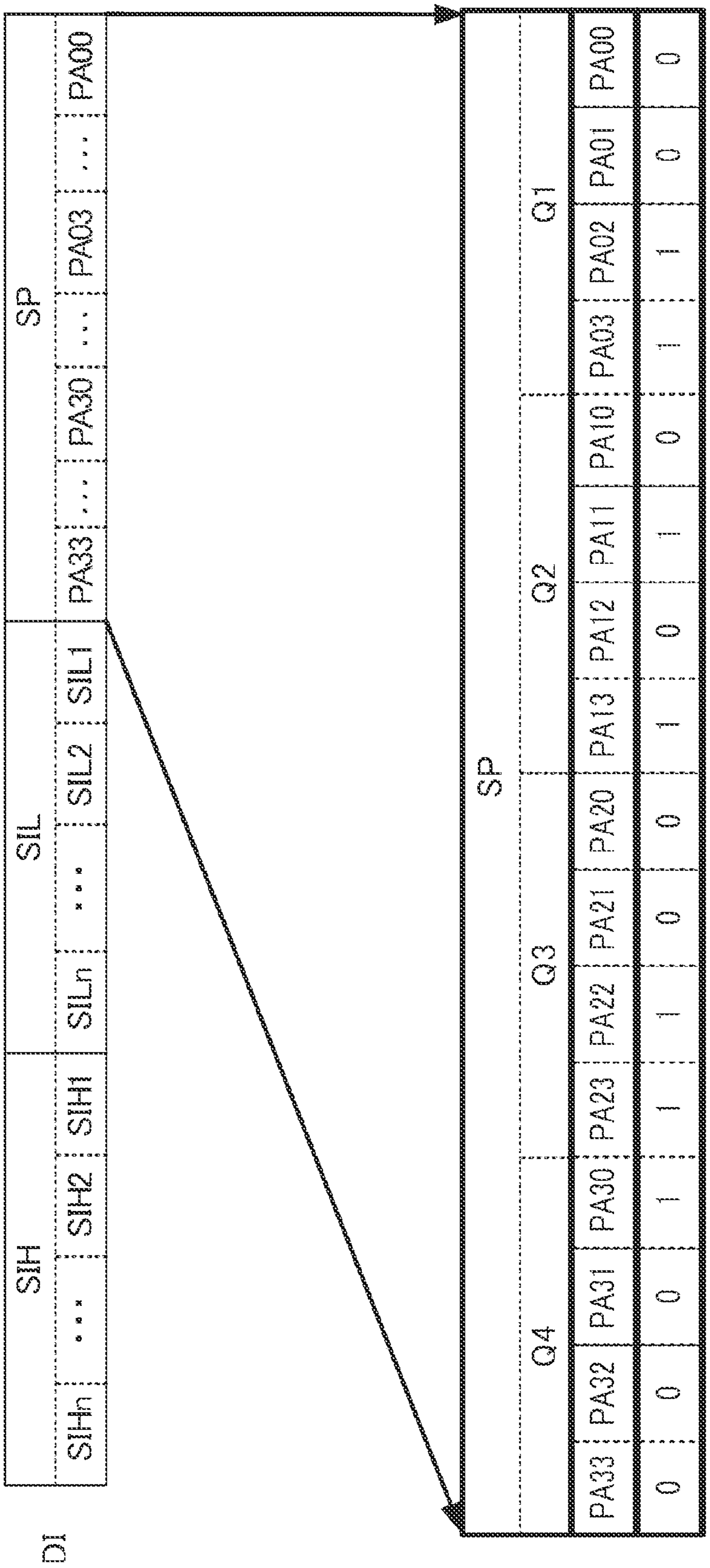
FIG. 10 is a view illustrating an example of a head control signal output by a control mechanism during a discharge control period.

FIG. 10 is a view illustrating an example of the head control signal DI output by the control mechanism 10 during the discharge control period. Here, the discharge control signal SI included in each of the head control signals DI is a signal that defines the amount of ink discharged for each of the n nozzles 651, and the logic level is appropriately changed during the discharge control period. In other words, the discharge data [SIH, SIL] included in the discharge control signal SI is either 0 or 1 according to the amount of ink discharged from the corresponding nozzle 651 in the dot formation cycle T. In the following description, “1” means an H level signal and “0” means an L level signal.

As illustrated in FIG. 10, during the discharge control period, the control mechanism 10 outputs the head control signal DI including the setting information PA33 to PA00 that configure the setting information signal SP to the selection control circuit 210.

Specifically, the setting information in which each of the setting information PA33, PA32, PA31, and PA30 is “0”, “0”, “0”, and “1” is output to the selection control circuit 210. After this, the setting information in which each of the setting information PA23, PA22, PA21, and PA20 is “1”, “1”, “0”, and “0” is output to the selection control circuit 210. After this, the setting information in which each of the setting information PA13, PA12, PA11, and PA10 is “1”, “0”, “1”, and “0” is output to the selection control circuit 210. After this, the setting information in which each of the setting information PA03, PA02, PA01, and PA00 is “1”, “1”, “0”, and “0” is output to the selection control circuit 210.

Therefore, the selection control signal generation section 262 included in the control logic circuit 260 included in the selection control circuit 210 generates the selection signals Q1 to Q4 based on the setting information PA and outputs the selection signals Q1 to Q4 to the decoder 226. Specifically, the selection control circuit 210 generates the selection signal Q1 [PA00, PA01, PA02, PA03]=[0, 0, 1, 1], the selection signal Q2 [PA10, PA11, PA12, PA13]=[0, 1, 0, 1], the selection signal Q3 [PA20, PA21, PA22, PA23]=[0, 0, 1, 1], and the selection signal Q4 [PA30, PA31, PA32, PA33] =[1, 0, 0, 0], and outputs the generated signals to the decoder 226.

FIG. 11 is a view illustrating decoding contents in the decoder 226 included in the selection control circuit 210 during the discharge control period. As illustrated in FIG. 11, the decoder 226 outputs the selection signal S corresponding to the discharge data [SIH, SIL].

Specifically, when the discharge data [SIH, SIL]=[0, 0] is input, the decoder 226 outputs the L level selection signal S in the period T1, the L level selection signal S in the period T2, the L level selection signal S in the period T3, and the H level selection signal S in the period T4. When the discharge data [SIH, SIL]=[0, 1] is input, the decoder 226 outputs the L level selection signal S in the period T1, the H level selection signal S in the period T2, the L level selection signal S in the period T3, and the L level selection signal S in the period T4.

When the discharge data [SIH, SIL]=[1, 0] is input, the decoder 226 outputs the H level selection signal S in the period T1, the L level selection signal S in the period T2, the H level selection signal S in the period T3, and the L level selection signal S in the period T4. When the discharge data [SIH, SIL]=[1, 1] is input, the decoder 226 outputs the H level selection signal S in the period T1, the H level selection signal S in the period T2, the H level selection signal S in the period T3, and the L level selection signal S in the period T4.

Figure 12:
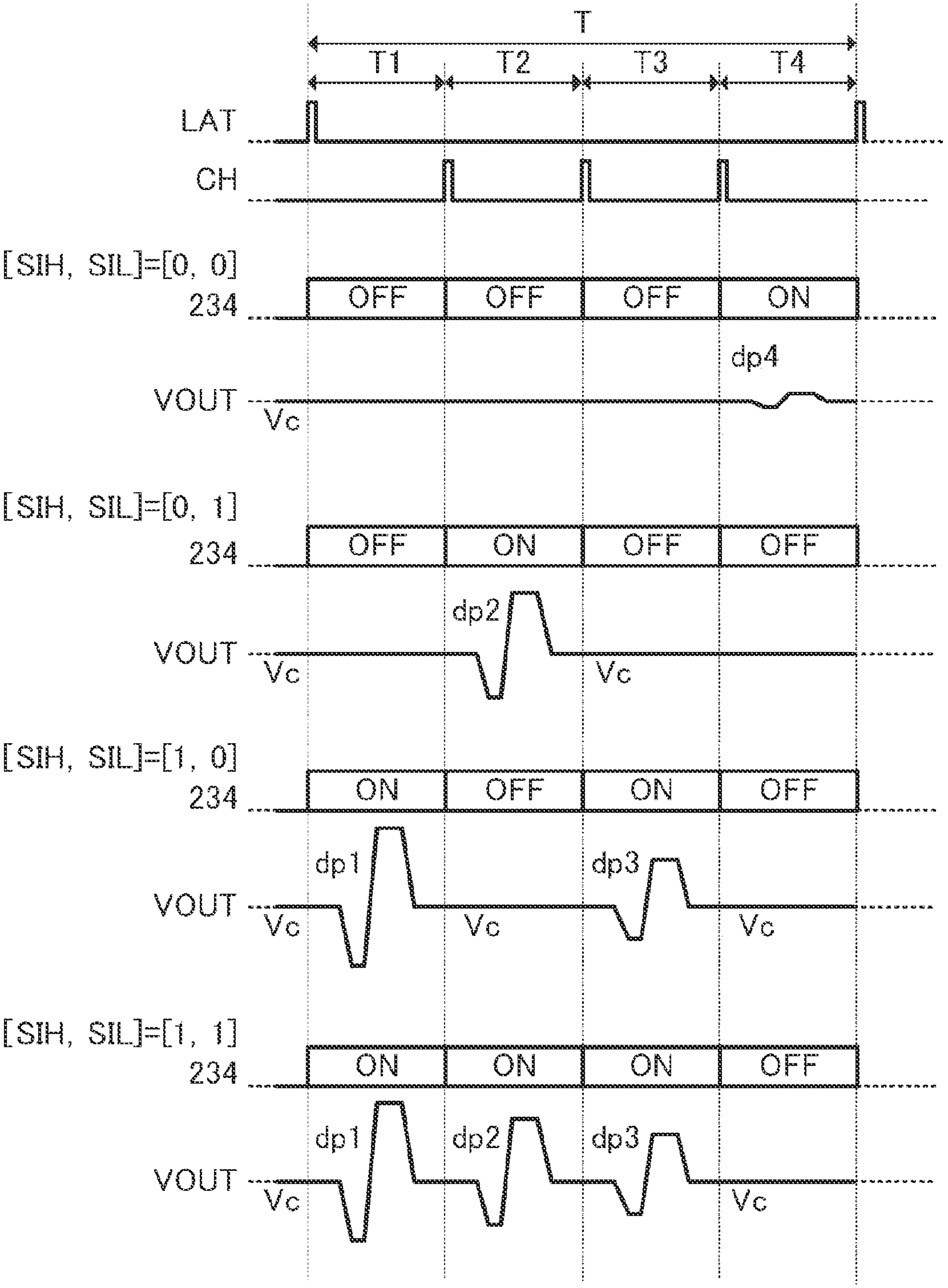
FIG. 12 is a view for describing an operation of the selection circuit when a selection signal illustrated in FIG. 11 is supplied.

FIG. 12 is a view for describing an operation of the selection circuit 230 when the selection signal S illustrated in FIG. 11 is supplied. The transfer gate 234 is turned on or off according to the selection signal S supplied according to the discharge data [SIH, SIL].

Specifically, when the discharge data [SIH, SIL]=[0, 0], the transfer gate 234 is turned off in the period T1, turned off in the period T2, turned off in the period T3, and turned on in the period T4. When the discharge data [SIH, SIL]=[0, 1], the transfer gate 234 is turned off in the period T1, turned on in the period T2, turned off in the period T3, and turned off in the period T4.

When the discharge data [SIH, SIL]=[1, 0], the transfer gate 234 is turned on in the period T1, turned off in the period T2, turned on in the period T3, and turned off in the period T4. When the discharge data [SIH, SIL]=[1, 1], the transfer gate 234 is turned on in the period T1, turned on in the period T2, turned on in the period T3, and turned off in the period T4.

Subsequently, the dots formed on the medium P will be described for each discharge data [SIH, SIL]. When the discharge data [SIH, SIL]=[0, 0], the corresponding piezoelectric element 60 is supplied with a constant waveform at the voltage Vc as VOUT in the periods T1, T2, and T3, and is supplied with the driving waveform dp4 as VOUT in the period T4. In this case, only a slight vibration occurs in the vicinity of the nozzle 651, and ink is not discharged from the nozzle 651. Therefore, dots are not formed on the medium P.

When the discharge data [SIH, SIL]=[0, 1], the corresponding piezoelectric element 60 is supplied with a constant waveform at the voltage Vc as VOUT in the periods T1, T3, and T4, and is supplied with the driving waveform dp2 as VOUT in the period T2. In this case, a medium amount of ink is discharged once from the nozzle 651 and lands on the medium P. Therefore, small dots are formed on the medium P.

When the discharge data [SIH, SIL]=[1, 0], the corresponding piezoelectric element 60 is supplied with a constant waveform at the voltage Vc as VOUT in the periods T2 and T4, is supplied with the driving waveform dp1 as VOUT in the period T1, and is supplied with the driving waveform dp3 as VOUT in the period T3. In this case, a large amount of ink and a small amount of ink are discharged from the nozzle 651 and land on the medium P. After this, a large amount of ink and a small amount of ink, which landed on the medium P, are combined to form medium dots on the medium P.

When the discharge data [SIH, SIL]=[1, 1], the corresponding piezoelectric element 60 is supplied with a constant waveform at the voltage Vc as VOUT in the period T4, is supplied with the driving waveform dp1 as VOUT in the period T1, is supplied with the driving waveform dp2 as VOUT in the period T2, and is supplied with the driving waveform dp3 as VOUT in the period T3. In this case, a large amount of ink, a medium amount of ink, and a small amount of ink are discharged from the nozzle 651 and land on the medium P. After this, a large amount of ink, a medium amount of ink, and a small amount of ink, which landed on the medium P, are combined to form large dots on the medium P.

As described above, during the discharge control period, the control mechanism 10 outputs the head control signal DI as illustrated in FIG. 10 to the liquid discharge head 21 such that the liquid discharge head 21 forms four types of dots, that is, large dots, medium dots, small dots, and non-recording, on the medium P based on the discharge control signal SI and the setting information signal SP.

In the multi-gradation mode of the present embodiment, in the driving signal selection circuit 200, the dot formation cycle T is defined as four periods T1 to T4 by the change signal CH, and switches whether or not to supply the driving signal COM as VOUT to the discharge section 600 in each of the periods. Accordingly, the liquid discharge head 21 can form four types of dots including non-recording on the medium P. As a result, the liquid discharge apparatus 1 can perform printing in four gradations, and can form a high-definition image on the medium P. The gradation number 4 in the multi-gradation mode of the present embodiment is an example of a first gradation number.

In the multi-gradation mode of the present embodiment, an example of forming four types of dots, that is, large dots, medium dots, small dots, and non-recording on the medium P is exemplified, but for example, three types of dots, that is, large dots, medium dots, and non-recording may be formed on the medium P. In this case, the liquid discharge apparatus 1 can perform printing in three gradations. In general, in a case of printing in the multi-gradation mode, the gradation number is 3 or more.

5. Binary Mode

Figure 13:
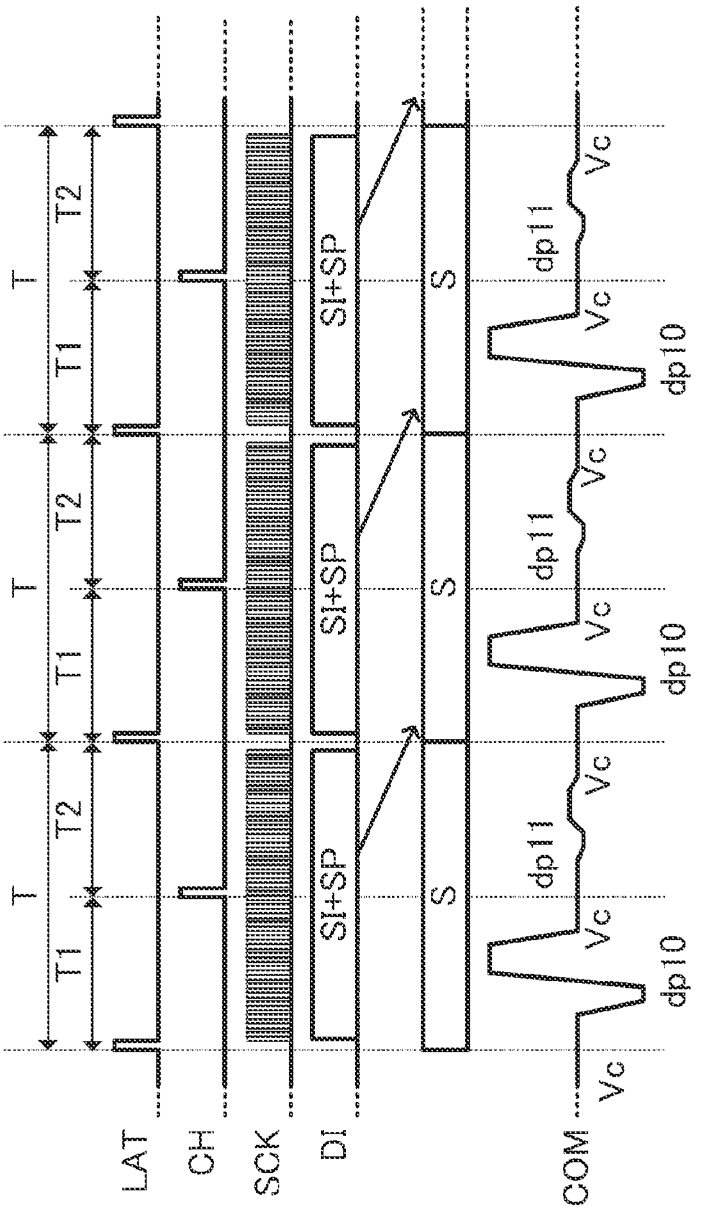
FIG. 13 is a view for describing the latch signal, the change signal, the clock signal, the head control signal, and the driving signal in a binary mode.

FIG. 13 is a view illustrating an example of the latch signal LAT, the change signal CH, the clock signal SCK, the head control signal DI, and the driving signal COM which are input to the selection control circuit 210, in the binary mode. Here, an example is illustrated in which the driving signal COM is configured with two types of driving waveforms, and the dot formation cycle T is defined as two periods T1 and T2 by one change signal CH. The binary mode is an example of a second print mode.

A driving waveform dp10 is a waveform for discharging the medium amount of ink from the nozzle 651, and a driving waveform dp11 is a waveform that does not discharge the ink from the nozzle 651, and is a waveform for slightly vibrating the ink in the vicinity of the opening portion of the nozzle 651 to prevent an increase in ink viscosity. It is switched whether or not to supply these two types of driving waveforms dp10 and dp11 as VOUT to the discharge section 600, and it is controlled whether or not to discharge ink from the nozzle 651. In other words, in the binary mode, the gradation number is 2 because the two states, that is, a state of discharging ink from the nozzle 651 and a state of not discharging ink, are controlled. The gradation number 2 in the binary mode in the present embodiment is an example of a second gradation number.

Figure 14:
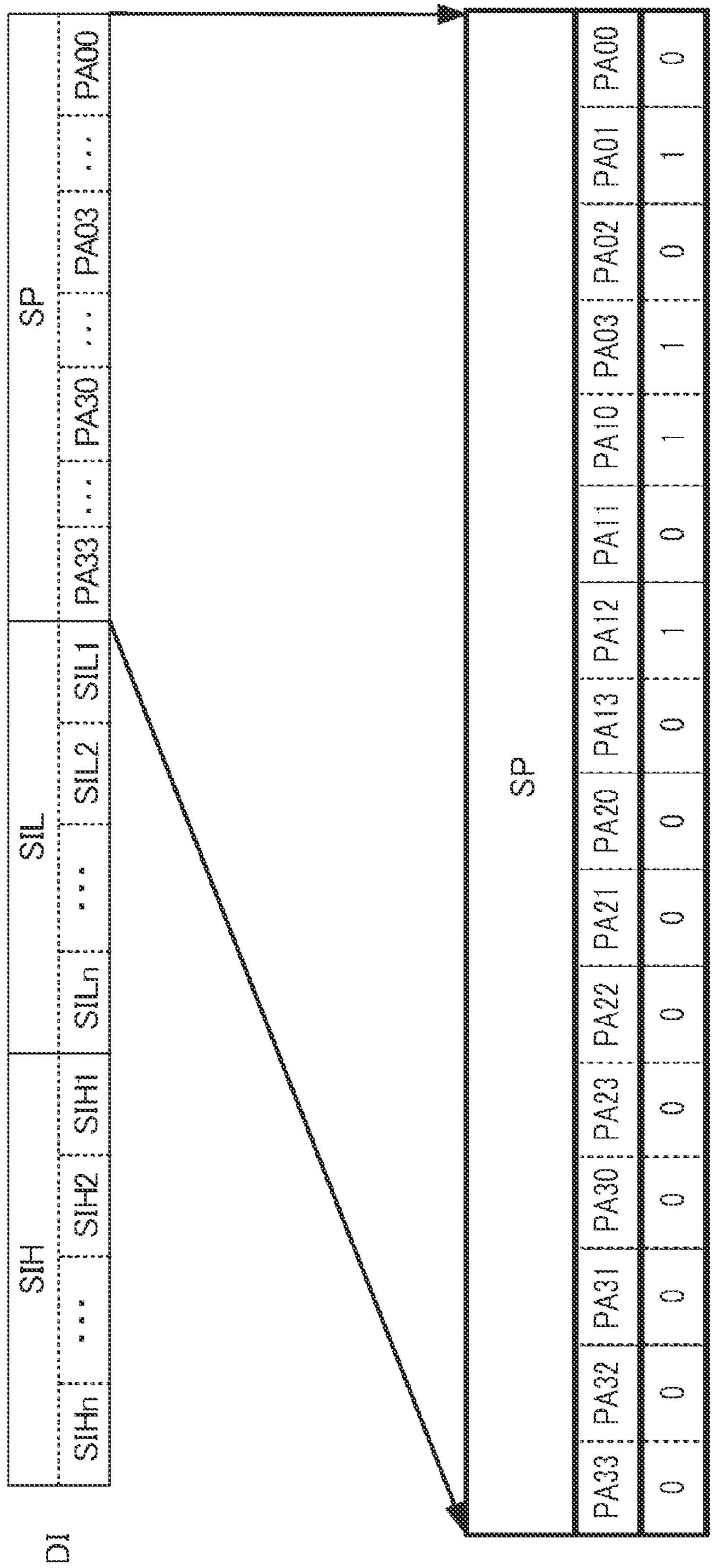
FIG. 14 is a view illustrating an example of the head control signal output by the control mechanism during the discharge control period in the binary mode.

FIG. 14 is a view illustrating an example of the head control signal DI output by the control mechanism 10 during the discharge control period in the binary mode. Here, the discharge control signal SI included in each of the head control signals DI is a signal that defines the amount of ink discharged for each of the n nozzles 651, and the logic level is appropriately changed during the discharge control period. In other words, the discharge data [SIH, SIL] included in the discharge control signal SI is either 0 or 1 according to the amount of ink discharged from the corresponding nozzle 651 in the dot formation cycle T. In the following description, "1" means an H level signal and "0" means an L level signal.

As illustrated in FIG. 14, during the discharge control period, the control mechanism 10 outputs the head control signal DI including the setting information PA33 to PA00 that configure the setting information signal SP to the selection control circuit 210. In this case, the setting information signal SP is 16 bits. Here, the setting information signal SP including the setting information PA33 to PA00 is an example of a setting information signal group.

Specifically, the setting information in which each of the setting information PA33, PA32, PA31, and PA30 is "0", "0", "0", and "0" is output to the selection control circuit 210. After this, the setting information in which each of the setting information PA23, PA22, PA21, and PA20 is "0", "0", "0", and "0" is output to the selection control circuit 210. After this, the setting information in which each of the setting information PA13, PA12, PA11, and PA10 is "0", "1", "0", and "1" is output to the selection control circuit 210. After this, the setting information in which each of the setting information PA03, PA02, PA01, and PA00 is "1", "0", "1", and "0" is output to the selection control circuit 210.

Therefore, the selection control signal generation section 262 included in the control logic circuit 260 included in the selection control circuit 210 generates the selection signals Q1 to Q4 based on the setting information PA and outputs the selection signals Q1 to Q4 to the decoder 226. Specifically, the selection control circuit 210 generates the selection signal Q1 [PA00, PA01, PA02, PA03]=[0, 1, 0, 1], the selection signal Q2 [PA10, PA11, PA12, PA13]=[1, 0, 1, 0], the selection signal Q3 [PA20, PA21, PA22, PA23]=[0, 0, 0, 0], and the selection signal Q4 [PA30, PA31, PA32, PA33]=[0, 0, 0, 0], and outputs the generated signals to the decoder 226.

Here, since the setting information signal SP is set such that the bit data of the setting information PA00 to PA03 and the setting information PA10 to PA13 are inverted, the bit data of the selection signal Q1 and the selection signal Q2 are inverted. Here, the setting information PA00 to PA03 are examples of a first setting information signal, and the setting information PA10 to PA13 are examples of a second setting information signal.

FIG. 15 is a view illustrating decoding contents in the decoder 226 included in the selection control circuit 210 during the discharge control period. As illustrated in FIG. 15, the decoder 226 outputs the selection signal S corresponding to the discharge data [SIH, SIL].

Specifically, when the discharge data [SIH, SIL]=[0, 0] is input, the decoder 226 outputs the L level selection signal S in the period T1 and the H level selection signal S in the period T2, and when the discharge data [SIH, SIL]=[0, 1] is input, the decoder 226 outputs the H level selection signal S in the period T1 and the L level selection signal S in the period T2.

When the discharge data [SIH, SIL]=[1, 0] is input, the decoder 226 outputs the L level selection signal S in the period T1 and the H level selection signal S in the period T2. When the discharge data [SIH, SIL]=[1, 1] is input, the decoder 226 outputs the H level selection signal S in the period T1 and the L level selection signal S in the period T2.

Figure 16:
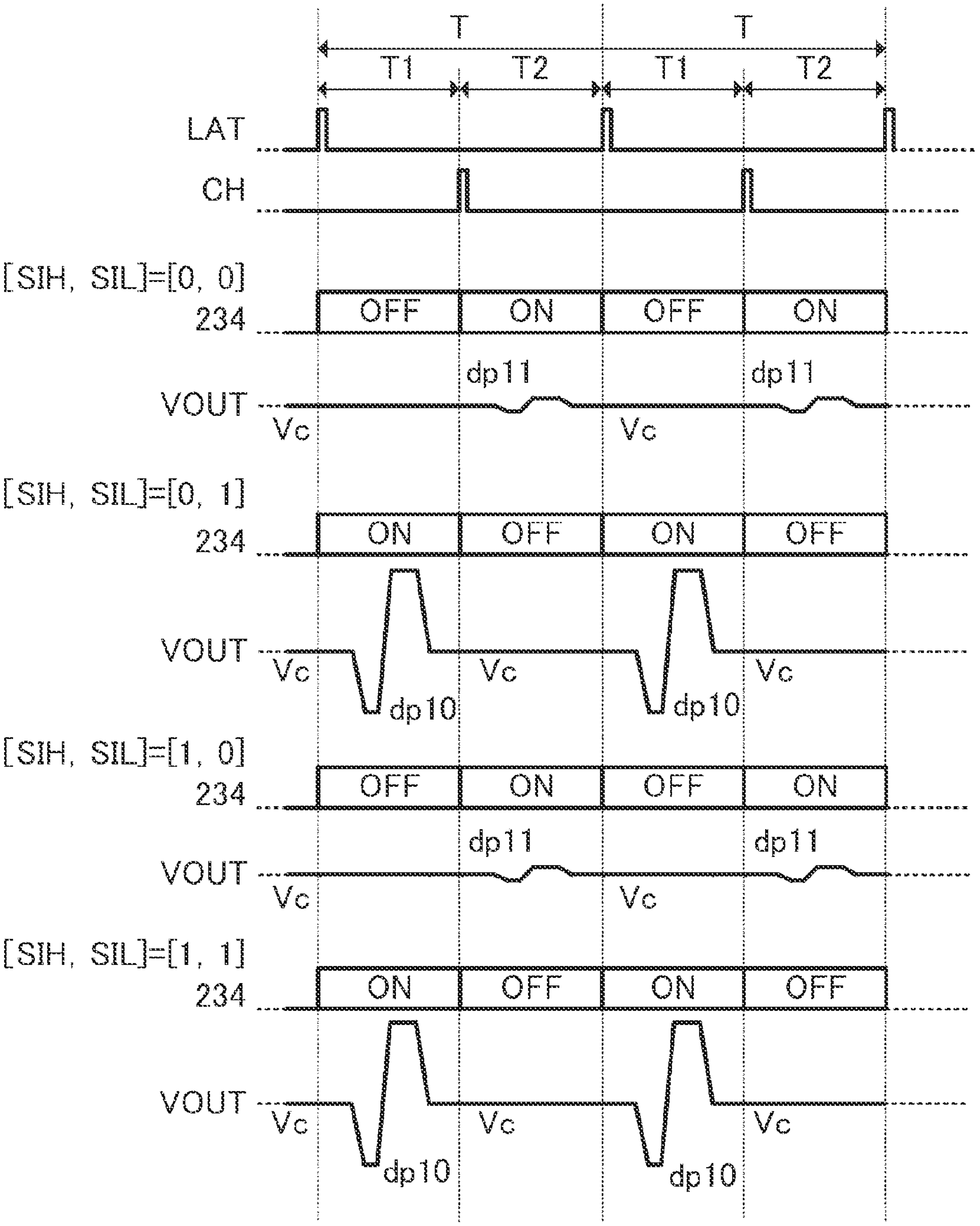
FIG. 16 is a view for describing an operation of the selection circuit when the selection signal illustrated in FIG. 15 is supplied.

FIG. 16 is a view for describing an operation of the selection circuit 230 when the selection signal S illustrated in FIG. 15 is supplied. The transfer gate 234 is turned on or off according to the selection signal S supplied according to the discharge data [SIH, SIL].

Specifically, when [SIH, SIL]=[0, 0], the transfer gate 234 is turned off in the period T1 and turned on in the period T2. When the discharge data [SIH, SIL]=[0, 1], the transfer gate 234 is turned on in the period T1 and turned off in the period T2.

Further, when the discharge data [SIH, SIL]=[1, 0], the transfer gate 234 is turned off in the period T1 and turned on in the period T2. Further, when the discharge data [SIH, SIL]=[1, 1], the transfer gate 234 is turned on in the period T1 and turned off in the period T2.

Subsequently, the dots formed on the medium P will be described for each discharge data [SIH, SIL]. When the discharge data [SIH, SIL]=[0, 0], the corresponding piezoelectric element 60 is supplied with a constant waveform at the voltage Vc as VOUT in the period T1, and is supplied with the driving waveform dp11 as VOUT in the period T2. In this case, only a slight vibration occurs in the vicinity of the nozzle 651, and ink is not discharged from the nozzle 651. Therefore, dots are not formed on the medium P.

When the discharge data [SIH, SIL]=[0, 1], the corresponding piezoelectric element 60 is supplied with a constant waveform at the voltage Vc as VOUT in the period T2, and is supplied with the driving waveform dp10 as VOUT in the period T1. In this case, a medium amount of ink is discharged once from the nozzle 651 and lands on the medium P. Therefore, dots are formed on the medium P.

When the discharge data [SIH, SIL]=[1, 0], the corresponding piezoelectric element 60 is supplied with a constant waveform at the voltage Vc as VOUT in the period T1, and is supplied with the driving waveform dp11 as VOUT in the period T2. In this case, only a slight vibration occurs in the vicinity of the nozzle 651, and ink is not discharged from the nozzle 651. Therefore, dots are not formed on the medium P.

When the discharge data [SIH, SIL]=[1, 1], the corresponding piezoelectric element 60 is supplied with a constant waveform at the voltage Vc as VOUT in the period T2, and is supplied with the driving waveform dp10 as VOUT in the period T1. In this case, a medium amount of ink is discharged once from the nozzle 651 and lands on the medium P. Therefore, dots are formed on the medium P.

As described above, in the binary mode, since the setting information signal SP is set such that the bit data of the selection signal Q1 and the selection signal Q2 are inverted, printing can be performed in the binary mode by the value of the discharge data [SIL] regardless of the value of the discharge data [SIH]. Specifically, when [SIL]=[0], the ink is not discharged from the nozzle 651, and thus, no dots are formed on the medium P, and when the discharge data [SIL]=[1], the ink is discharged from the nozzle 651 to form dots on the medium P. The discharge data [SIL] is an example of a first discharge control signal.

In other words, in the binary mode, the head control signal DI may not include the discharge data [SIH]. Since the data size of the head control signal DI can be reduced, the dot formation cycle T corresponding to the printing cycle can be shortened as compared with a case of the multi-gradation mode.

Since the data size of the discharge data [SIH] increases in proportion to the number of nozzles 651, the data size of the optional discharge data [SIH] increases as the number of nozzles 651 increases. In other words, as the number of nozzles 651 increases, the effect of shortening the printing cycle increases.

For example, the data size of the discharge data [SIH] is 400 bits when the number of nozzles 651 is 400, the data size of the discharge data [SIH] is 800 bits when the number of nozzles 651 is 800, and thus, the data size of the optional discharge data [SIH] is 400 bits larger than that when the number of nozzles 651 is 800 as compared with a case where the number of the nozzles 651 is 400.

In the present embodiment, since the multi-gradation mode and the binary mode can be executed with the same hardware configuration, the user can switch the mode in any manner and the range of use is expanded.

Further, in the present embodiment, the selection signals Q1 to Q4 are generated based on the 16-bit setting information signal SP in both the multi-gradation mode and the binary mode. In the binary mode, the selection signal Q1 and the selection signal Q2 may be generated based on the 8-bit setting information signal SP. The data size of the head control signal DI is reduced, and the printing cycle can be shortened.

In the binary mode of the present embodiment, the ink discharge from the nozzle 651 is controlled by using two driving waveforms dp10 and dp11, but even with dp10 alone, the same effect as the effect obtained in the binary mode of the present embodiment can be obtained. In other words, by turning off the transfer gate 234, the control may be performed such that dots are not formed on the medium P without causing the nozzle 651 to vibrate slightly. When there is only one driving waveform, the dot formation cycle T may not have to be defined by the change signal CH, and thus, the printing cycle can be further shortened.

6. Second Embodiment

The liquid discharge apparatus 1 in a second embodiment will be described. In describing the liquid discharge apparatus 1 in the second embodiment, the same components as those in the liquid discharge apparatus 1 in the first embodiment will be given the same reference numerals, and the description thereof will be omitted or simplified.

Figure 17:
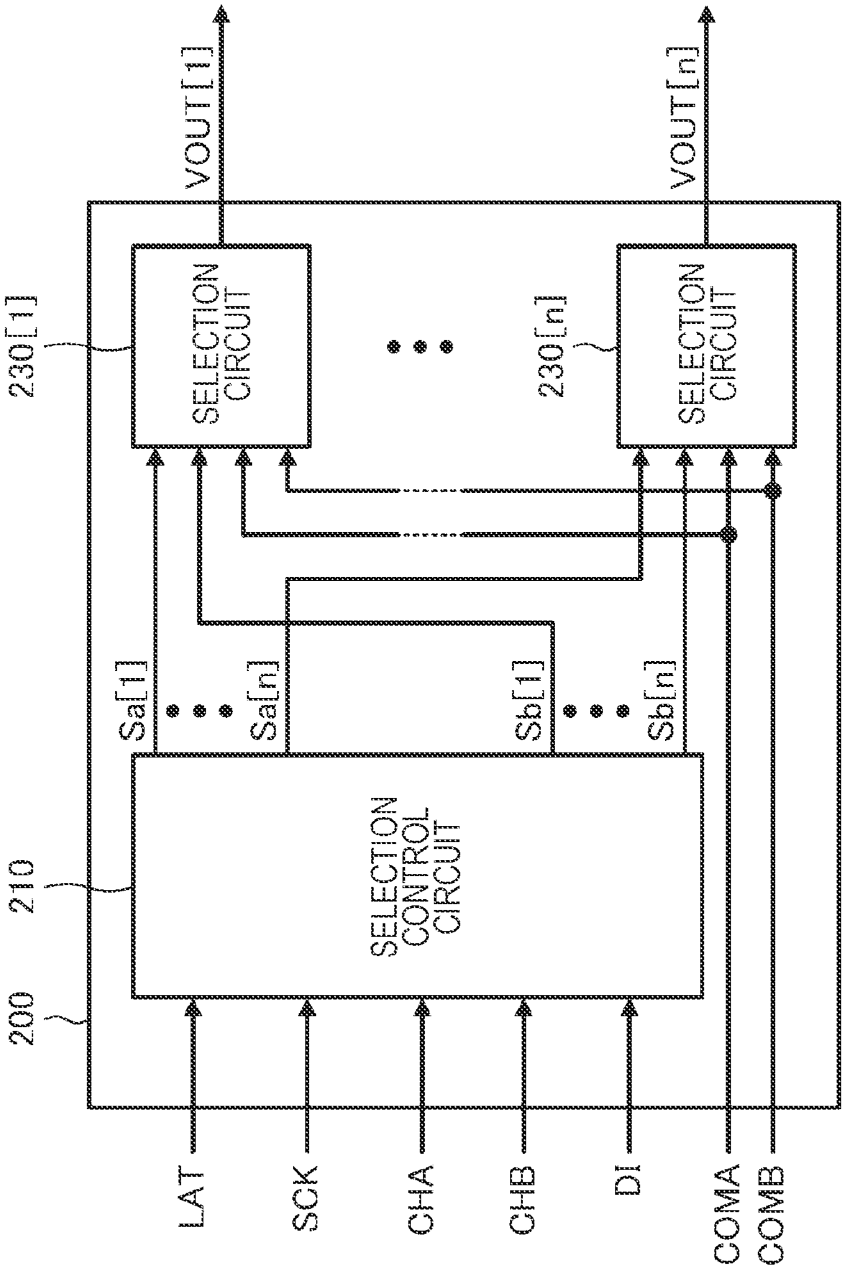
FIG. 17 is a view illustrating a configuration of a driving signal selection circuit according to a second embodiment.

FIG. 17 is a view illustrating a configuration of the driving signal selection circuit 200 according to the second embodiment. The driving signal selection circuit 200 according to the second embodiment includes the selection control circuit 210 and the selection circuits 230[1] to 230[*n*]. The selection control circuit 210 outputs a selection signal Sa for switching whether or not to output a driving signal COMA as VOUT and a selection signal Sb for switching whether or not to output a driving signal COMB as VOUT, to the selection circuits 230[1] to 230[*n*].

The clock signal SCK, the latch signal LAT, change signals CHA and CHB, the head control signal DI, and the driving signals COMA and COMB are input to the driving signal selection circuit 200 in the second embodiment. Then, the driving signal selection circuit 200 selects or does not select the driving signals COMA and COMB based on the clock signal SCK, the latch signal LAT, the change signals CHA and CHB, and the input head control signal DI, to generate VOUT[1] to VOUT[n], and output the generated VOUT to each of the corresponding discharge sections 600[1] to 600[*n*]. The piezoelectric element 60 is driven by supplying VOUT based on the driving signals COMA and COMB.

The clock signal SCK, the latch signal LAT, the change signals CHA and CHB, and the head control signal DI are input to the selection control circuit 210. Then, in the selection control circuit 210, each of the selection circuits 230[1] to 230[*n*] outputs selection signals Sa[1] to Sa[n] and Sb[1] to Sb[n] for switching whether or not to output the driving signals COMA and COMB as VOUT, based on the clock signal SCK, the latch signal LAT, the change signals CHA and CHB, and the head control signal DI.

The wiring A for transmitting the head control signal DI to the selection control circuit 210 is an example of a first wiring. More specifically, the wiring A transmits the head control signal DI to the SP register group 261, the second register 222*b*, and the first register 222*a*.

Next, the configuration of the selection circuits 230[1] to 230[*n*] will be described. Here, the selection circuits 230[1] to 230[*n*] all have the same configuration. The selection signal Sa among the selection signals Sa[1] to Sa[n] and the selection signal Sb among the selection signals Sb[1] to Sb[n] are input to the selection circuit 230.

Figure 18:
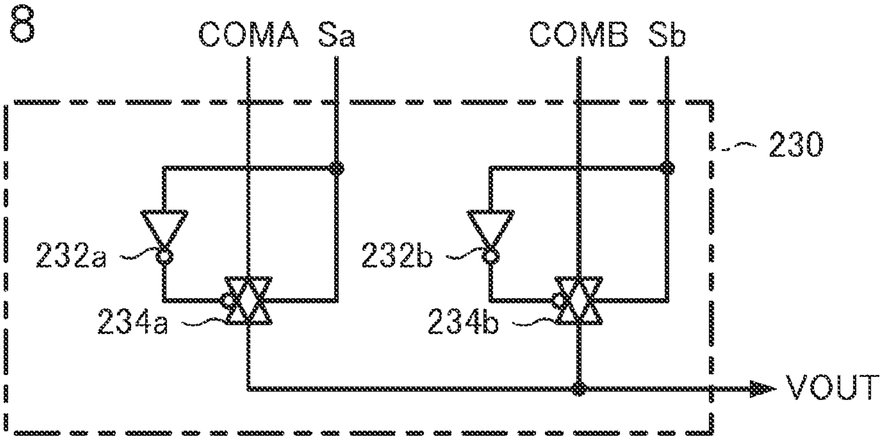
FIG. 18 is a view illustrating a configuration of a selection circuit that corresponds to one discharge section according to the second embodiment.

FIG. 18 is a view illustrating a configuration of the selection circuit 230 that corresponds to one discharge section 600. As illustrated in FIG. 18, the selection circuit 230 has inverters 232*a* and 232*b*, which are NOT circuits, and transfer gates 234*a* and 234*b*.

While the selection signal Sa output by the selection control circuit 210 is input to a positive control end, which is not marked with a circle, at the transfer gate 234*a*, the selection signal S is logically inverted by the inverter 232*a* and is also input to a negative control end marked with a circle at the transfer gate 234*a*. The driving signal COMA is supplied to the input end of the transfer gate 234*a*. Specifically, the transfer gate 234*a* conducts the input end and the output end to each other when the input selection signal Sa is the H level, and does not conduct the input end and the output end to each other when the input selection signal Sa is the L level.

Similarly, while the selection signal Sb output by the selection control circuit 210 is input to a positive control end, which is not marked with a circle, at the transfer gate 234*b*, the selection signal S is logically inverted by the inverter 232*b* and is also input to a negative control end marked with a circle at the transfer gate 234*b*. The driving signal COMB is supplied to the input end of the transfer gate 234*b*. Specifically, the transfer gate 234*b* conducts the input end and the output end to each other when the input selection signal Sb is the H level, and does not conduct the input end and the output end to each other when the input selection signal Sb is the L level.

Then, the output end of the transfer gate 234*a* and the output end of the transfer gate 234*b* are commonly coupled, VOUT is output from a coupling point where the output ends are commonly coupled, and ink is discharged from the corresponding discharge section 600. The selection circuit 230 is an example of a switch circuit. Further, the wiring for transmitting the driving signals COMA and COMB is an example of a second wiring.

7. Multi-Gradation Mode in Second Embodiment

Next, the operation when the control mechanism 10 controls the liquid discharge head 21 during the discharge control period and performs printing in the multi-gradation mode will be described. The multi-gradation mode is an example of a first print mode.

Figure 19:
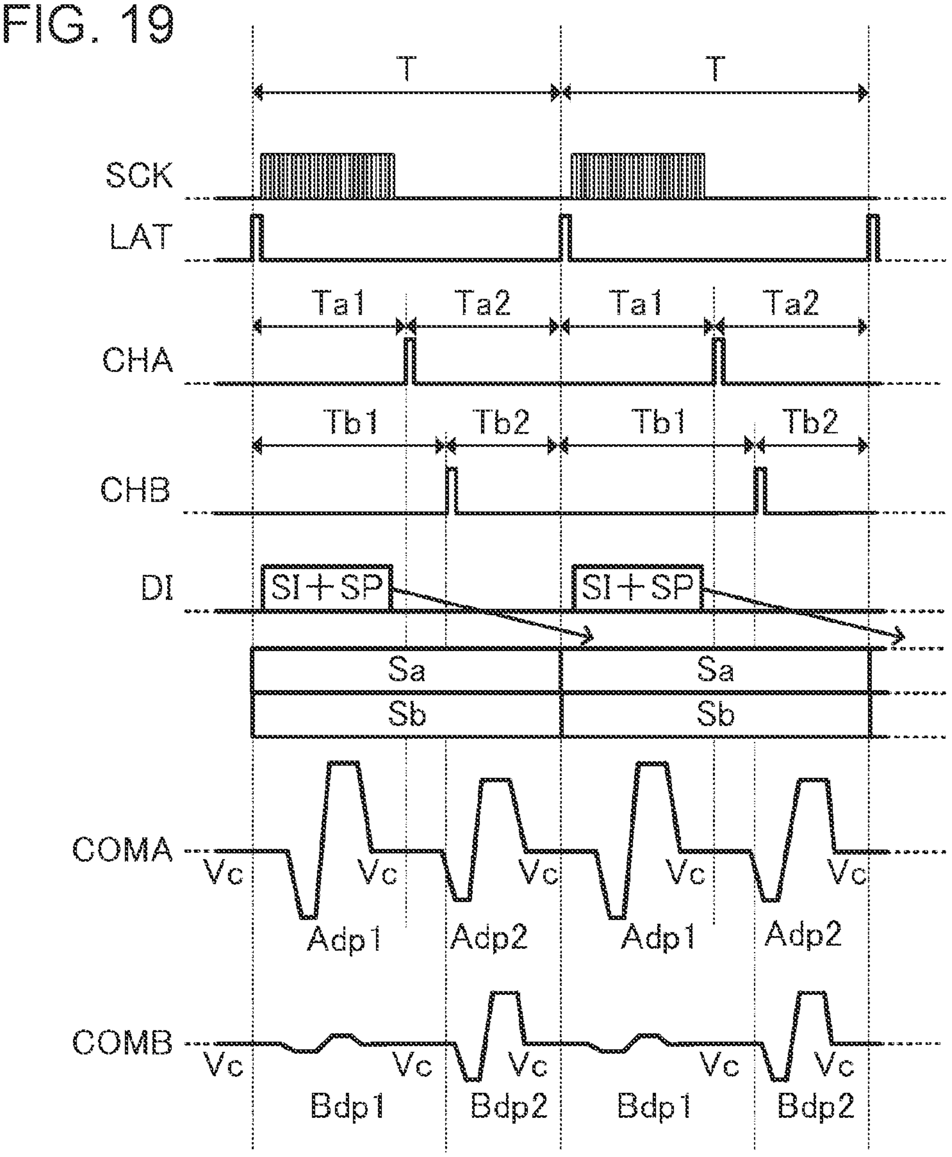
FIG. 19 is a view for describing the latch signal, the change signal, the clock signal, the head control signal, and the driving signal in a multi-gradation mode of the second embodiment.

FIG. 19 is a view for describing the latch signal LAT, the change signal CH, the clock signal SCK, the head control signal DI, and the driving signal COM. FIG. 19 is a view illustrating an example of the latch signal LAT, the change signals CHA and CHB, the clock signal SCK, the head control signal DI, and the driving signals COMA and COMB, which are input to the selection control circuit 210.

The clock signal SCK, the latch signal LAT, the change signal CHA, the head control signal DI, and the driving signals COMA and COMB are input to the selection control circuit 210. In the second embodiment, the change signals CHA and CHB will be described as a pulse signal output one time in the dot formation cycle T. In other words, in the second embodiment, the change signal CHA defines the dot formation cycle T as a period Ta1 and a period Ta2, and the change signal CHB defines the dot formation cycle T as a period Tb1 and a period Tb2.

Then, the selection circuit 230 switches whether or not to supply the driving signal COMA as VOUT to the discharge section 600 in the period Ta1 and the period Ta2 based on the selection signal Sa. Similarly, the selection circuit 230 switches whether or not to supply the driving signal COMB as VOUT to the discharge section 600 in the period Tb1 and the period Tb2 based on the selection signal Sb.

The driving signal COMA includes the driving waveforms Adp1 and Adp2, and the driving signal COMB includes the driving waveforms Bdp1 and Bdp2. The driving waveform Adp1 is a waveform for discharging a large amount of ink from the nozzle 651, and the driving waveform Adp2 is a waveform for discharging a medium amount of ink from the nozzle 651. The driving waveform Bdp2 is a waveform for discharging the small amount of ink from the nozzle 651, and the Bdp1 is a waveform that does not discharge the ink from the nozzle 651, and is a waveform for slightly vibrating the ink in the vicinity of the opening portion of the nozzle 651 to prevent an increase in ink viscosity.

Figure 20:
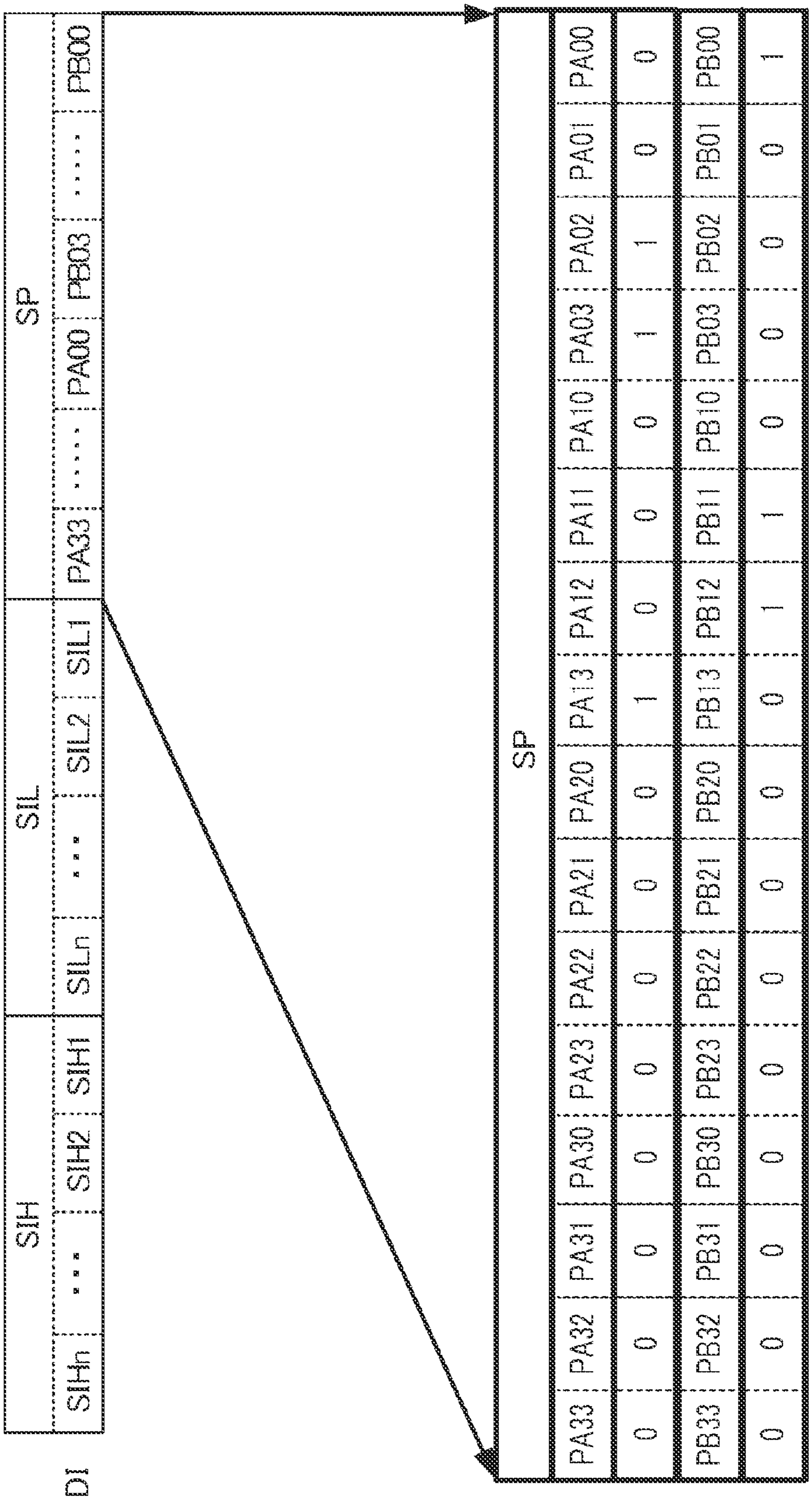
FIG. 20 is a view illustrating an example of the head control signal output by the control mechanism during the discharge control period in the multi-gradation mode of the second embodiment.

FIG. 20 is a view illustrating an example of the head control signal DI output by the control mechanism 10 during the discharge control period. Here, the discharge control signal SI included in the head control signal DI is a signal that defines the amount of ink discharged for each of the n nozzles 651, and the logic level is appropriately changed during the discharge control period. In other words, the discharge data [SIH, SIL] included in the discharge control signal SI is either 0 or 1 according to the amount of ink discharged from the corresponding nozzle 651 in the dot formation cycle T.

As illustrated in FIG. 20, during the discharge control period, the control mechanism 10 outputs the head control signal DI including the setting information PA33 to PA00 and PB33 to PB00 that configure the setting information signal SP to the selection control circuit 210. In this case, the setting information signal SP is 32 bits. The setting information PA33 to PA00 are setting information for setting a rule for selecting the driving waveform Adp1 or Adp2 applied to the piezoelectric element 60 from the driving signal COMA, and the setting information PB33 to PB00 are setting information for setting a rule for selecting the driving waveform Bdp1 or Bdp2 applied to the piezoelectric element 60 from the driving signal COMB. Here, the setting information signal SP including the setting information PA33 to PA00 and the setting information PB33 to PB00 is an example of a setting information signal group.

Specifically, the setting information in which each of the setting information PA33, PA32, PA31, and PA30 is "0", "0", "0", and "0" is output to the selection control circuit 210. After this, the setting information in which each of the setting information PA23, PA22, PA21, and PA20 is "0", "0", "0", and "0" is output to the selection control circuit 210. After this, the setting information in which each of the setting information PA13, PA12, PA11, and PA10 is "1", "0", "0", and "0" is output to the selection control circuit 210. After this, the setting information in which each of the setting information PA03, PA02, PA01, and PA00 is "1", "1", "0", and "0" is output to the selection control circuit 210.

Therefore, the selection control signal generation section 262 included in the control logic circuit 260 included in the selection control circuit 210 generates selection signals Qa1 to Qa4 based on the setting information PA and outputs the selection signals Qa1 to Qa4 to the decoder 226. Specifically, the selection control circuit 210 generates the selection signal Qa1 [PA00, PA01, PA02, PA03]=[0, 0, 1, 1], the selection signal Qa2 [PA10, PA11, PA12, PA13]=[0, 0, 0, 1], the selection signal Qa3 [PA20, PA21, PA22, PA23]=[0, 0, 0, 0], and the selection signal Qa4 [PA30, PA31, PA32, PA33]=[0, 0, 0, 0], and outputs the generated signals to the decoder 226.

Similarly, the setting information in which each of the setting information PB33, PB32, PB31, and PB30 is "0", "0", "0", and "0" is output to the selection control circuit 210. After this, the setting information in which each of the setting information PB23, PB22, PB21, and PB20 is "0", "0", "0", and "0" is output to the selection control circuit 210. After this, the setting information in which each of the setting information PB13, PB12, PB11, and PB10 is "0", "1", "1", and "0" is output to the selection control circuit 210. After this, the setting information in which each of the setting information PB03, PB02, PB01, and PB00 is "0", "0", "0", and "1" is output to the selection control circuit 210.

Therefore, the selection control signal generation section 262 included in the control logic circuit 260 included in the selection control circuit 210 generates selection signals Qb1 to Qb4 based on the setting information PB and outputs the selection signals Qb1 to Qb4 to the decoder 226. Specifically, the selection control circuit 210 generates the selection signal Qb1 [PB00, PB01, PB02, PB03]=[1, 0, 0, 0], the selection signal Qb2 [PB10, PB11, PB12, PB13]=[0, 1, 1, 0], the selection signal Qb3 [PB20, PB21, PB22, PB23]=[0, 0, 0, 0], and the selection signal Qb4 [PB30, PB31, PB32, PB33]=[0, 0, 0, 0], and outputs the generated signals to the decoder 226.

FIG. 21 is a view illustrating decoding contents in the decoder 226 included in the selection control circuit 210 during the discharge control period. As illustrated in FIG. 21, the decoder 226 outputs the selection signal Sa corresponding to the discharge data [SIH, SIL].

Specifically, when the discharge data [SIH, SIL]=[0, 0] is input, the decoder 226 outputs the L level selection signal Sa in the period Ta1 and the L level selection signal Sa in the period Ta2. Further, when the discharge data [SIH, SIL]=[0, 1] is input, the decoder 226 outputs the L level selection signal Sa in the period Ta1 and the L level selection signal Sa in the period Ta2.

When the discharge data [SIH, SIL]=[1, 0] is input, the decoder 226 outputs the H level selection signal Sa in the period Ta1 and the L level selection signal Sa in the period Ta2. When the discharge data [SIH, SIL]=[1, 1] is input, the decoder 226 outputs the H level selection signal Sa in the period Ta1 and the H level selection signal Sa in the period Ta2. In the multi-gradation mode of the second embodiment, since the dot formation cycle T is defined as two periods Ta1 and Ta2 by the change signal CHA, the selection signals Qa1 and Qa2 are selected, and Qa3 and Qa4 are not selected.

FIG. 22 is a view illustrating decoding contents in the decoder 226 included in the selection control circuit 210 during the discharge control period. As illustrated in FIG. 22, the decoder 226 outputs the selection signal Sb corresponding to the discharge data [SIH, SIL].

Specifically, when the discharge data [SIH, SIL]=[0, 0] is input, the decoder 226 outputs the H level selection signal Sb in the period Tb1 and the L level selection signal Sb in the period Tb2. When the discharge data [SIH, SIL]=[0, 1] is input, the decoder 226 outputs the L level selection signal Sb in the period Tb1 and the H level selection signal Sb in the period Tb2.

When the discharge data [SIH, SIL]=[1, 0] is input, the decoder 226 outputs the L level selection signal Sb in the period Tb1 and the H level selection signal Sb in the period Tb2. When the discharge data [SIH, SIL]=[1, 1] is input, the decoder 226 outputs the L level selection signal Sb in the period Tb1 and the L level selection signal Sb in the period Tb2. In the multi-gradation mode of the second embodiment, since the dot formation cycle T is defined as two periods Tb1 and Tb2 by the change signal CHB, the selection signals Qb1 and Qb2 are selected, and Qb3 and Qb4 are not selected.

Figure 23:
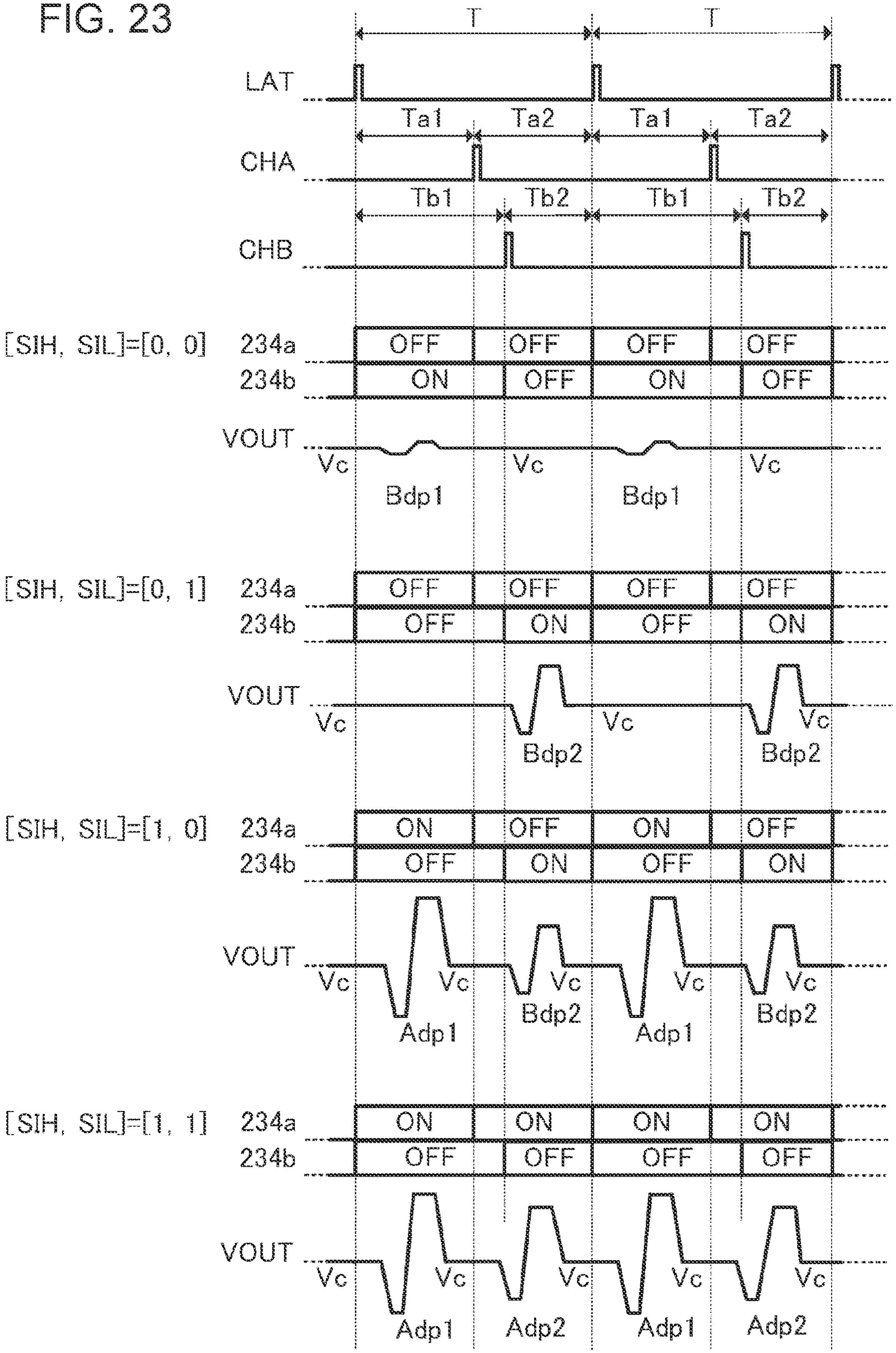
FIG. 23 is a view for describing an operation of the selection circuit when selection signals illustrated in FIGS. 21 and 22 are supplied.

FIG. 23 is a view for describing an operation of the selection circuit 230 when the selection signals Sa and Sb illustrated in FIGS. 21 and 22 are supplied. The transfer gates 234*a* and 234*b* are turned on or off according to the selection signal S supplied according to the discharge data [SIH, SIL].

Specifically, when the discharge data [SIH, SIL]=[0, 0], the transfer gate 234*a* is turned off in the period Ta1 and turned off in the period Ta2. The transfer gate 234*b* is turned on in the period Tb1 and turned off in the period Tb2. When the discharge data [SIH, SIL]=[0, 1], the transfer gate 234*a* is turned off in the period Ta1 and turned off in the period Ta2. The transfer gate 234*b* is turned off in the period Tb1 and turned on in the period Tb2.

When the discharge data [SIH, SIL]=[1, 0], the transfer gate 234*a* is turned on in the period Ta1 and turned off in the period Ta2. The transfer gate 234*b* is turned off in the period Tb1 and turned on in the period Tb2. When the discharge data [SIH, SIL]=[1, 1], the transfer gate 234*a* is turned on in the period Ta1 and turned on in the period Ta2. The transfer gate 234*b* is turned off in the period Tb1 and turned off in the period Tb2.

Subsequently, the dots formed on the medium P will be described for each discharge data [SIH, SIL]. When the discharge data [SIH, SIL]=[0, 0], the corresponding piezoelectric element 60 is supplied with a constant waveform at the voltage Vc as VOUT in the period Tb2, and is supplied with the driving waveform Bdp1 as VOUT in the period Tb1. In this case, only a slight vibration occurs in the vicinity of the nozzle 651, and ink is not discharged from the nozzle 651. Therefore, dots are not formed on the medium P.

When the discharge data [SIH, SIL]=[0, 1], the corresponding piezoelectric element 60 is supplied with a constant waveform at the voltage Vc as VOUT in the period Tb1, and is supplied with the driving waveform Bdp2 as VOUT in the period Tb2. In this case, a small amount of ink is discharged once from the nozzle 651 and lands on the medium P. Therefore, small dots are formed on the medium P.

When the discharge data [SIH, SIL]=[1, 0], the corresponding piezoelectric element 60 is supplied with the driving waveform Adp1 as VOUT in the period Ta1, and is supplied with the driving waveform Bdp2 as VOUT in the period Tb2. In this case, a large amount of ink and a small amount of ink are discharged from the nozzle 651 and land on the medium P. After this, a large amount of ink and a small amount of ink, which landed on the medium P, are combined to form medium dots on the medium P.

When the discharge data [SIH, SIL]=[1, 1], the corresponding piezoelectric element 60 is supplied with the driving waveform Adp1 as VOUT in the period Ta1, and is supplied with the driving waveform Adp2 as VOUT in the period Ta2. In this case, a large amount of ink, a medium amount of ink, and a small amount of ink are discharged from the nozzle 651 and land on the medium P. After this, a large amount of ink, a medium amount of ink, and a small amount of ink, which landed on the medium P, are combined to form large dots on the medium P.

As described above, during the discharge control period, the control mechanism 10 outputs the head control signal DI to the liquid discharge head 21 such that the liquid discharge head 21 forms four types of dots, that is, large dots, medium dots, small dots, and non-recording, on the medium P based on the discharge control signal SI and the setting information signal SP.

In the multi-gradation mode of the second embodiment, the driving signal selection circuit 200 defines the dot formation cycle T as the period Ta1, the period Ta2, the period Tb1, and the period Tb2 by the change signals CHA and CHB, and switches whether or not to supply the driving signal COMA or the driving signal COMB as VOUT to the discharge section 600 in each of the periods. Accordingly, the liquid discharge head 21 can form four types of dots including non-recording on the medium P. As a result, the liquid discharge apparatus 1 can perform printing in four gradations, and can form a high-definition image on the medium P. The gradation number 4 in the multi-gradation mode of the second embodiment is an example of a first gradation number.

8. Binary Mode in Second Embodiment

Next, the operation when the control mechanism 10 controls the liquid discharge head 21 during the discharge control period and performs printing in the binary mode will be described. The binary mode is an example of a second print mode.

Figure 24:
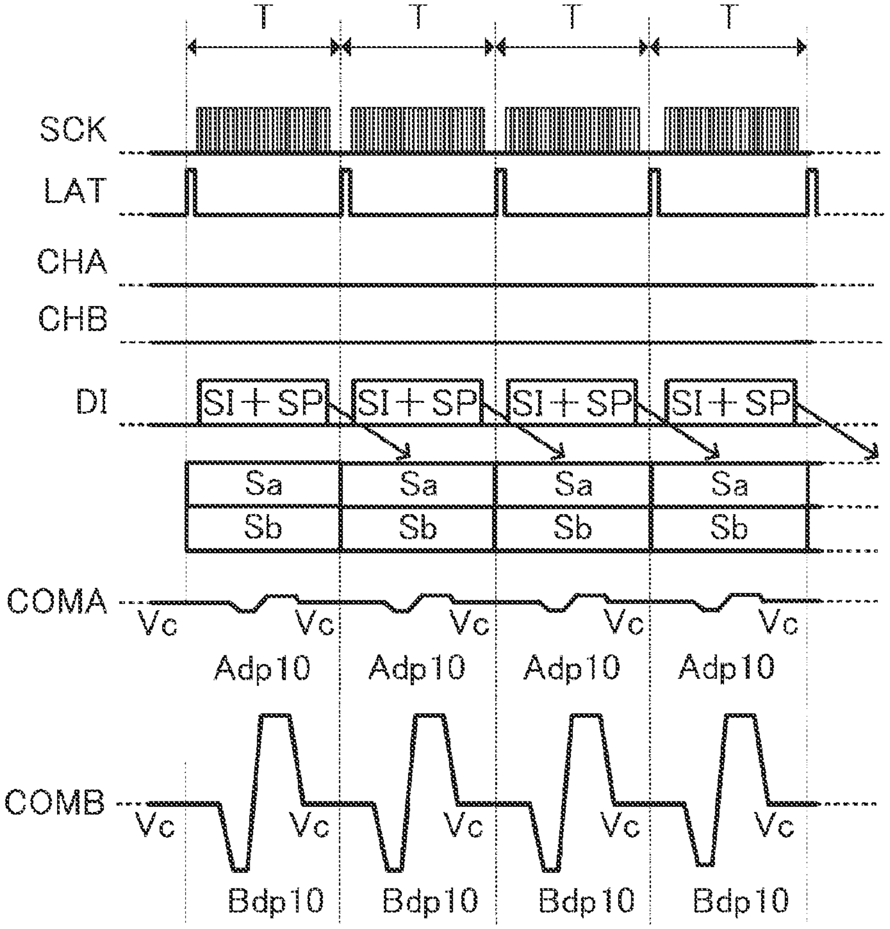
FIG. 24 is a view for describing the latch signal, the change signal, the clock signal, the head control signal, and the driving signal in a binary mode of the second embodiment.

FIG. 24 is a view for describing the latch signal LAT, the change signal CH, the clock signal SCK, the head control signal DI, and the driving signal COM. An example of the latch signal LAT, the change signals CHA and CHB, the clock signal SCK, the head control signal DI, and the driving signals COMA and COMB, which are input to the selection control circuit 210, is illustrated.

The clock signal SCK, the latch signal LAT, the change signals CHA and CHB, the head control signal DI, and the driving signals COMA and COMB are input to the selection control circuit 210. In the binary mode of the second embodiment, since the change signals CHA and CHB are at the L level, the dot formation cycle T is not defined. Based on the selection signals Sa and Sb, the selection circuit 230 switches whether or not to supply the driving signals COMA and COMB as VOUT to the discharge section 600 for each dot formation cycle T, that is, for each printing cycle.

The driving signal COMA includes the driving waveform Adp10, and the driving signal COMB includes the driving waveforms Bdp10. The driving waveform Adp10 is a waveform for discharging the medium amount of ink from the nozzle 651, and the driving waveform Bdp10 is a waveform that does not discharge the ink from the nozzle 651, and is a waveform for slightly vibrating the ink in the vicinity of the opening portion of the nozzle 651 to prevent an increase in ink viscosity. In other words, in the binary mode, the gradation number of the dots to be formed is 2 because the two states, that is, a state of discharging ink from the nozzle 651 and a state of not discharging ink, are controlled. The gradation number 2 in the binary mode in the second embodiment is an example of a second gradation number.

Figure 25:
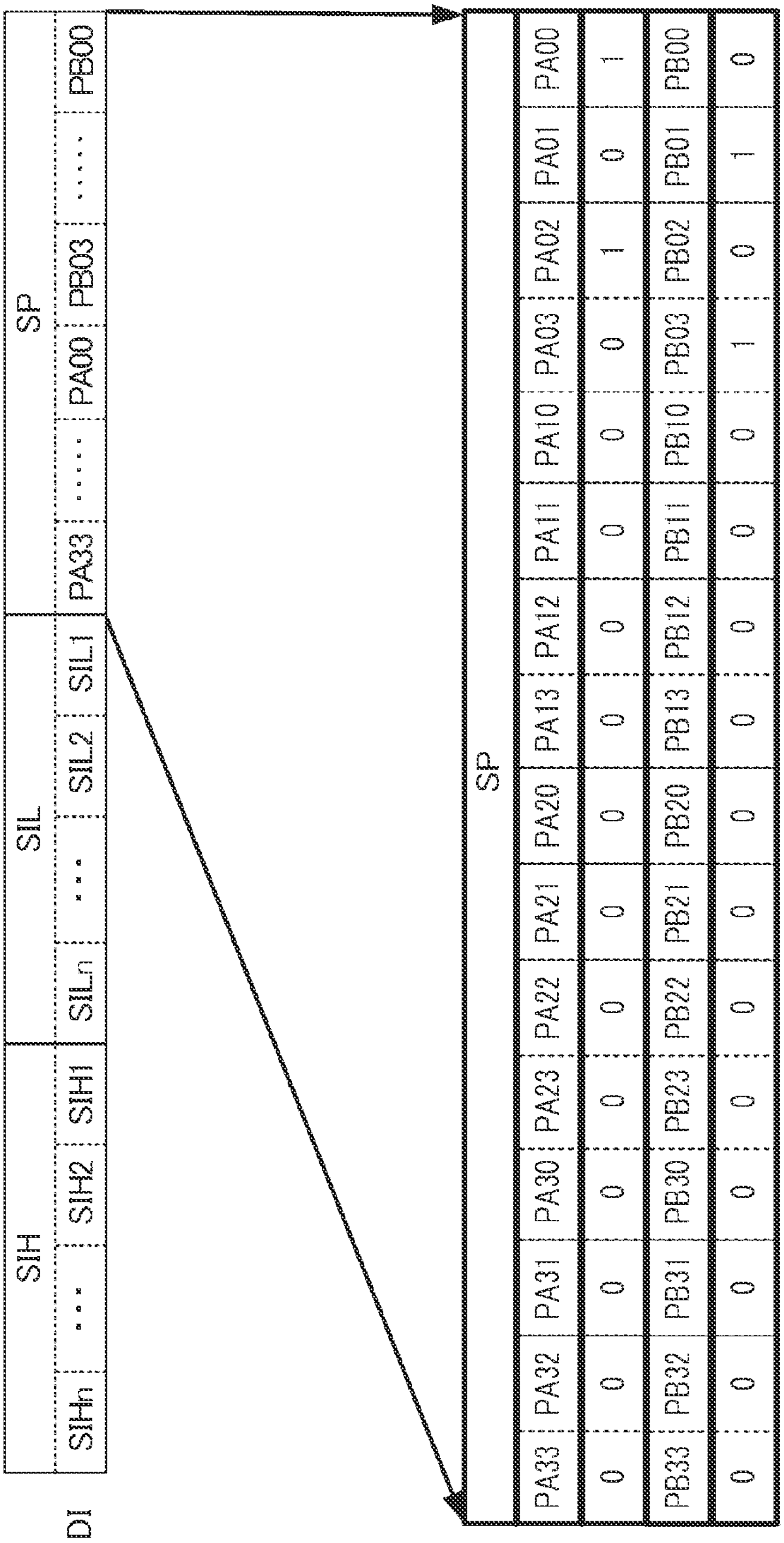
FIG. 25 is a view illustrating an example of the head control signal output by the control mechanism during the discharge control period in the binary mode of the second embodiment.

FIG. 25 is a view illustrating an example of the head control signal DI output by the control mechanism 10 during the discharge control period in the binary mode. Here, the discharge control signal SI included in the head control signal DI is a signal that defines the amount of ink discharged for each of the n nozzles 651, and the discharge data [SIH, SIL] included in the discharge control signal SI is either 0 or 1 according to the amount of ink discharged from the corresponding nozzle 651 in the dot formation cycle T.

As illustrated in FIG. 25, during the discharge control period, the control mechanism 10 outputs the head control signal DI including the setting information PA33 to PA00 and PB33 to PB00 that configure the setting information signal SP to the selection control circuit 210. In this case, the setting information signal SP is 32 bits. The setting information PA33 to PA00 are setting information for setting a rule for selecting the driving waveform Adp10 applied to the piezoelectric element 60 from the driving signal COMA, and the setting information PB33 to PB00 are setting information for setting a rule for selecting the driving waveform Bdp10 applied to the piezoelectric element 60 from the driving signal COMB. Here, the setting information signal SP including the setting information PA33 to PA00 and the setting information PB33 to PB00 is an example of a setting information signal group.

Specifically, the setting information in which each of the setting information PA33, PA32, PA31, and PA30 is “0”, “0”, “0”, and “0” is output to the selection control circuit 210. After this, the setting information in which each of the setting information PA23, PA22, PA21, and PA20 is “0”, “0”, “0”, and “0” is output to the selection control circuit 210. After this, the setting information in which each of the setting information PA13, PA12, PA11, and PA10 is “0”, “0”, “0”, and “0” is output to the selection control circuit 210. After this, the setting information in which each of the setting information PA03, PA02, PA01, and PA00 is “0”, “1”, “0”, and “1” is output to the selection control circuit 210.

Therefore, the selection control signal generation section 262 included in the control logic circuit 260 included in the selection control circuit 210 generates selection signals Qa1 to Qa4 based on the setting information PA and outputs the selection signals Qa1 to Qa4 to the decoder 226. Specifically, the selection control circuit 210 generates the selection signal Qa1 [PA00, PA01, PA02, PA03]=[1, 0, 1, 0], the selection signal Qa2 [PA10, PA11, PA12, PA13]=[0, 0, 0, 0], the selection signal Qa3 [PA20, PA21, PA22, PA23]=[0, 0, 0, 0], and the selection signal Qa4 [PA30, PA31, PA32, PA33]=[0, 0, 0, 0], and outputs the generated signals to the decoder 226.

Similarly, the setting information in which each of the setting information PB33, PB32, PB31, and PB30 is “0”, “0”, “0”, and “0” is output to the selection control circuit 210. After this, the setting information in which each of the setting information PB23, PB22, PB21, and PB20 is “0”, “0”, “0”, and “0” is output to the selection control circuit 210. After this, the setting information in which each of the setting information PB13, PB12, PB11, and PB10 is “0”, “0”, “0”, and “0” is output to the selection control circuit 210. After this, the setting information in which each of the setting information PB03, PB02, PB01, and PB00 is “1”, “0”, “1”, and “0” is output to the selection control circuit 210.

Therefore, the selection control signal generation section 262 included in the control logic circuit 260 included in the selection control circuit 210 generates selection signals Qb1 to Qb4 based on the setting information PB and outputs the selection signals Qb1 to Qb4 to the decoder 226. Specifically, the selection control circuit 210 generates the selection signal Qb1 [PB00, PB01, PB02, PB03]=[0, 1, 0, 1], the selection signal Qb2 [PB10, PB11, PB12, PB13]=[0, 0, 0, 0], the selection signal Qb3 [PB20, PB21, PB22, PB23]=[0, 0, 0, 0], and the selection signal Qb4 [PB30, PB31, PB32, PB33]=[0, 0, 0, 0], and outputs the generated signals to the decoder 226.

Here, since the setting information signal SP is set such that the bit data of the setting information PA00 to PA03 and the setting information PB00 to PB03 are inverted, the bit data of the selection signal Qb1 and the selection signal Qa2 are inverted. The setting information PA00 to PA03 are examples of a first setting information signal, and the setting information PB00 to PB03 are examples of a second setting information signal.

FIG. 26 is a view illustrating decoding contents in the decoder 226 included in the selection control circuit 210 during the discharge control period. As illustrated in FIG. 26, the decoder 226 outputs the selection signal Sa corresponding to the discharge data [SIH, SIL]. In the binary mode of the second embodiment, since the dot formation cycle T is not defined by the change signal CHA, the selection signal Qa1 is selected.

Specifically, during the dot formation cycle T, the decoder 226 included in the selection control circuit 210 outputs the H level when the discharge data [SIH, SIL]=[0, 0] is input, outputs the L level when the discharge data [SIH, SIL]=[0, 1] is input, outputs the H level when the discharge data [SIH, SIL]=[1, 0] is input, and outputs the L level when the discharge data [SIH, SIL]=[1, 1] is input.

FIG. 27 is a view illustrating decoding contents in the decoder 226 included in the selection control circuit 210 during the discharge control period. As illustrated in FIG. 27, the decoder 226 outputs the selection signal Sb corresponding to the discharge data [SIH, SIL]. In the binary mode of the second embodiment, since the dot formation cycle T is not defined by the change signal CHB, the selection signal Qb1 is selected.

Specifically, during the dot formation cycle T, the decoder 226 included in the selection control circuit 210 outputs the L level when the discharge data [SIH, SIL]=[0, 0] is input, outputs the H level when the discharge data [SIH, SIL]=[0, 1] is input, outputs the L level when the discharge data [SIH, SIL]=[1, 0] is input, and outputs the H level when the discharge data [SIH, SIL]=[1, 1] is input.

Figure 28:
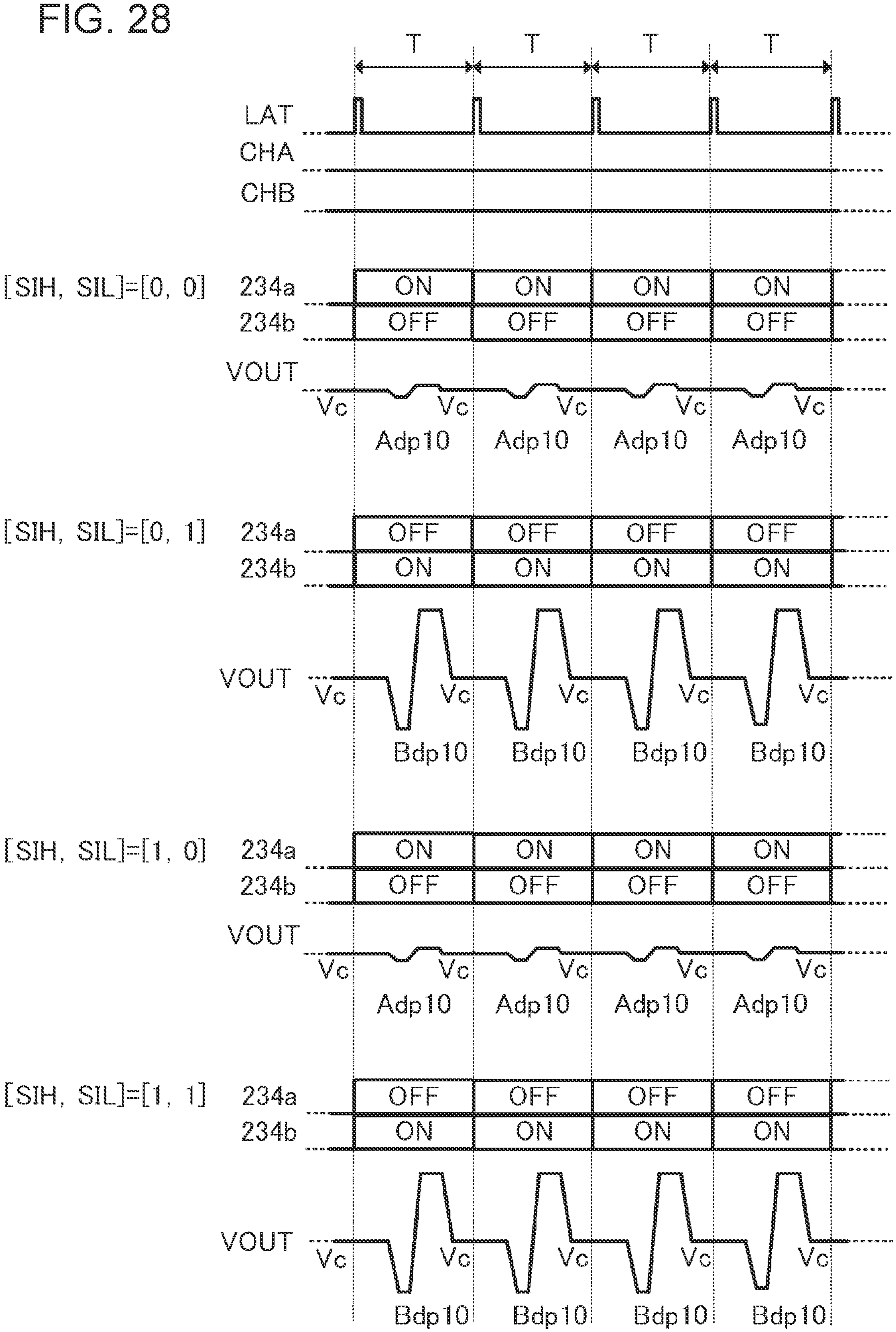
FIG. 28 is a view for describing an operation of the selection circuit when the selection signals illustrated in FIGS. 26 and 27 are supplied.

FIG. 28 is a view for describing an operation of the selection circuit 230 when the selection signals Sa and Sb illustrated in FIGS. 26 and 27 are supplied. The transfer gates 234*a* and 234*b* are turned on or off according to the selection signals Sa and Sb supplied according to the discharge data [SIH, SIL].

Specifically, when [SIH, SIL]=[0, 0], the transfer gate 234*a* is turned on and the transfer gate 234*b* is turned off. In this case, the driving waveform Adp10 is supplied to VOUT, only a slight vibration occurs in the vicinity of the nozzle 651, and ink is not discharged from the nozzle 651. Therefore, dots are not formed on the medium P.

When the discharge data [SIH, SIL]=[0, 1], the transfer gate 234*a* is turned off and the transfer gate 234*b* is turned on. In this case, the driving waveform Bdp10 is supplied to VOUT, a medium amount of ink is discharged once from the nozzle 651, and the ink lands on the medium P. Therefore, dots are formed on the medium P.

When [SIH, SIL]=[1, 0], the transfer gate 234*a* is turned on and the transfer gate 234*b* is turned off. In this case, the driving waveform Adp10 is supplied to VOUT, only a slight vibration occurs in the vicinity of the nozzle 651, and ink is not discharged from the nozzle 651. Therefore, dots are not formed on the medium P.

When the discharge data [SIH, SIL]=[1, 1], the transfer gate 234*a* is turned off and the transfer gate 234*b* is turned on. In this case, the driving waveform Bdp10 is supplied to VOUT, a medium amount of ink is discharged once from the nozzle 651, and the ink lands on the medium P. Therefore, dots are formed on the medium P.

As described above, in the binary mode of the second embodiment, since the setting information signal SP is set such that the bit data of the selection signal Qa1 and the selection signal Qb1 are inverted, printing can be performed in the binary mode by the value of the discharge data [SIL] regardless of the value of the discharge data [SIH]. Specifically, when [SIL]=[0], the ink is not discharged from the nozzle 651, and thus, no dots are formed on the medium P, and when the discharge data [SIL]=[1], the ink is discharged from the nozzle 651 to form dots on the medium P. The discharge data [SIL] is an example of a first discharge control signal.

In other words, in the binary mode of the second embodiment, the head control signal DI may not include the discharge data [SIH]. Since the data size of the head control signal DI can be reduced, the dot formation cycle T corresponding to the printing cycle can be shortened as compared with a case of the multi-gradation mode.

Since the data size of the discharge data [SIH] increases in proportion to the number of nozzles 651, the data size of the optional discharge data [SIH] increases as the number of nozzles 651 increases. In other words, as the number of nozzles 651 increases, the effect of shortening the printing cycle increases.

For example, the data size of the discharge data [SIH] is 400 bits when the number of nozzles 651 is 400, the data size of the discharge data [SIH] is 800 bits when the number of nozzles 651 is 800, and thus, the data size of the optional discharge data [SIH] is 400 bits larger than that when the number of nozzles 651 is 800 as compared with a case where the number of the nozzles 651 is 400.

In the second embodiment, since the multi-gradation mode and the binary mode can be executed with the same hardware configuration, the user can switch the mode in any manner and the range of use is expanded.

Further, in the second embodiment, the selection signals Qa1 to Qa4 and the selection signals Qb1 to Qb4 are generated based on the 32-bit setting information signal SP in both the multi-gradation mode and the binary mode. In the binary mode, the selection signals Qa1 and Qa2 and the selection signals Qb1 and Qb2 may be generated based on the 16-bit setting information signal SP. The data size of the head control signal DI is reduced, and the printing cycle can be shortened.

Further, in the binary mode of the second embodiment, the ink discharge from the nozzle 651 is controlled by using the driving waveforms Adp1, Adp2, Bdp1, and Bdp2, but even with Adp1 alone, the same effect as the effect obtained in the binary mode of the present embodiment can be obtained. In other words, the slight vibration of the nozzle 651 does not occur, and by turning off the transfer gate 234, the control may be performed such that dots are not formed on the medium P. When there is only one driving waveform, the dot formation cycle T may not have to be defined by the change signal CH, and thus, the printing cycle can be further shortened.

9. Third Embodiment

The liquid discharge apparatus 1 in a third embodiment will be described. In describing the liquid discharge apparatus 1 in the third embodiment, the same components as those in the liquid discharge apparatus 1 in the first embodiment will be given the same reference numerals, and the description thereof will be omitted or simplified.

Figure 29A:
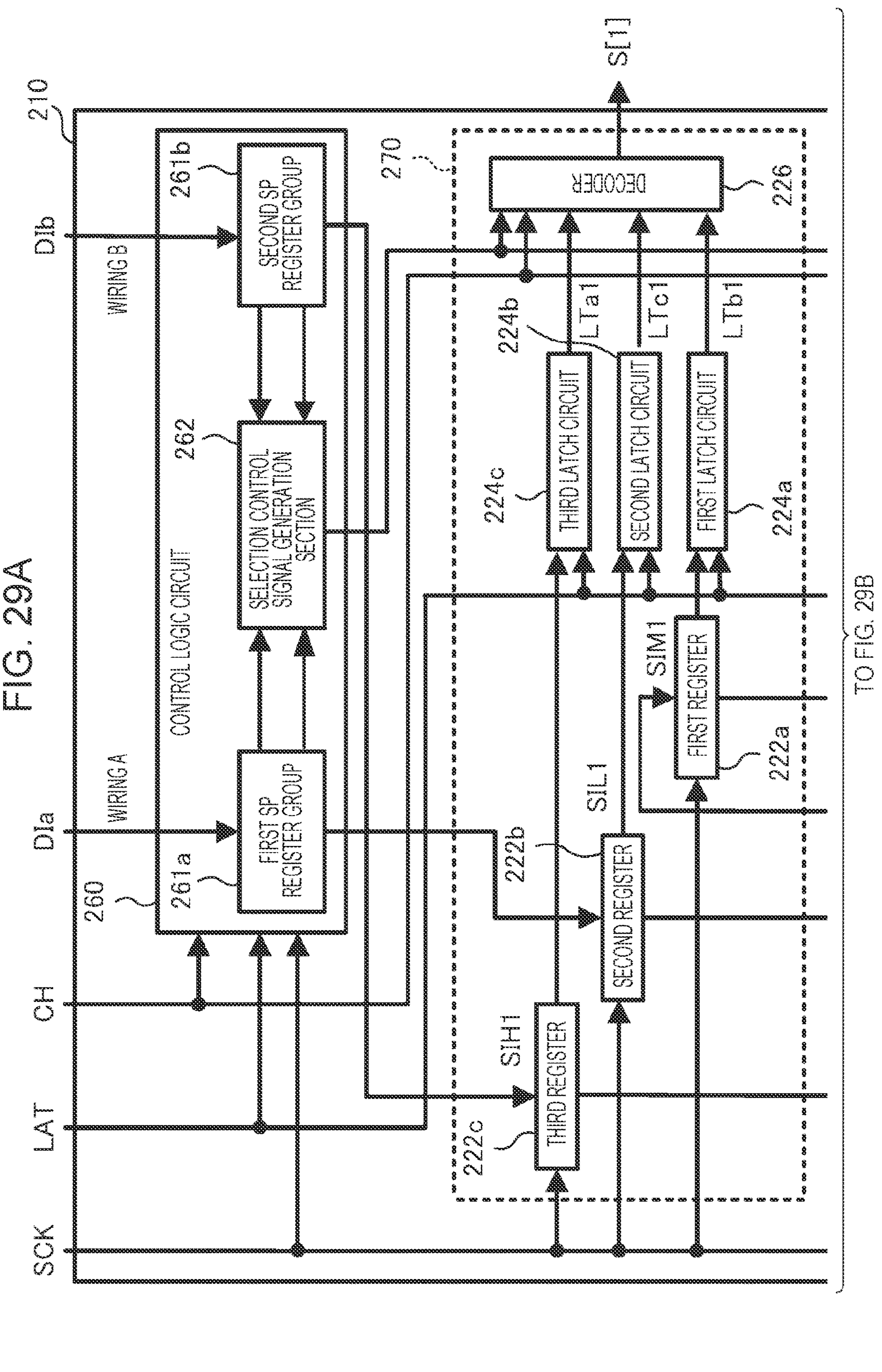
FIGS. 29A and 29B is a view illustrating an electrical configuration of a selection control circuit according to a third embodiment.
Figure 29B:
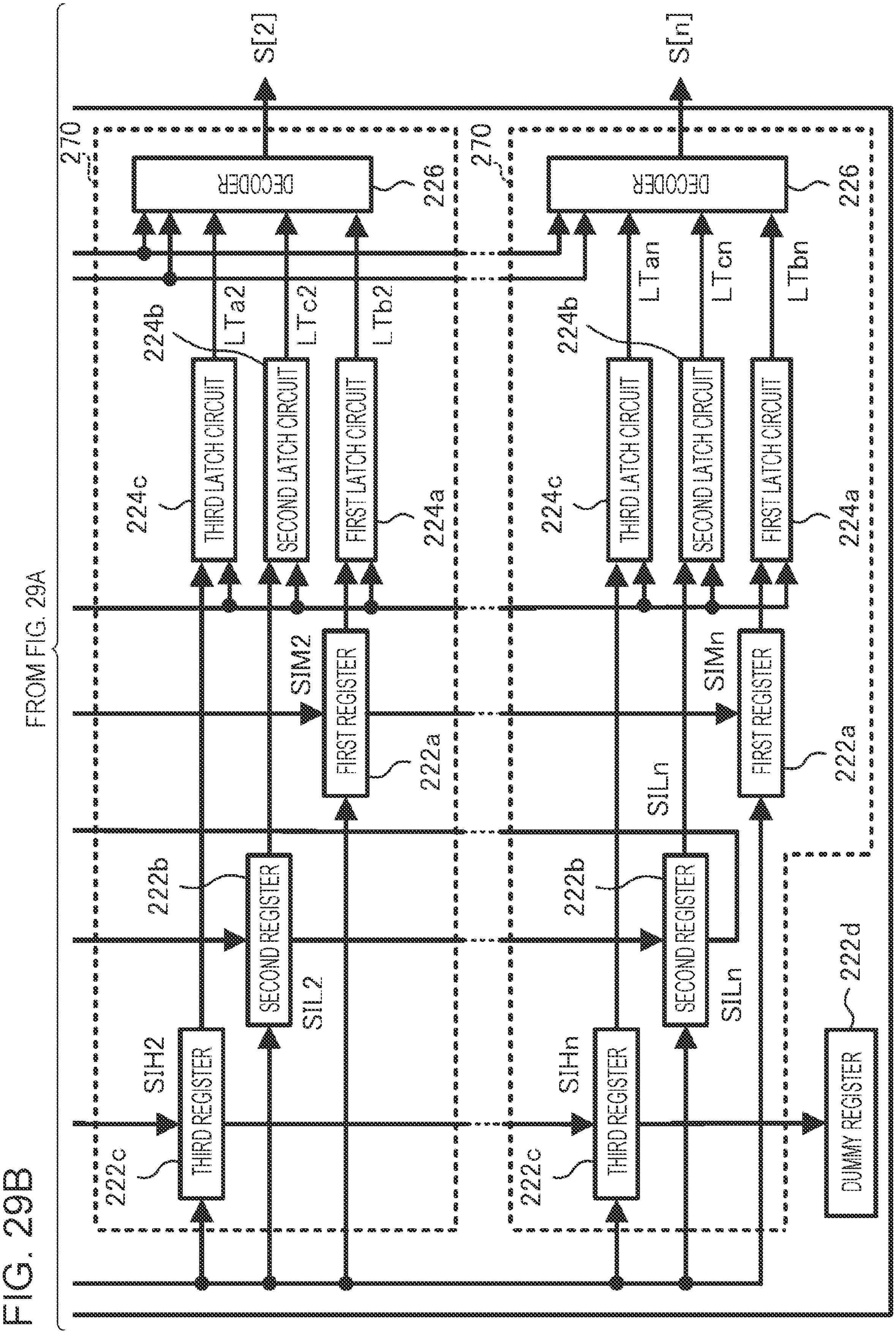

FIGS. 29A and 29B is a view illustrating a configuration of the selection control circuit 210 according to the third embodiment. The head control signals DIa and DIb are input to the selection control circuit 210 of the third embodiment.

Figure 30:
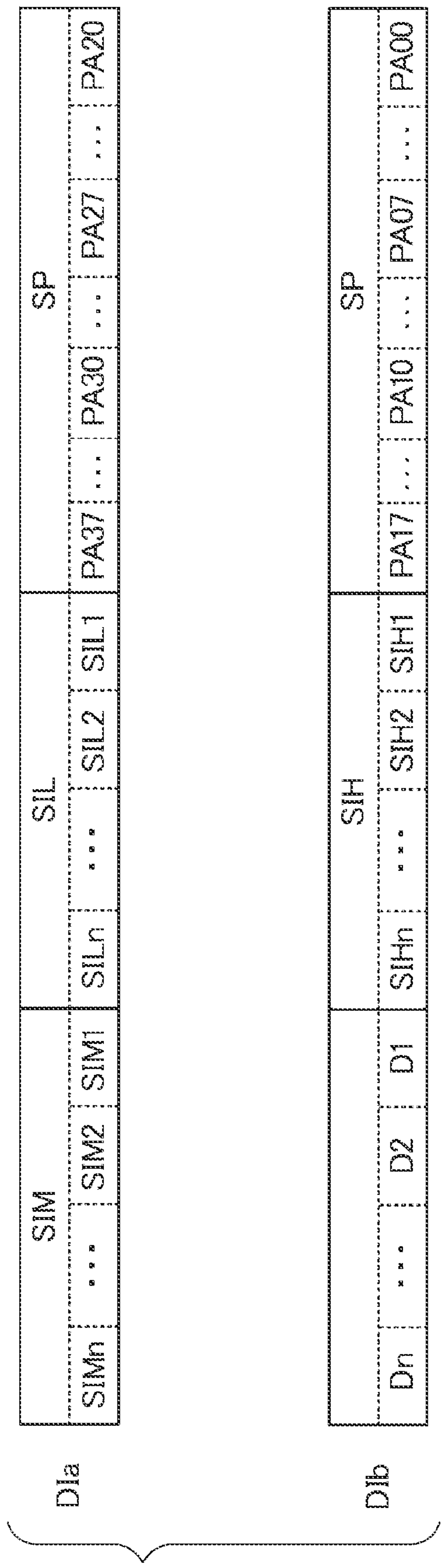
FIG. 30 is a view illustrating an example of a data configuration of a head control signal according to the third embodiment.

Here, the details of the head control signals DIa and DIb including the discharge control signal SI and the setting information signal SP will be described with reference to FIG. 30. FIG. 30 is a view illustrating an example of a data configuration of the head control signals DIa and DIb. As illustrated in FIG. 30, the head control signal DIa includes the discharge control signal SI and the setting information signal SP, and the discharge control signal SI includes middle discharge data SIM and the lower discharge data SIL. The head control signal DIb includes the discharge control signal SI and the setting information signal SP, and the discharge control signal SI includes dummy data D1 to Dn and the upper discharge data SIH.

Specifically, the discharge control signal SI is a signal including 3-bit data of the upper discharge data SIH, the middle discharge data SIM, and the lower discharge data SIL for controlling the drive of the piezoelectric element 60 included in the discharge section 600, corresponding to each of n discharge sections 600.

Specifically, in the discharge control signal SI included in the head control signal DIa, as the n-bit middle discharge data SIM, the middle discharge data SIM corresponding to the discharge section 600[*n*], the middle discharge data SIM corresponding to the discharge section 600[*n*−1], . . . , and the middle discharge data SIM corresponding to the discharge section 600[1] are included serially in this order, and after the middle discharge data SIM, as the n-bit lower discharge data SIL, the lower discharge data SIL corresponding to the discharge section 600[*n*], the lower discharge data SIL corresponding to the discharge section 600[*n*−1], . . . , and the lower discharge data SIL corresponding to the discharge section 600[1] are included serially in this order.

Meanwhile, the discharge control signal SI included in the head control signal DIb serially includes the n-bit upper discharge data SIH in the order of the upper discharge data SIH corresponding to the discharge section 600[*n*], the upper discharge data SIH corresponding to the discharge section 600[*n*−1], . . . , and the upper discharge data SIH corresponding to the discharge section 600[1] after the n-bit dummy data D1 to Dn. Since the dummy data D1 to Dn are held in a dummy register 222*d* and become invalid, the logic level of the dummy data D1 to Dn may be the H level or the L level.

Figures 31, 32:
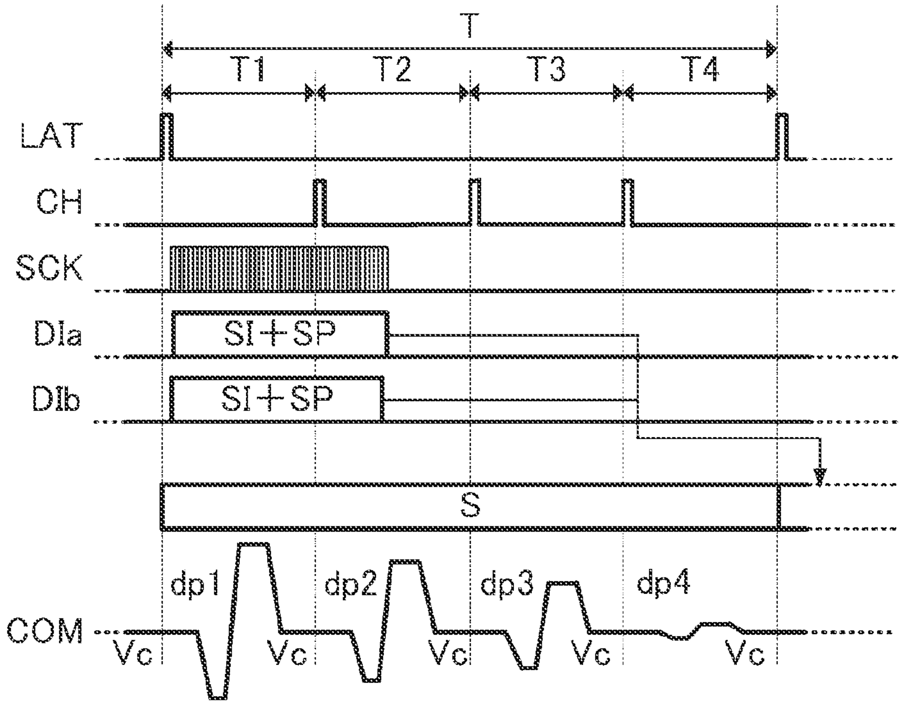
FIG. 31 is a view illustrating decoding contents of a decoder according to the third embodiment.
FIG. 32 is a view for describing the latch signal, the change signal, the clock signal, the head control signal, and the driving signal in a multi-gradation mode according to the third embodiment.

FIG. 31 is a view illustrating decoding contents of the decoder 226. As illustrated in FIG. 31, the decoder 226 outputs the logic level defined by the selection signal Q1 [PA00, PA01, PA02, RA03, PA04, PA05, PA06, PA07] as the selection signal S in the period T1, outputs the logic level defined by the selection signal Q2 [PA10, PA11, PA12, PA13, PA14, PA15, PA16, PA17] as the selection signal S in the period T2, outputs the logic level defined by the selection signal Q3 [PA20, PA21, PA22, PA23, PA24, PA25, PA26, PA27] as the selection signal S in the period T3, and outputs the logic level defined by the selection signal Q4 [PA30, PA31, PA32, PA33, PA34, PA35, PA36, PA37] as the selection signal S in the period T4.

Returning to FIGS. 29A and 29B, the control logic circuit 260 includes a first SP register group 261*a*, a second SP register group 261*b*, and the selection control signal generation section 262. The first SP register group 261*a* includes a plurality of serially coupled registers, and configures a so-called shift register that sequentially propagates the head control signal DIa, which is input in synchronization with the clock signal SCK, to the subsequent registers. When the supply of the clock signal SCK is stopped, of the head control signal DIa, the first SP register group 261*a* holds the setting information PA00 to PA17 included in the setting information signal SP.

The second SP register group 261*b* includes a plurality of serially coupled registers, and configures a so-called shift register that sequentially propagates the head control signal DIb, which is input in synchronization with the clock signal SCK, to the subsequent registers. When the supply of the clock signal SCK is stopped, of the head control signal DIb, the second SP register group 261*b* holds the setting information PB00 to PB17 included in the setting information signal SP.

The selection control signal generation section 262 latches the setting information PA00 to PA17 held in the first SP register group 261*a* at the rise of the latch signal LAT and the setting information PB00 to PB17 held in the second SP register group 261*b*, and generates the selection signals Q1 to Q4 that define the logic level of the selection signal S output from the selection control circuit 210.

Specifically, the selection signal Q1 by translating the latched setting information PA00 to PA07, the selection signal Q2 by translating the latched setting information PA10 to PA17, the selection signal Q3 by translating the latched setting information PB00 to PB07, and the selection signal Q4 by translating the latched setting information PB10 to PB17, are generated and output to the decoder 226 included in each of the n selection signal output sections 270.

The selection control circuit 210 includes the first register 222*a*, the second register 222*b*, a third register 222*c*, and a dummy register 222*d*.

The second register 222*b* included in each of the n selection signal output sections 270 is serially coupled to the subsequent stage of the first SP register group 261*a* including the plurality of registers, and the first register 222*a* included in each of the n selection signal output sections 270 is serially coupled to the subsequent stage of the n second registers 222*b* which are serially coupled. The third register 222*c* included in each of the n selection signal output sections 270 is serially coupled to the subsequent stage of the second SP register group 261*b* including the plurality of registers, and the dummy register 222*d* is serially coupled to the subsequent stage of the n third registers which are serially coupled.

Here, the data size that can be held in the first SP register group 261*a* is an example of a first data size, the data size that can be held in the second register 222*b* is a second data size, and the data size that can be held in the first register 222*a* is a third data size. The data size that can be held in the second SP register group 261*b* is an example of a fourth data size, the data size that can be held in the third register 222*c* is a fifth data size, and the data size that can be held in the dummy register 222*d* is a sixth data size.

The second register 222*b* and the first register 222*a* configure the shift register. The head control signal DIa input to the first SP register group 261*a* is propagated to the subsequent stage in the order of the second register 222*b* and the first register 222*a* in synchronization with the clock signal SCK. After this, when the supply of the clock signal SCK is stopped, the lower discharge data SIL is held in the second register 222*b*, and the middle discharge data SIM is held in the first register 222*a*.

The third register 222*c* and the dummy register 222*d* configure the shift register. The head control signal DIb input to the second SP register group 261*b* is propagated to the subsequent stage in the order of the third register 222*c* and the dummy register 222*d* in synchronization with the clock signal SCK. After this, when the supply of the clock signal SCK is stopped, the upper discharge data SIH is held in the third register 222*c*, and the dummy data D1 to Dn included in the discharge control signal SI are held in the dummy register 222*d*.

The head control signal DIa is an example of head control data. Further, a wiring A for transmitting the head control signal DIa to the first SP register group 261*a*, the second register 222*b*, and the first register 222*a* is an example of a first wiring. Further, the first SP register group 261*a* is an example of a first region, the second register 222*b* is an example of a second region, and the first register 222*a* is an example of a third region. The head control signal DI held in the first SP register group 261*a* is an example of first head control data, the head control signal DI held in the second register 222*b* is an example of second head control data, and the head control signal DI held in the first register 222*a* is an example of third head control data.

The head control signal DIb is an example of head control data. A wiring B for transmitting the head control signal DIb to the second SP register group 261*b*, the third register 222*c*, and the dummy register 222*d* is an example of a third wiring. The second SP register group 261*b* is an example of a fourth region, the third register 222*c* is an example of a fifth region, and the dummy register 222*d* is an example of a sixth region. The head control signal DI held in the second SP register group 261*b* is an example of fourth head control data, the head control signal DI held in the third register 222*c* is an example of fifth head control data, and the head control signal DI held in the dummy register 222*d* is an example of sixth head control data.

The middle discharge data SIM held in the first register 222*a* is latched by the corresponding first latch circuit 224*a* at the rise of the latch signal LAT, the lower discharge data SIL held in the second register 222*b* is latched by the corresponding second latch circuit 224*b* at the rise of the latch signal LAT, and the upper discharge data SIH held in the third register 222*c* is latched by a corresponding third latch circuit 224*c* at the rise of the latch signal LAT. The dummy data D1 to Dn included in the discharge control signal SI held in the dummy register 222*d* are invalid data.

The first latch circuit 224*a* outputs the latched middle discharge data SIM as the latch data LTb to the decoder 226. The second latch circuit 224*b* outputs the latched lower discharge data SIL as the latch data LTc to the decoder 226. The third latch circuit 224*c* outputs the latched upper discharge data SIH as the latch data LTa to the decoder 226.

10. Multi-Gradation Mode in Third Embodiment

FIG. 32 is a view illustrating an example of the latch signal LAT, the change signal CH, the clock signal SCK, the head control signals DIa and DIb, and the driving signal COM which are input to the selection control circuit 210, in the multi-gradation mode of the third embodiment. Here, an example is illustrated in which the driving signal COM has four types of driving waveforms, and the dot formation cycle T is defined as four periods T1 to T4 by three change signals CH. The multi-gradation mode is an example of a first print mode.

The driving waveform dp3 is a waveform for discharging a small amount of ink from the nozzle 651, and the driving waveform dp2 is a waveform for discharging a medium amount of ink, which is larger than a small amount, from the nozzle 651. The driving waveform dp1 is a waveform for discharging a large amount of ink, which is larger than a medium amount, from the nozzle 651. The dp4 is a waveform that does not discharge the ink from the nozzle 651, and is a waveform for slightly vibrating the ink near the opening portion of the nozzle 651 to prevent an increase in ink viscosity.

Figure 33:
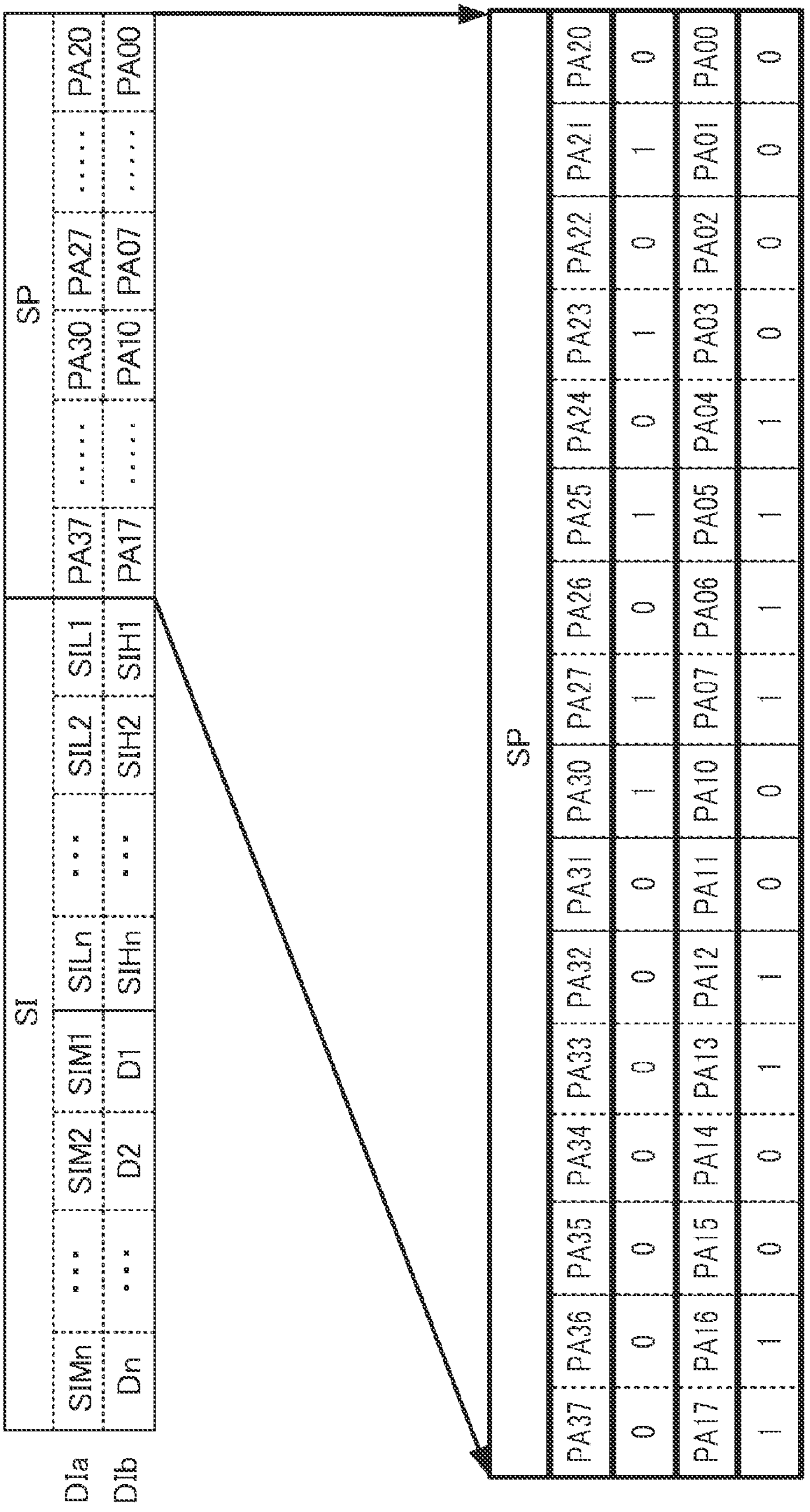
FIG. 33 is a view illustrating an example of head control signals output by a control mechanism during a discharge control period in the multi-gradation mode of the third embodiment.

FIG. 33 is a view illustrating an example of the head control signals DIa and DIb output by the control mechanism 10 during the discharge control period in the multi-gradation mode of the third embodiment. Here, the discharge control signal SI included in each of the head control signals DIa and DIb is a signal that defines the amount of ink discharged for each of the n nozzles 651, and the logic level is appropriately changed during the discharge control period. In other words, the discharge data [SIH, SIM, SIL] included in the discharge control signal SI is either 0 or 1 according to the amount of ink discharged from the corresponding nozzle 651 in the dot formation cycle T. Further, since the dummy data D1 to Dn of the discharge control signal SI are held in the dummy register 222*d* and become invalid data, either 0 or 1 may be used.

As illustrated in FIG. 33, during the discharge control period, the control mechanism 10 outputs the head control signal DIa including the setting information PA37 to PA20 that configure the setting information signal SP to the selection control circuit 210, and outputs the head control signal DIb including the setting information PA17 to PA00 to the selection control circuit 210. In this case, the setting information signal SP is 32 bits. Here, the setting information signal SP including the setting information PA37 to PA20 and the setting information PA17 to PA00 is an example of a setting information signal group.

FIG. 34 is a view illustrating decoding contents in the decoder 226 included in the selection control circuit 210 during the discharge control period. As illustrated in FIG. 34, the decoder 226 outputs the selection signal S corresponding to the discharge data [SIH, SIM, SIL].

Specifically, the setting information, in which each of the setting information PA37, PA36, PA35, PA34, PA33, PA32, PA31, and PA30 held in the first SP register group 261*a* is "0", "0", "0", "0", "0", "0", "0", and "1", is output to the selection control circuit 210, and the setting information, in which each of the setting information PA27, PA26, PA25, PA24, PA23, PA22, PA21, and PA20 is "1", "0", "1", "0", "1", "0", "1", and "0", is output to the selection control circuit 210.

After this, the setting information, in which each of the setting information PA17, PA16, PA15, PA14, PA13, PA12, PA11, and PA10 held in the second SP register group 261*b* is "1", "1", "0", "0", "1", "1", "0", and "0", is output to the selection control circuit 210, and the setting information, in which each of the setting information PA07, PA06, PA05, PA04, PA03, PA02, PA01, and PA00 is "1", "1", "1", "1", "0", "0", "0", and "0", is output to the selection control circuit 210.

Therefore, the selection control signal generation section 262 included in the control logic circuit 260 included in the selection control circuit 210 generates the selection signals Q1 to Q4 based on the setting information PA and outputs the selection signals Q1 to Q4 to the decoder 226. Specifically, the selection control circuit 210 generates the selection signal Q1 [PA00, PA01, PA02, PA03, PA04, PA05, PA06, PA07]=[0, 0, 0, 0, 1, 1, 1, 1], the selection signal Q2 [PA10, PA11, PA12, PA13, PA14, PA15, PA16, PA17]=[0, 0, 1, 1, 0, 0, 1, 1], the selection signal Q3 [PA20, PA21, PA22, PA23, PA24, PA25, PA26, PA27]=[0, 1, 0, 1, 0, 1, 0, 1], and the selection signal Q4 [PA30, PA31, PA32, PA33, PA34, PA35, PA36, PA37]=[1, 0, 0, 0, 0, 0, 0, 0], and outputs the generated signals to the decoder 226.

During the dot formation cycle T, the decoder 226 included in the selection control circuit 210 outputs the L level selection signal S in the period T1, the L level selection signal S in the period T2, the L level selection signal S in the period T3, and the H level selection signal S in the period T4 when the discharge data [SIH, SIM, SIL]=[0, 0, 0] is input, and outputs the L level selection signal S in the period T1, the L level selection signal S in the period T2, the H level selection signal S in the period T3, and the L level selection signal S in the period T4 when the discharge data [SIH, SIM, SIL]=[0, 0, 1] is input. The decoder 226 outputs the L level selection signal S in the period T1, the H level selection signal S in the period T2, the L level selection signal S in the period T3, and the L level selection signal S in the period T4 when the discharge data [SIH, SIM, SIL]=[0, 1, 0] is input, and outputs the L level selection signal S in the period T1, the H level selection signal S in the period T2, the H level selection signal S in the period T3, and the L level selection signal S in the period T4 when the discharge data [SIH, SIM, SIL]=[0, 1, 1] is input.

Further, the decoder 226 included in the selection control circuit 210 outputs the H level selection signal S in the period T1, the L level selection signal S in the period T2, the L level selection signal S in the period T3, and the L level selection signal S in the period T4 when the discharge data [SIH, SIM, SIL]=[1, 0, 0] is input, and outputs the H level selection signal S in the period Tl, the L level selection signal S in the period T2, the H level selection signal S in the period T3, and the L level selection signal S in the period T4 when the discharge data [SIH, SIM, SIL]=[1, 0, 1] is input. The decoder 226 outputs the H level selection signal S in the period T1, the H level selection signal S in the period T2, the L level selection signal S in the period T3, and the L level selection signal S in the period T4 when the discharge data [SIH, SIM, SIL]=[1, 1, 0] is input, and outputs the H level selection signal S in the period T1, the H level selection signal S in the period T2, the H level selection signal S in the period T3, and the L level selection signal S in the period T4 when the discharge data [SIH, SIM, SIL]=[1, 1, 1] is input.

Figure 35:
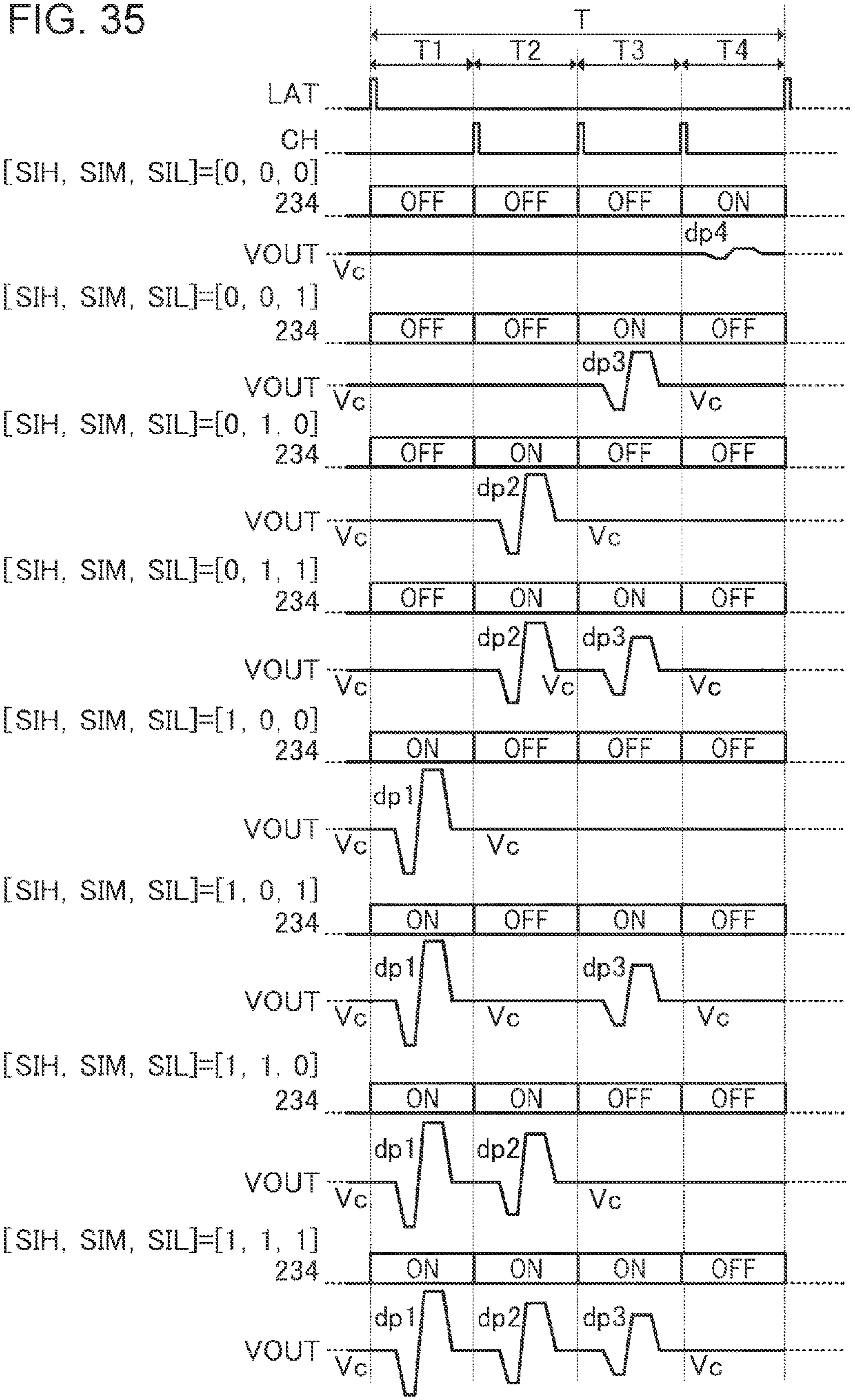
FIG. 35 is a view for describing an operation of a selection circuit when the selection signal illustrated in FIG. 34 is supplied.

FIG. 35 is a view for describing an operation of the selection circuit 230 when the selection signal S illustrated in FIG. 34 is supplied. The transfer gate 234 is turned on or off according to the selection signal S supplied according to the discharge data [SIH, SIM, SIL].

Specifically, when the [SIH, SIM, SIL]=[0, 0, 0], the transfer gate 234 is turned off in the period T1, turned off in the period T2, turned off in the period T3, and turned on in the period T4. When the discharge data [SIH, SIM, SIL]=[0, 0, 1], the transfer gate 234 is turned off in the period T1, turned off in the period T2, turned on in the period T3, and turned off in the period T4.

When the discharge data [SIH, SIM, SIL]=[0, 1, 0], the transfer gate 234 is turned off in the period T1, turned on in the period T2, turned off in the period T3, and turned off in the period T4. When the discharge data [SIH, SIM, SIL]=[0, 1, 1], the transfer gate 234 is turned off in the period T1, turned on in the period T2, turned on in the period T3, and turned off in the period T4.

When the [SIH, SIM, SIL]=[1, 0, 0], the transfer gate 234 is turned on in the period T1, turned off in the period T2, turned off in the period T3, and turned off in the period T4. When the discharge data [SIH, SIM, SIL]=[1, 0, 1], the transfer gate 234 is turned on in the period T1, turned off in the period T2, turned on in the period T3, and turned off in the period T4.

When the discharge data [SIH, SIM, SIL]=[1, 1, 0], the transfer gate 234 is turned on in the period T1, turned on in the period T2, turned off in the period T3, and turned off in the period T4. When the discharge data [SIH, SIM, SIL]=[1, 1, 1], the transfer gate 234 is turned on in the period T1, turned on in the period T2, turned on in the period T3, and turned off in the period T4.

Here, in order to illustrate the gradation in the multi-gradation mode of the third embodiment, the amount of ink discharged from the nozzle 651 by the driving waveforms dp1 to dp4 is assumed as follows. It is assumed that the amount of ink discharged from the nozzle 651 by the driving waveform dp1 is "4", the amount of ink discharged from the nozzle 651 by the driving waveform dp2 is "2", the amount of ink discharged from the nozzle 651 by the driving waveform dp3 is "1", and the amount of ink discharged from the nozzle 651 by the driving waveform dp4 is "0".

The dots formed on the medium P will be described for each discharge data [SIH, SIM, SIL]. When the discharge data [SIH, SIM, SIL]=[0, 0, 0], a constant waveform at the voltage Vc is supplied as VOUT in periods other than the period T4, and the driving waveform dp4 is supplied as VOUT in the period T4, to the corresponding piezoelectric element 60. In this case, the vicinity of the nozzle 651 only slightly vibrates, and dots are not formed. Therefore, the amount of ink discharged from the nozzle 651 is "0".

When the discharge data [SIH, SIM, SIL]=[0, 0, 1], a constant waveform at the voltage Vc is supplied as VOUT to the corresponding piezoelectric element 60 in periods other than the period T3. In the period T3, the driving waveform dp3 is supplied as VOUT and dots are formed. Therefore, the amount of ink discharged from the nozzle 651 is "1".

When the discharge data [SIH, SIM, SIL]=[0, 1, 0], a constant waveform at the voltage Vc is supplied as VOUT to the corresponding piezoelectric element 60 in periods other than the period T2. In the period T2, the driving waveform dp2 is supplied as VOUT and dots are formed. Therefore, the amount of ink discharged from the nozzle 651 is "2".

When the discharge data [SIH, SIM, SIL]=[0, 1, 1], a constant waveform at the voltage Vc is supplied as VOUT to the corresponding piezoelectric element 60 in periods other than the periods T2 and T3. In the period T2, the driving waveform dp2 is supplied as VOUT, and in the period T3, the driving waveform dp3 is supplied as VOUT, and dots are formed. Therefore, the amount of ink discharged from the nozzle 651 is "3".

When the discharge data [SIH, SIM, SIL]=[1, 0, 0], a constant waveform at the voltage Vc is supplied as VOUT to the corresponding piezoelectric element 60 in periods other than the period T1. In the period T1, the driving waveform dp1 is supplied as VOUT and dots are formed. Therefore, the amount of ink discharged from the nozzle 651 is "4".

When the discharge data [SIH, SIM, SIL]=[1, 0, 1], a constant waveform at the voltage Vc is supplied as VOUT to the corresponding piezoelectric element 60 in periods other than the periods T1 and T3. In the period T1, the driving waveform dp1 is supplied as VOUT, and in the period T3, the driving waveform dp3 is supplied as VOUT, and dots are formed. Therefore, the amount of ink discharged from the nozzle 651 is "5".

When the discharge data [SIH, SIM, SIL]=[1, 1, 0], a constant waveform at the voltage Vc is supplied as VOUT to the corresponding piezoelectric element 60 in periods other than the periods T1 and T2. In the period T1, the driving waveform dp1 is supplied as VOUT, and in the period T2, the driving waveform dp2 is supplied as VOUT, and dots are formed. Therefore, the amount of ink discharged from the nozzle 651 is "6".

When the discharge data [SIH, SIM, SIL]=[1, 1, 1], a constant waveform at the voltage Vc is supplied as VOUT to the corresponding piezoelectric element 60 in the period T4. In the period T1, the driving waveform dp1 is supplied as VOUT, in the period T2, the driving waveform dp2 is supplied as VOUT, in the period T3, dp3 is supplied as VOUT, and dots are formed. Therefore, the amount of ink discharged from the nozzle 651 is "7".

As described above, during the discharge control period, the control mechanism 10 outputs the head control signals DIa and DIb to the liquid discharge head 21, such that the liquid discharge head 21 can form eight types of dots including non-recording on the medium P based on the discharge control signal SI and the setting information signal SP. As a result, the liquid discharge apparatus 1 can perform printing in eight gradations, and can form a high-definition image on the medium P. The gradation number 8 in the multi-gradation mode of the third embodiment is an example of a first gradation number.

11. Binary Mode in Third Embodiment

Figure 36:
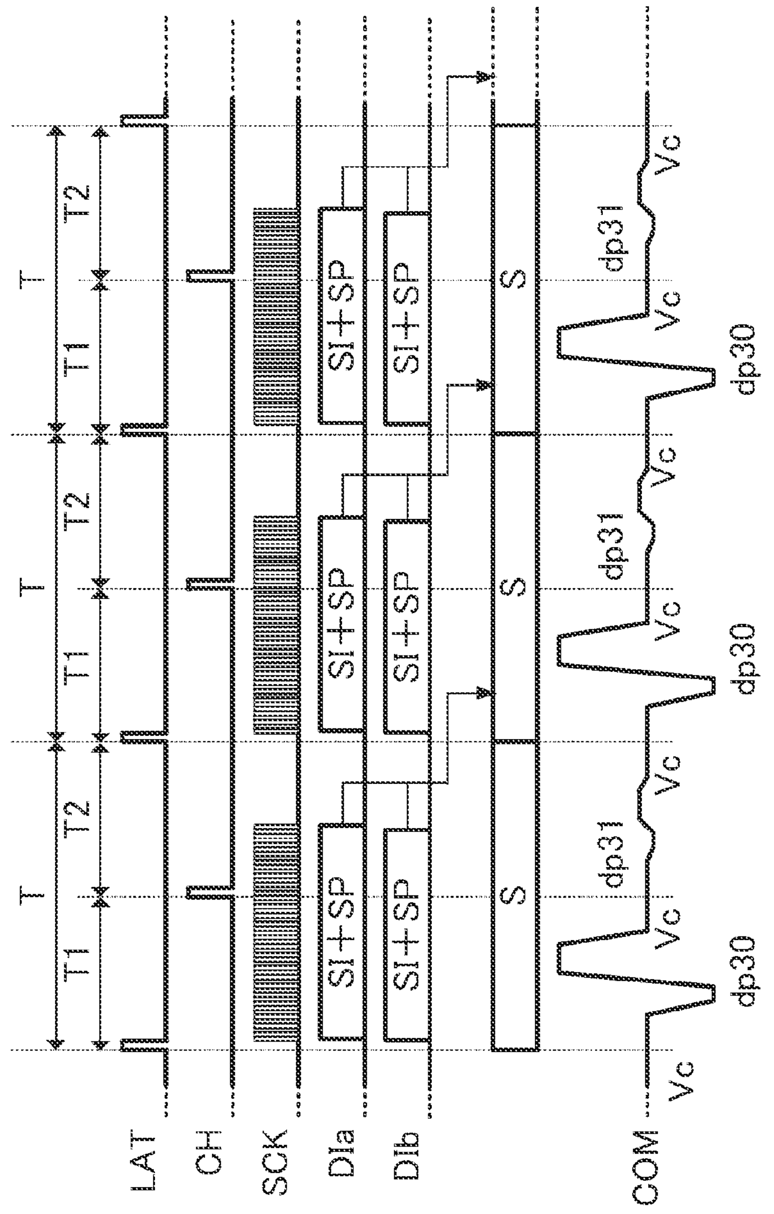
FIG. 36 is a view for describing the latch signal, the change signal, the clock signal, the head control signal, and the driving signal in a binary mode of the third embodiment.

FIG. 36 is a view illustrating an example of the latch signal LAT, the change signal CH, the clock signal SCK, the head control signals DIa and DIb, and the driving signal COM which are input to the selection control circuit 210, in the binary mode of the third embodiment. Here, an example is illustrated in which the driving signal COM is configured with two types of driving waveforms, and the dot formation cycle T is defined as two periods T1 and T2 by one change signal CH. Since the other items are the same as those in FIG. 6, the description thereof will be omitted. The binary mode is an example of a second print mode.

A driving waveform dp30 is a waveform for discharging the medium amount of ink from the nozzle 651, and a driving waveform dp31 is a waveform that does not discharge the ink from the nozzle 651, and is a waveform for slightly vibrating the ink in the vicinity of the opening portion of the nozzle 651 to prevent an increase in ink viscosity. It is switched whether or not to supply these two types of driving waveforms dp30 and dp31 as VOUT to the discharge section 600, and it is controlled whether or not to discharge ink from the nozzle 651. In other words, in the binary mode, the gradation number of the dots to be formed is 2 because the two states, that is, a state of discharging ink from the nozzle 651 and a state of not discharging ink, are controlled. The gradation number 2 in the binary mode in the third embodiment is an example of a second gradation number.

Figure 37:
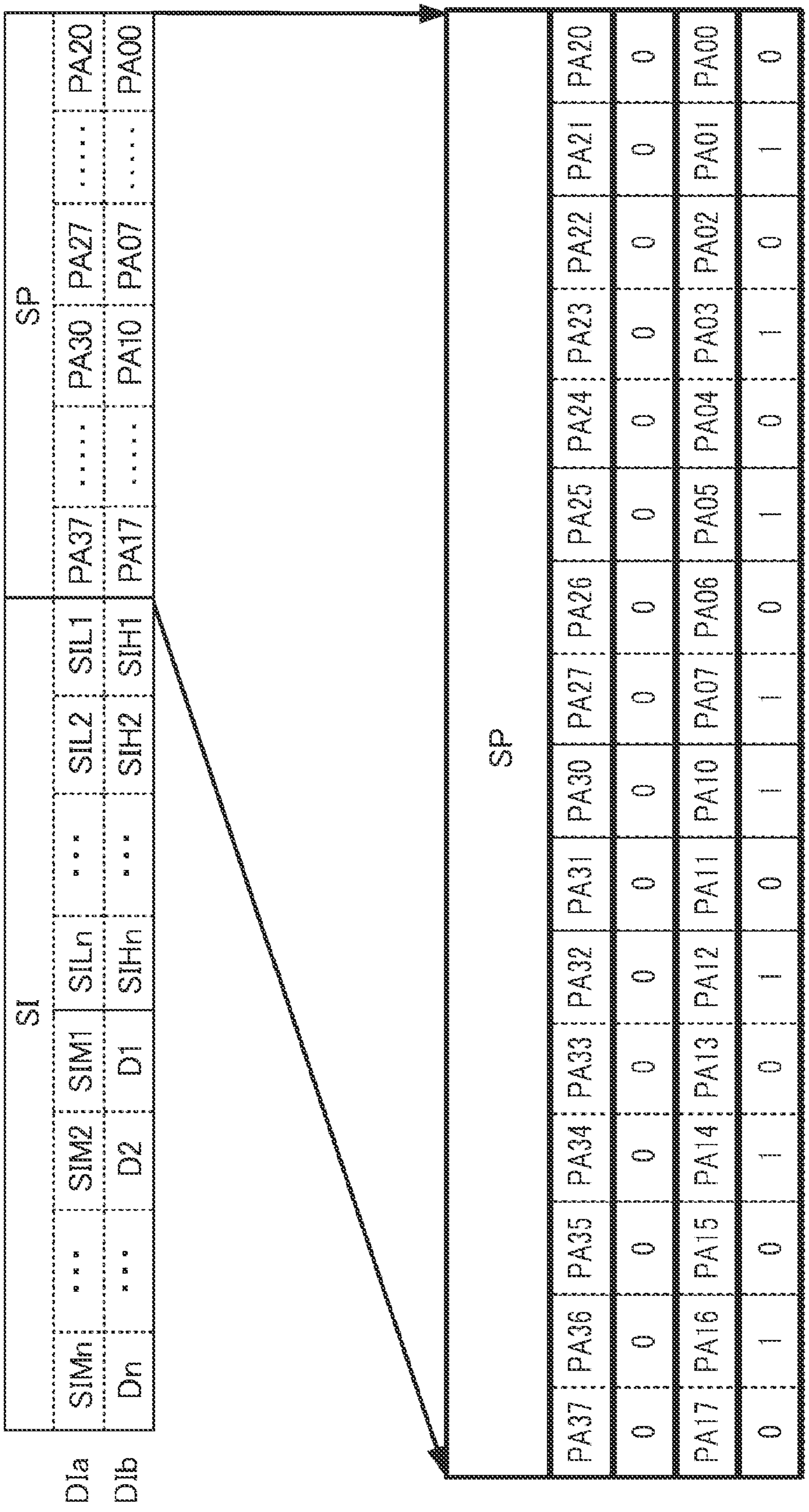
FIG. 37 is a view illustrating an example of the head control signals output by the control mechanism during the discharge control period in the binary mode of the third embodiment.

FIG. 37 is a view illustrating an example of the head control signals DIa and DIb output by the control mechanism 10 during the discharge control period in the binary mode of the third embodiment. Here, the discharge control signal SI included in each of the head control signals DIa and DIb is a signal that defines the amount of ink discharged for each of the n nozzles 651, and the logic level is appropriately changed during the discharge control period. In other words, the discharge data [SIH, SIM, SIL] included in the discharge control signal SI is either 0 or 1 according to the amount of ink discharged from the corresponding nozzle 651 in the dot formation cycle T. Further, since the dummy data D1 to Dn of the discharge control signal SI are held in the dummy register 222*d* and become invalid data, either 0 or 1 may be used.

As illustrated in FIG. 37, during the discharge control period, the control mechanism 10 outputs the head control signal DIa including the setting information PA37 to PA20 that configure the setting information signal SP to the selection control circuit 210, and outputs the head control signal DIb including the setting information PA17 to PA00 to the selection control circuit 210. In this case, the setting information signal SP is 32 bits. Here, the setting information signal SP including the setting information PA37 to PA20 and the setting information PA17 to PA00 is an example of a setting information signal group.

FIG. 38 is a view illustrating decoding contents in the decoder 226 included in the selection control circuit 210 during the discharge control period. As illustrated in FIG. 34, the decoder 226 outputs the selection signal S corresponding to the discharge data [SIH, SIM, SIL].

Specifically, the setting information, in which each of the setting information PA37, PA36, PA35, PA34, PA33, PA32, PA31, and PA30 held in the first SP register group 261*a* is "0", "0", "0", "0", "0", "0", "0", and "0", is output to the selection control circuit 210, and the setting information, in which each of the setting information PA27, PA26, PA25, PA24, PA23, PA22, PA21, and PA20 is "0", "0", "0", "0", "0", "0", "0", and "0", is output to the selection control circuit 210.

After this, the setting information, in which each of the setting information PA17, PA16, PA15, PA14, PA13, PA12, PA11, and PA10 held in the second SP register group 261*b*is "0", "1", "0", "1", "0", "1", "0", and "1", is output to the selection control circuit 210, and the setting information, in which each of the setting information PA07, PA06, PA05, PA04, PA03, PA02, PA01, and PA00 is "1", "0", "1", "0", "1", "0", "1", and "0", is output to the selection control circuit 210.

Therefore, the selection control signal generation section 262 included in the control logic circuit 260 included in the selection control circuit 210 generates the selection signals Q1 to Q4 based on the setting information PA and outputs the selection signals Q1 to Q4 to the decoder 226. Specifically, the selection control circuit 210 generates the selection signal Q1 [PA00, PA01, PA02, PA03, PA04, PA05, PA06, PA07]=[0, 1, 0, 1, 0, 1, 0, 1], the selection signal Q2 [PA10, PA11, PA12, PA13, PA14, PA15, PA16, PA17]=[1, 0, 1, 0, 1, 0, 1, 0], the selection signal Q3 [PA20, PA21, PA22, PA23, PA24, PA25, PA26, PA27]=[0, 0, 0, 0, 0, 0, 0, 0], and the selection signal Q4 [PA30, PA31, PA32, PA33, PA34, PA35, PA36, PA37]=[0, 0, 0, 0, 0, 0, 0, 0], and outputs the generated signals to the decoder 226.

Here, since the setting information signal SP is set such that the bit data of the setting information PA00 to PA07 and the setting information PA10 to PA17 are inverted, the bit data of the selection signal Q1 and the selection signal Q2 are inverted. Here, the setting information PA00 to PA07 are examples of a first setting information signal, and the setting information PA10 to PA17 are examples of a second setting information signal.

During the dot formation cycle T, the decoder 226 included in the selection control circuit 210 outputs the L level selection signal S in the period T1 and the H level selection signal S in the period T2 when the discharge data [SIH, SIM, SIL]=[0, 0, 0] is input, and outputs the H level selection signal S in the period T1 and the L level selection signal S in the period T2 when the discharge data [SIH, SIM, SIL]=[0, 0, 1] is input. When the discharge data [SIH, SIM, SIL]=[0, 1, 0] is input, the L level selection signal is output in the period T1 and the H level selection signal is output in the period T2, and when the discharge data [SIH, SIM, SIL]=[0, 1, 1] is input, the H level selection signal is output in the period T1 and the L level selection signal is output in the period T2.

When the discharge data [SIH, SIM, SIL]=[1, 0, 0] is input, the L level selection signal is output in the period T1 and the H level selection signal is output in the period T2, and when the discharge data [SIH, SIM, SIL]=[1, 0, 1] is input, the H level selection signal is output in the period T1 and the L level selection signal is output in the period T2. When the discharge data [SIH, SIM, SIL]=[1, 1, 0] is input, the L level selection signal is output in the period T1 and the H level selection signal is output in the period T2, and when the discharge data [SIH, SIM, SIL]=[1, 1, 1] is input, the H level selection signal is output in the period T1 and the L level selection signal is output in the period T2.

Figure 39:
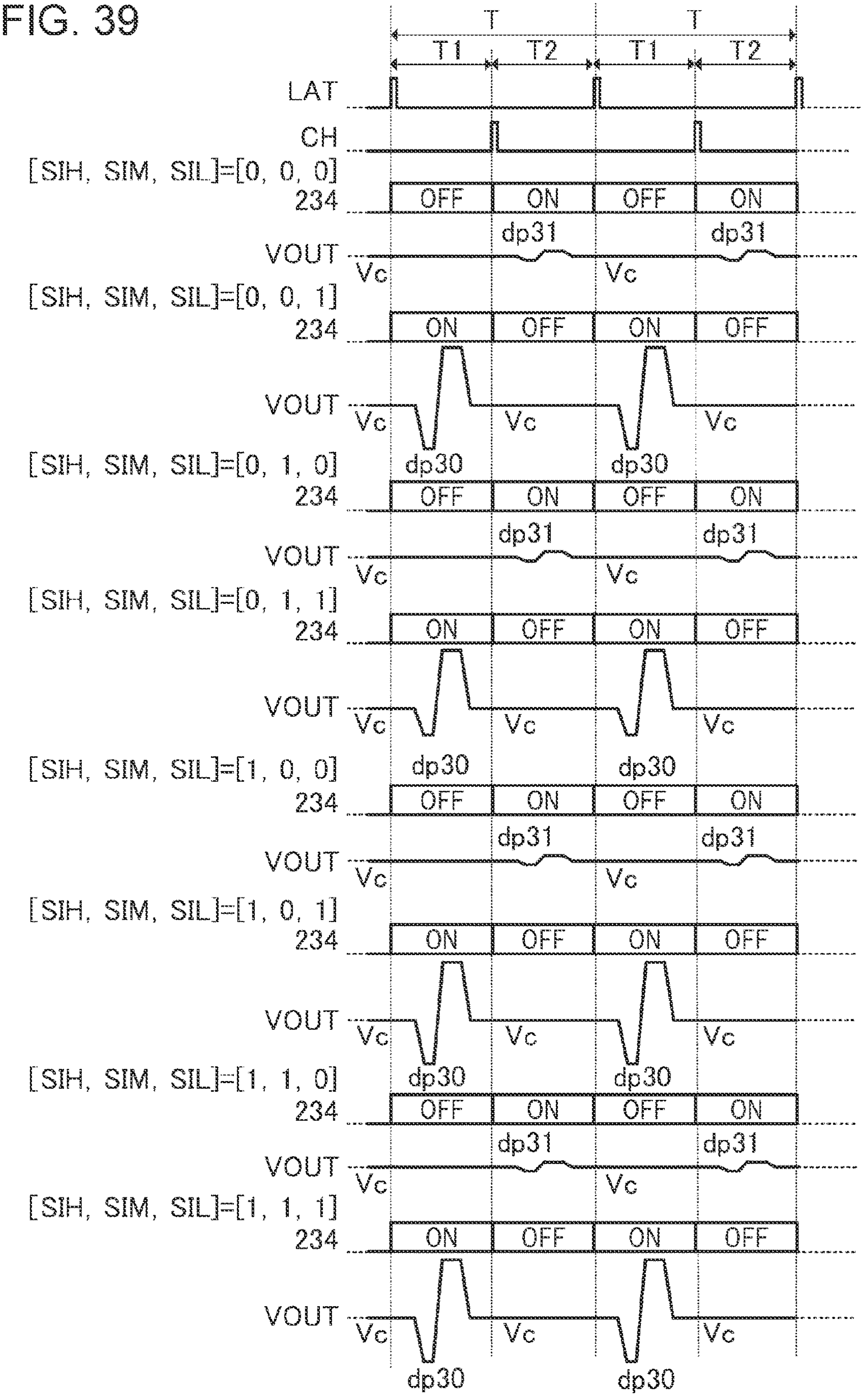
FIG. 39 is a view for describing an operation of the selection circuit when the selection signal illustrated in FIG. 38 is supplied.

FIG. 39 is a view for describing an operation of the selection circuit 230 when the selection signal S illustrated in FIG. 38 is supplied. The transfer gate 234 is turned on or off according to the selection signal S supplied according to the discharge data [SIH, SIM, SIL].

Specifically, when [SIH, SIM, SIL]=[0, 0, 0], the transfer gate 234 is turned off in the period T1 and turned on in the period T2. Further, when the discharge data [SIH, SIM, SIL]=[0, 0, 1], the transfer gate 234 is turned on in the period T1 and turned off in the period T2.

When the discharge data [SIH, SIM, SIL]=[0, 1, 0], the transfer gate 234 is turned off in the period T1 and turned on in the period T2. When the discharge data [SIH, SIM, SIL]=[0, 1, 1], the transfer gate 234 is turned on in the period T1 and turned off in the period T2.

When [SIH, SIM, SIL]=[1, 0, 0], the transfer gate 234 is turned off in the period T1 and turned on in the period T2. Further, when the discharge data [SIH, SIM, SIL]=[1, 0, 1], the transfer gate 234 is turned on in the period T1 and turned off in the period T2.

When the discharge data [SIH, SIM, SIL]=[1, 1, 0], the transfer gate 234 is turned off in the period T1 and turned on in the period T2. When the discharge data [SIH, SIM, SIL]=[1, 1, 1], the transfer gate 234 is turned on in the period T1 and turned off in the period T2.

Next, the dots formed on the medium P will be described for each discharge data [SIH, SIM, SIL]. When the discharge data [SIH, SIM, SIL]=[0, 0, 0], a constant waveform at the voltage Vc is supplied as VOUT in the period T1, and the driving waveform dp31 is supplied as VOUT in the period T2, to the corresponding piezoelectric element 60. In this case, only a slight vibration occurs in the vicinity of the nozzle 651, and ink is not discharged from the nozzle 651. Therefore, dots are not formed on the medium P.

When the discharge data [SIH, SIM, SIL]=[0, 0, 1], a constant waveform at the voltage Vc is supplied as VOUT in the period T2, and the driving waveform dp30 is supplied as VOUT in the period T1, to the corresponding piezoelectric element 60. In this case, a medium amount of ink is discharged once from the nozzle 651 and lands on the medium P. Therefore, dots are formed on the medium P.

When the discharge data [SIH, SIM, SIL]=[0, 1, 0], a constant waveform at the voltage Vc is supplied as VOUT in the period T1, and the driving waveform dp31 is supplied as VOUT in the period T2, to the corresponding piezoelectric element 60. In this case, only a slight vibration occurs in the vicinity of the nozzle 651, and ink is not discharged from the nozzle 651. Therefore, dots are not formed on the medium P.

When the discharge data [SIH, SIM, SIL]=[0, 1, 1], a constant waveform at the voltage Vc is supplied as VOUT in the period T2, and the driving waveform dp30 is supplied as VOUT in the period T1, to the corresponding piezoelectric element 60. In this case, a medium amount of ink is discharged once from the nozzle 651 and lands on the medium P. Therefore, dots are formed on the medium P.

When the discharge data [SIH, SIM, SIL]=[1, 0, 0], a constant waveform at the voltage Vc is supplied as VOUT in the period T1, and the driving waveform dp31 is supplied as VOUT in the period T2, to the corresponding piezoelectric element 60. In this case, only a slight vibration occurs in the vicinity of the nozzle 651, and ink is not discharged from the nozzle 651. Therefore, dots are not formed on the medium P.

When the discharge data [SIH, SIM, SIL]=[1, 0, 1], a constant waveform at the voltage Vc is supplied as VOUT in the period T2, and the driving waveform dp30 is supplied as VOUT in the period T1, to the corresponding piezoelectric element 60. In this case, a medium amount of ink is discharged once from the nozzle 651 and lands on the medium P. Therefore, dots are formed on the medium P.

When the discharge data [SIH, SIM, SIL]=[1, 1, 0], a constant waveform at the voltage Vc is supplied as VOUT in the period T1, and the driving waveform dp31 is supplied as VOUT in the period T2, to the corresponding piezoelectric element 60. In this case, only a slight vibration occurs in the vicinity of the nozzle 651, and ink is not discharged from the nozzle 651. Therefore, dots are not formed on the medium P.

When the discharge data [SIH, SIM, SIL]=[1, 1, 1], a constant waveform at the voltage Vc is supplied as VOUT in the period T2, and the driving waveform dp30 is supplied as VOUT in the period T1, to the corresponding piezoelectric element 60. In this case, a medium amount of ink is discharged once from the nozzle 651 and lands on the medium P. Therefore, dots are formed on the medium P.

As described above, in the binary mode of the third embodiment, since the setting information signal SP is set such that the bit data of the selection signal Q1 and the selection signal Q2 are inverted, printing can be performed in the binary mode by the value of the discharge data [SIL] regardless of the values of the discharge data [SIH] and the discharge data [SIM]. Specifically, when [SIL]=[0], the ink is not discharged from the nozzle 651, and thus, no dots are formed on the medium P, and when the discharge data [SIL]=[1], the ink is discharged from the nozzle 651 to form dots on the medium P. The discharge data [SIL] is an example of the first discharge control signal, and the discharge data [SIH] is an example of a second discharge control signal.

In other words, in the binary mode of the third embodiment, the head control signals DIa and DIb may not include the discharge data [SIH] and the discharge data [SIM]. Since the data size of the head control signals DIa and DIb can be reduced, the dot formation cycle T corresponding to the printing cycle can be shortened as compared with a case of the multi-gradation mode.

In the binary mode of the third embodiment, the discharge data [SIH] and the discharge data [SIM] are not included in the head control signals DIa and DIb, and accordingly, the discharge control signal SI can be made smaller than that in a case of the binary mode of the first embodiment. Therefore, the printing cycle can be shortened.

In the third embodiment, since the multi-gradation mode and the binary mode can be executed with the same hardware configuration, the user can switch the mode in any manner and the range of use of the liquid discharge apparatus 1 is expanded.

Further, in the third embodiment, the selection signals Q1 to Q4 are generated based on the 32-bit setting information signal SP in both the multi-gradation mode and the binary mode. In the binary mode of the third embodiment, the selection signal Q1 and the selection signal Q2 may be generated based on the 16-bit setting information signal SP. The data size of the head control signals DIa and DIb is reduced, and the printing cycle can be shortened.

In the binary mode of the third embodiment, the ink discharge from the nozzle 651 is controlled by using two driving waveforms dp30 and dp31, but even with dp30 alone, the same effect as the effect obtained in the binary mode of the present embodiment can be obtained. In other words, the slight vibration of the nozzle 651 does not occur, and by turning off the transfer gate 234, the control can also be performed such that dots are not formed on the medium P. Furthermore, when there is only one driving waveform, the dot formation cycle T may not have to be defined by the change signal CH, and thus, the printing cycle can be further shortened.

12. Operational Effect

As described above, the liquid discharge apparatus 1 according to the present embodiment can perform printing in the multi-gradation mode and the binary mode with the same hardware configuration. Therefore, the user can switch between the multi-gradation mode and the binary mode in any manner, and the range of use is expanded.

In the binary mode of the first embodiment, the setting information PA included in the setting information signal SP is set such that the bit data of the selection signal Q1 and the selection signal Q2 are inverted. Therefore, regardless of the value of the discharge data [SIH], printing in the binary mode can be performed according to the value of the discharge data [SIL]. Specifically, when [SIL]=[0], the ink is not discharged from the nozzle 651, and thus, no dots are formed on the medium P, and when the discharge data [SIL]=[1], the ink is discharged from the nozzle 651 to execute printing with two gradations.

In other words, in the binary mode of the first embodiment, the head control signal DI may not include all or a part of the discharge data [SIH]. Accordingly, since the data size of the head control signal DI can be reduced, the dot formation cycle T corresponding to the printing cycle can be shortened as compared with a case of the multi-gradation mode.

In the binary mode of the second embodiment, since the setting information PA and PB included in the setting information signal SP is set such that the bit data of the selection signal Qa1 and the selection signal Qb1 are inverted, printing can be performed in the binary mode by the value of the discharge data [SIL] regardless of the value of the discharge data [SIH]. Specifically, when [SIL]=[0], the ink is not discharged from the nozzle 651, and thus, no dots are formed on the medium P, and when the discharge data [SIL]=[1], the ink is discharged from the nozzle 651 to execute printing with two gradations.

In other words, in the binary mode of the second embodiment, the head control signal DI may not include all or a part of the discharge data [SIH]. Accordingly, since the data size of the head control signal DI can be reduced, the printing cycle can be shortened as compared with a case of the multi-gradation mode.

In the binary mode of the third embodiment, since the setting information PA included in the setting information signal SP is set such that the bit data of the selection signal Q1 and the selection signal Q2 are inverted, printing can be performed in the binary mode by the value of the discharge data [SIL] regardless of the values of the discharge data [SIH] and the discharge data [SIM]. Specifically, when [SIL]=[0], the ink is not discharged from the nozzle 651, and thus, no dots are formed on the medium P, and when the discharge data [SIL]=[1], the ink is discharged from the nozzle 651 to execute printing with two gradations.

In other words, in the binary mode of the third embodiment, the head control signals DIa and DIb may not include all or a part of the discharge data [SIH] and the discharge data [SIM]. Accordingly, since the data size of the head control signals DIa and DIb can be reduced, the printing cycle can be shortened as compared with a case of the multi-gradation mode.

Since the data size of the discharge data [SIH, SIM] increases in proportion to the number of nozzles 651, the data size of the optional discharge data [SIH, SIM] increases as the number of nozzles 651 increases. In other words, as the number of nozzles 651 increases, the effect of shortening the printing cycle increases.

For example, the data size of the discharge data [SIH, SIM] is 800 bits when the number of nozzles 651 is 400, the data size of the discharge data [SIH, SIM] is 1600 bits when the number of nozzles 651 is 800, and thus, the data size of the optional discharge data [SIH, SIM] is 800 bits larger than that when the number of nozzles 651 is 800 as compared with a case where the number of the nozzles 651 is 400.

In the third embodiment, since the multi-gradation mode and the binary mode can be executed with the same hardware configuration, the user can switch the mode in any manner and the range of use is expanded.

Further, in the third embodiment, the selection signals Q1 to Q4 are generated based on the 32-bit setting information signal SP in both the multi-gradation mode and the binary mode. In the binary mode, the selection signal Q1 and the selection signal Q2 may be generated based on the 16-bit setting information signal SP. The data size of the head control signal DI is reduced, and the printing cycle can be shortened.

In the binary mode of the present embodiment, the ink discharge from the nozzle 651 is controlled by using two driving waveforms dp30 and dp31, but even with dp30 alone, the same effect as the effect obtained in the binary mode of the present embodiment can be obtained. In other words, by turning off the transfer gate 234, the control may be performed such that dots are not formed on the medium P without causing the nozzle 651 to vibrate slightly. When there is only one driving waveform, the dot formation cycle T may not have to be defined by the change signal CH, and thus, the printing cycle can be further shortened.

Above, the embodiments and the modification examples have been described above, but the present disclosure is not limited to the embodiments, and can be implemented in various modes without departing from the gist thereof. For example, the above-described embodiments can also be appropriately combined with each other.

The present disclosure includes substantially the same configurations (for example, configurations having the same functions, methods, and results, or configurations having the same objects and effects) as the configurations described in the embodiments. Further, the present disclosure includes configurations in which non-essential parts of the configuration described in the embodiments are replaced. In addition, the present disclosure includes configurations that achieve the same operational effects or configurations that can achieve the same objects as those of the configurations described in the embodiment. Further, the present disclosure includes configurations in which a known technology is added to the configurations described in the embodiments.

The following contents are derived from the above-described embodiments and modification examples.

According to an aspect, there is provided a liquid discharge apparatus including: a discharge section that discharges droplets by supplying a driving signal; a first wiring for transmitting a setting information signal group that has a first setting information signal and a second setting information signal and sets a rule for selecting a driving waveform applied to a piezoelectric element included in the discharge section from the driving signal, and a discharge control signal group that has a first discharge control signal and controls a gradation of dots formed by discharging the droplets from the discharge section; a second wiring for transmitting the driving signal having the driving waveform; and a switch circuit that switches whether or not to supply the driving signal to the discharge section based on the setting information signal group and the discharge control signal group, in which the apparatus is configured to be operated in a first print mode in which the droplets are discharged from the discharge section according to the setting information signal group and printing is performed with a first gradation number, and in a second print mode in which printing is performed with a second gradation number smaller than the first gradation number, and in the second print mode, the droplets are discharged from the discharge section according to the first setting information signal and the second setting information signal in which bit data of the first setting information signal is inverted.

According to this liquid discharge apparatus, the bit data of the second setting information signal included in the setting information signal group is set to be inverted with respect to the first setting information signal and the bit data, and accordingly, the printing can be performed with the second gradation number smaller than the first gradation number. In other words, the gradation at the time of printing can be changed by changing the setting of the setting information signal. Accordingly, when high-quality printing is not performed because a high-quality image is not required, printing can be performed in the second print mode having a low gradation number. Then, in the second print mode, the relationship is achieved in which the bit data of the first setting information signal and the bit data of the second setting information signal are inverted from each other, and thus, the 2-bit values of the first setting information signal and the second setting information signal are either "10" or "01" with respect to all possible values of the bit data of the first discharge control signal, and are not "00" or "11". Therefore, in the second print mode, some bits of the discharge control signal group transmitted through the first wiring in the first print mode are redundant bits and are unnecessary, and the first wiring does not need to transmit the bits. Therefore, according to this liquid discharge apparatus, it is possible to shorten the time required for the first wiring to transmit the discharge control signal group in the second print mode, and as a result, the printing time can be shortened.

According to the aspect of the liquid discharge apparatus, a data size of the setting information signal group in the second print mode may be equal to a data size of the setting information signal group in the first print mode, and a data size of the discharge control signal group in the second print mode is smaller than a data size of the discharge control signal group in the first print mode.

According to this liquid discharge apparatus, the data size of the discharge control signal group in the second print mode is smaller than the discharge control signal group in the first print mode, and thus, in the second print mode, the time required for transmitting the discharge control signal group through the first wiring is shortened, and the printing time is shortened.

According to the aspect of the liquid discharge apparatus, a printing cycle in the second print mode may be shortened as compared with a printing cycle in the first print mode.

According to this liquid discharge apparatus, since the printing cycle of the second print mode is shorter than the printing cycle of the first print mode, high-speed printing is possible in the second print mode.

According to the aspect of the liquid discharge apparatus, a shift register may further be provided, and the setting information signal group may be held in the shift register after the discharge control signal group.

According to this liquid discharge apparatus, the discharge control signal group and the setting information signal group are transmitted to the shift register through one wiring. Meanwhile, in the second print mode, some bits of the discharge control signal group transmitted through the first wiring in the first print mode are redundant bits and are unnecessary, and the bits do not need to be held in the shift register. Therefore, by holding the setting information signal group in the shift register after the discharge control signal group, the data size of the discharge control signal group held in the shift register in the first print mode and the second print mode can be different. Therefore, according to this liquid discharge apparatus, it is possible to realize the first print mode and the second print mode by using one shift register in combination.

According to the aspect of the liquid discharge apparatus, the first print mode may be a multi-gradation mode, and the second print mode may be a binary mode.

According to this liquid discharge apparatus, the first print mode may be a multi-gradation mode having a gradation number of 3 or more, and the second print mode may be a binary mode having a gradation number of 2. When the image quality is prioritized, the multi-gradation mode is selected, and when the printing speed is prioritized, the binary mode is selected. Therefore, the user can switch the mode in any manner, and the range of use is expanded.

According to the aspect of the liquid discharge apparatus, the discharge control signal group may include a second discharge control signal, and the apparatus may further include a third wiring for transmitting the second discharge control signal and the setting information signal group.

According to this liquid discharge apparatus, the gradation number of the formed dots is controlled by the first discharge control signal transmitted through the first wiring and the second discharge control signal transmitted through the third wiring, and accordingly, it is possible to execute printing with a higher gradation number in the first print mode.

According to the aspect of the liquid discharge apparatus, in the second print mode, printing is executed based on the first discharge control signal and the setting information signal group which are transmitted through the first wiring, and in the first print mode, printing is executed based on the first discharge control signal and the setting information signal group which are transmitted through the first wiring, and the second discharge control signal and the setting information signal group which are transmitted through the third wiring.

According to this liquid discharge apparatus, in the first print mode, the gradation number is controlled by the first discharge control signal and the second discharge control signal, and thus, the gradation number in the first print mode can be increased. Further, in the second print mode, the second discharge control signal and the setting information signal group transmitted through the third wiring in the first print mode are unnecessary. Therefore, the data size of the first discharge control signal and the setting information signal group which are transmitted through the first wiring in the second print mode is smaller than the data size of the second discharge control signal and the setting information signal group which are transmitted through the third wiring in the first print mode, and accordingly, the printing time can be shortened.

According to the aspect of the liquid discharge apparatus, the apparatus may include 800 or more of a plurality of discharge sections including the discharge section.

According to this liquid discharge apparatus, the discharge control signal group controls the gradation of 800 or more dots formed by discharging droplets from each of 800 or more discharge sections, and thus, the data size becomes extremely large. Since the difference in printing time between the first print mode and the second print mode is proportional to the data size of the discharge control signal group, as the number of discharge sections increases, the effect of shortening the printing time in the second mode becomes large.

What is claimed is:

1. A liquid discharge apparatus comprising:

a discharge section that discharges droplets by supplying a driving signal;

a first wiring for transmitting a setting information signal group that has a first setting information signal and a second setting information signal and sets a rule for selecting a driving waveform applied to a piezoelectric element included in the discharge section from the driving signal, and a discharge control signal group that has a first discharge control signal and controls a gradation of dots formed by discharging the droplets from the discharge section;

a second wiring for transmitting the driving signal having the driving waveform; and a selection circuit that switches whether or not to supply the driving signal to the discharge section based on the setting information signal group and the discharge control signal group, wherein the apparatus is configured to be operated in a first print mode in which the droplets are discharged from the discharge section according to the setting information signal group and printing is performed with a first gradation number, and in a second print mode in which printing is performed with a second gradation number smaller than the first gradation number, and in the second print mode, the droplets are discharged from the discharge section according to the first setting information signal and the second setting information signal in which bit data of the first setting information signal is inverted.

2. The liquid discharge apparatus according to claim 1, wherein a data size of the setting information signal group in the second print mode is equal to a data size of the setting information signal group in the first print mode, and a data size of the discharge control signal group in the second print mode is smaller than a data size of the discharge control signal group in the first print mode.

3. The liquid discharge apparatus according to claim 1, wherein a printing cycle in the second print mode is shorter than a printing cycle in the first print mode.

4. The liquid discharge apparatus according to claim 1, further comprising:

a shift register, wherein the setting information signal group is held in the shift register after the discharge control signal group.

5. The liquid discharge apparatus according to claim 1, wherein the first print mode is a multi-gradation mode, and the second print mode is a binary mode.

6. The liquid discharge apparatus according to claim 1, wherein the discharge control signal group includes a second discharge control signal, and the apparatus further comprises a third wiring for transmitting the second discharge control signal and the setting information signal group.

7. The liquid discharge apparatus according to claim 6, wherein in the second print mode, printing is executed based on the first discharge control signal and the setting information signal group which are transmitted through the first wiring, and in the first print mode, printing is executed based on the first discharge control signal and the setting information signal group which are transmitted through the first wiring, and the second discharge control signal and the setting information signal group which are transmitted through the third wiring.

8. The liquid discharge apparatus according to claim 1, wherein the apparatus comprises 800 or more of a plurality of discharge sections including the discharge section.

* * * * *